US011552772B2

(12) United States Patent
Liu et al.

(10) Patent No.: US 11,552,772 B2
(45) Date of Patent: Jan. 10, 2023

(54) SIGNAL TRANSMISSION METHOD AND APPARATUS, AND STORAGE MEDIUM AND ELECTRONIC APPARATUS

(71) Applicant: ZTE Corporation, Guangdong (CN)

(72) Inventors: Kun Liu, Guangdong (CN); Bo Dai, Guangdong (CN); Huiying Fang, Guangdong (CN); Weiwei Yang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 47 days.

(21) Appl. No.: 17/094,735

(22) Filed: Nov. 10, 2020

(65) Prior Publication Data

US 2021/0084681 A1    Mar. 18, 2021

Related U.S. Application Data

(63) Continuation of application No. PCT/CN2019/086243, filed on May 9, 2019.

(30) Foreign Application Priority Data

May 10, 2018   (CN) .......................... 201810445194.4

(51) Int. Cl.
*H04L 5/00*         (2006.01)
*H04W 72/04*    (2009.01)
(Continued)

(52) U.S. Cl.
CPC ............ *H04L 5/0094* (2013.01); *H04L 5/003* (2013.01); *H04L 5/0058* (2013.01);
(Continued)

(58) Field of Classification Search
CPC ..... H04L 5/0094; H04L 5/003; H04L 5/0058; H04L 5/0092; H04L 67/12; H04W 72/042;
(Continued)

(56) References Cited

U.S. PATENT DOCUMENTS

| 10,070,464 | B2 | 9/2018 | Tang et al. | |
|---|---|---|---|---|
| 10,855,505 | B2 | 12/2020 | Nadal et al. | |
| 2009/0285173 | A1* | 11/2009 | Koorapaty | ............ H04L 5/0051 370/330 |
| 2010/0172316 | A1* | 7/2010 | Hwang | ................. H04L 5/0044 370/330 |
| 2012/0020323 | A1* | 1/2012 | Noh | ...................... H04L 5/0023 370/330 |

(Continued)

FOREIGN PATENT DOCUMENTS

| CN | 103109479 A | 5/2013 |
|---|---|---|
| CN | 105393618 A | 3/2016 |

(Continued)

OTHER PUBLICATIONS

International Search Report and Written Opinion in International Application No. PCT/CN2019/086243, dated Aug. 9, 2019, 7 pages.

*Primary Examiner* — Joshua Kading
(74) *Attorney, Agent, or Firm* — Perkins Coie LLP

(57) ABSTRACT

Provided are a signal transmitting method and apparatus, a storage medium and an electronic apparatus for random-access signal transmissions. The method includes determining resources for a random-access signal in a region that comprises 36 subcarriers and six symbol groups. The six symbol groups are assigned indices 0, 1, 2, 3, 4, and 5, and a subcarrier index occupied by a symbol group is determined based on determining a first subcarrier index occupied by a neighboring symbol group, and determining the subcarrier index based on the first subcarrier index and an offset value. The method also includes transmitting the random-access signal using the determined resources.

20 Claims, 18 Drawing Sheets

(51) Int. Cl.
*H04W 80/02* (2009.01)
*H04W 74/00* (2009.01)
*H04W 74/08* (2009.01)
*G16Y 30/00* (2020.01)
*H04L 67/12* (2022.01)
*H04W 4/70* (2018.01)

(52) U.S. Cl.
CPC ..... *H04W 72/042* (2013.01); *H04W 72/0453* (2013.01); *H04W 80/02* (2013.01); *G16Y 30/00* (2020.01); *H04L 67/12* (2013.01); *H04W 4/70* (2018.02); *H04W 74/008* (2013.01); *H04W 74/0833* (2013.01)

(58) Field of Classification Search
CPC ............. H04W 72/0453; H04W 80/02; H04W 4/70; H04W 74/008; H04W 74/0833; G16Y 30/00
See application file for complete search history.

(56) References Cited

U.S. PATENT DOCUMENTS

| | | |
|---|---|---|
| 2013/0229981 A1 | 9/2013 | Park et al. |
| 2014/0211730 A1* | 7/2014 | Seo ........................ H04L 5/0053 370/329 |
| 2016/0112172 A1* | 4/2016 | Seo ........................ H04L 1/0072 370/329 |
| 2017/0238345 A1 | 8/2017 | Liu et al. |
| 2017/0324587 A1 | 11/2017 | Lin et al. |
| 2020/0178296 A1* | 6/2020 | Shin ................... H04L 27/2607 |
| 2020/0245363 A1* | 7/2020 | Kim ....................... H04B 1/713 |
| 2020/0382352 A1 | 12/2020 | Liu et al. |

FOREIGN PATENT DOCUMENTS

| | | |
|---|---|---|
| CN | 107046729 A | 8/2017 |
| CN | 107733566 A | 2/2018 |
| CN | 107889212 A | 4/2018 |
| CN | 108632790 A | 10/2018 |
| CN | 109587659 A | 4/2019 |

* cited by examiner

Transmit a first signal, where the first signal includes one or more symbol groups — S202

Receive a first signal, where the first signal includes one or more symbol groups — S302

| Subcarrier index | Symbol group 0 | Symbol group 1 | Symbol group 2 | Symbol group 3 | Symbol group 4 | Symbol group 5 |
|---|---|---|---|---|---|---|
| 35 | Channel 35 | Channel 34 | Channel 35 | Channel 32 | Channel 35 | Channel 17 |
| 34 | Channel 34 | Channel 35 | Channel 34 | Channel 31 | Channel 34 | Channel 16 |
| 33 | Channel 33 | Channel 32 | Channel 33 | Channel 30 | Channel 33 | Channel 15 |
| 32 | Channel 32 | Channel 33 | Channel 32 | Channel 35 | Channel 32 | Channel 14 |
| 31 | Channel 31 | Channel 30 | Channel 31 | Channel 34 | Channel 31 | Channel 13 |
| 30 | Channel 30 | Channel 31 | Channel 30 | Channel 33 | Channel 30 | Channel 12 |
| 29 | Channel 29 | Channel 28 | Channel 29 | Channel 26 | Channel 29 | Channel 11 |
| 28 | Channel 28 | Channel 29 | Channel 28 | Channel 25 | Channel 28 | Channel 10 |
| 27 | Channel 27 | Channel 26 | Channel 27 | Channel 24 | Channel 27 | Channel 9 |
| 26 | Channel 26 | Channel 27 | Channel 26 | Channel 29 | Channel 26 | Channel 8 |
| 25 | Channel 25 | Channel 24 | Channel 25 | Channel 28 | Channel 25 | Channel 7 |
| 24 | Channel 24 | Channel 25 | Channel 24 | Channel 27 | Channel 24 | Channel 6 |
| 23 | Channel 23 | Channel 22 | Channel 23 | Channel 20 | Channel 23 | Channel 5 |
| 22 | Channel 22 | Channel 23 | Channel 22 | Channel 19 | Channel 22 | Channel 4 |
| 21 | Channel 21 | Channel 20 | Channel 21 | Channel 18 | Channel 21 | Channel 3 |
| 20 | Channel 20 | Channel 21 | Channel 20 | Channel 23 | Channel 20 | Channel 2 |
| 19 | Channel 19 | Channel 18 | Channel 19 | Channel 22 | Channel 19 | Channel 1 |
| 18 | Channel 18 | Channel 19 | Channel 18 | Channel 21 | Channel 18 | Channel 0 |
| 17 | Channel 17 | Channel 16 | Channel 17 | Channel 14 | Channel 17 | Channel 35 |
| 16 | Channel 16 | Channel 17 | Channel 16 | Channel 13 | Channel 16 | Channel 34 |
| 15 | Channel 15 | Channel 14 | Channel 15 | Channel 12 | Channel 15 | Channel 33 |
| 14 | Channel 14 | Channel 15 | Channel 14 | Channel 17 | Channel 14 | Channel 32 |
| 13 | Channel 13 | Channel 12 | Channel 13 | Channel 16 | Channel 13 | Channel 31 |
| 12 | Channel 12 | Channel 13 | Channel 12 | Channel 15 | Channel 12 | Channel 30 |
| 11 | Channel 11 | Channel 10 | Channel 11 | Channel 8 | Channel 11 | Channel 29 |
| 10 | Channel 10 | Channel 11 | Channel 10 | Channel 7 | Channel 10 | Channel 28 |
| 9 | Channel 9 | Channel 8 | Channel 9 | Channel 6 | Channel 9 | Channel 27 |
| 8 | Channel 8 | Channel 9 | Channel 8 | Channel 11 | Channel 8 | Channel 26 |
| 7 | Channel 7 | Channel 6 | Channel 7 | Channel 10 | Channel 7 | Channel 25 |
| 6 | Channel 6 | Channel 7 | Channel 6 | Channel 9 | Channel 6 | Channel 24 |
| 5 | Channel 5 | Channel 4 | Channel 5 | Channel 2 | Channel 5 | Channel 23 |
| 4 | Channel 4 | Channel 5 | Channel 4 | Channel 1 | Channel 4 | Channel 22 |
| 3 | Channel 3 | Channel 2 | Channel 3 | Channel 0 | Channel 3 | Channel 21 |
| 2 | Channel 2 | Channel 3 | Channel 2 | Channel 5 | Channel 2 | Channel 20 |
| 1 | Channel 1 | Channel 0 | Channel 1 | Channel 4 | Channel 1 | Channel 19 |
| 0 | Channel 0 | Channel 1 | Channel 0 | Channel 3 | Channel 0 | Channel 18 |

FIG. 8

| Subcarrier index | Symbol group 0 | Symbol group 1 | Symbol group 2 | Symbol group 3 | Symbol group 4 | Symbol group 5 |
|---|---|---|---|---|---|---|
| 35 | Channel 35 | Channel 32 | Channel 35 | Channel 34 | Channel 35 | Channel 17 |
| 34 | Channel 34 | Channel 31 | Channel 34 | Channel 35 | Channel 34 | Channel 16 |
| 33 | Channel 33 | Channel 30 | Channel 33 | Channel 32 | Channel 33 | Channel 15 |
| 32 | Channel 32 | Channel 35 | Channel 32 | Channel 33 | Channel 32 | Channel 14 |
| 31 | Channel 31 | Channel 34 | Channel 31 | Channel 30 | Channel 31 | Channel 13 |
| 30 | Channel 30 | Channel 33 | Channel 30 | Channel 31 | Channel 30 | Channel 12 |
| 29 | Channel 29 | Channel 26 | Channel 29 | Channel 28 | Channel 29 | Channel 11 |
| 28 | Channel 28 | Channel 25 | Channel 28 | Channel 29 | Channel 28 | Channel 10 |
| 27 | Channel 27 | Channel 24 | Channel 27 | Channel 26 | Channel 27 | Channel 9 |
| 26 | Channel 26 | Channel 29 | Channel 26 | Channel 27 | Channel 26 | Channel 8 |
| 25 | Channel 25 | Channel 28 | Channel 25 | Channel 24 | Channel 25 | Channel 7 |
| 24 | Channel 24 | Channel 27 | Channel 24 | Channel 25 | Channel 24 | Channel 6 |
| 23 | Channel 23 | Channel 20 | Channel 23 | Channel 22 | Channel 23 | Channel 5 |
| 22 | Channel 22 | Channel 19 | Channel 22 | Channel 23 | Channel 22 | Channel 4 |
| 21 | Channel 21 | Channel 18 | Channel 21 | Channel 20 | Channel 21 | Channel 3 |
| 20 | Channel 20 | Channel 23 | Channel 20 | Channel 21 | Channel 20 | Channel 2 |
| 19 | Channel 19 | Channel 22 | Channel 19 | Channel 18 | Channel 19 | Channel 1 |
| 18 | Channel 18 | Channel 21 | Channel 18 | Channel 19 | Channel 18 | Channel 0 |
| 17 | Channel 17 | Channel 14 | Channel 17 | Channel 16 | Channel 17 | Channel 35 |
| 16 | Channel 16 | Channel 13 | Channel 16 | Channel 17 | Channel 16 | Channel 34 |
| 15 | Channel 15 | Channel 12 | Channel 15 | Channel 14 | Channel 15 | Channel 33 |
| 14 | Channel 14 | Channel 17 | Channel 14 | Channel 15 | Channel 14 | Channel 32 |
| 13 | Channel 13 | Channel 16 | Channel 13 | Channel 12 | Channel 13 | Channel 31 |
| 12 | Channel 12 | Channel 15 | Channel 12 | Channel 13 | Channel 12 | Channel 30 |
| 11 | Channel 11 | Channel 8 | Channel 11 | Channel 10 | Channel 11 | Channel 29 |
| 10 | Channel 10 | Channel 7 | Channel 10 | Channel 11 | Channel 10 | Channel 28 |
| 9 | Channel 9 | Channel 6 | Channel 9 | Channel 8 | Channel 9 | Channel 27 |
| 8 | Channel 8 | Channel 11 | Channel 8 | Channel 9 | Channel 8 | Channel 26 |
| 7 | Channel 7 | Channel 10 | Channel 7 | Channel 6 | Channel 7 | Channel 25 |
| 6 | Channel 6 | Channel 9 | Channel 6 | Channel 7 | Channel 6 | Channel 24 |
| 5 | Channel 5 | Channel 2 | Channel 5 | Channel 4 | Channel 5 | Channel 23 |
| 4 | Channel 4 | Channel 1 | Channel 4 | Channel 5 | Channel 4 | Channel 22 |
| 3 | Channel 3 | Channel 0 | Channel 3 | Channel 2 | Channel 3 | Channel 21 |
| 2 | Channel 2 | Channel 5 | Channel 2 | Channel 3 | Channel 2 | Channel 20 |
| 1 | Channel 1 | Channel 4 | Channel 1 | Channel 0 | Channel 1 | Channel 19 |
| 0 | Channel 0 | Channel 3 | Channel 0 | Channel 1 | Channel 0 | Channel 18 |

FIG. 9

| Subcarrier index | Symbol group 0 | Symbol group 1 | Symbol group 2 | Symbol group 3 | Symbol group 4 | Symbol group 5 |
|---|---|---|---|---|---|---|
| 35 | Channel 35 | Channel 34 | Channel 35 | Channel 17 | Channel 14 | Channel 17 |
| 34 | Channel 34 | Channel 35 | Channel 34 | Channel 16 | Channel 13 | Channel 16 |
| 33 | Channel 33 | Channel 32 | Channel 33 | Channel 15 | Channel 12 | Channel 15 |
| 32 | Channel 32 | Channel 33 | Channel 32 | Channel 14 | Channel 17 | Channel 14 |
| 31 | Channel 31 | Channel 30 | Channel 31 | Channel 13 | Channel 16 | Channel 13 |
| 30 | Channel 30 | Channel 31 | Channel 30 | Channel 12 | Channel 15 | Channel 12 |
| 29 | Channel 29 | Channel 28 | Channel 29 | Channel 11 | Channel 8 | Channel 11 |
| 28 | Channel 28 | Channel 29 | Channel 28 | Channel 10 | Channel 7 | Channel 10 |
| 27 | Channel 27 | Channel 26 | Channel 27 | Channel 9 | Channel 6 | Channel 9 |
| 26 | Channel 26 | Channel 27 | Channel 26 | Channel 8 | Channel 11 | Channel 8 |
| 25 | Channel 25 | Channel 24 | Channel 25 | Channel 7 | Channel 10 | Channel 7 |
| 24 | Channel 24 | Channel 25 | Channel 24 | Channel 6 | Channel 9 | Channel 6 |
| 23 | Channel 23 | Channel 22 | Channel 23 | Channel 5 | Channel 2 | Channel 5 |
| 22 | Channel 22 | Channel 23 | Channel 22 | Channel 4 | Channel 1 | Channel 4 |
| 21 | Channel 21 | Channel 20 | Channel 21 | Channel 3 | Channel 0 | Channel 3 |
| 20 | Channel 20 | Channel 21 | Channel 20 | Channel 2 | Channel 5 | Channel 2 |
| 19 | Channel 19 | Channel 18 | Channel 19 | Channel 1 | Channel 4 | Channel 1 |
| 18 | Channel 18 | Channel 19 | Channel 18 | Channel 0 | Channel 3 | Channel 0 |
| 17 | Channel 17 | Channel 16 | Channel 17 | Channel 35 | Channel 32 | Channel 35 |
| 16 | Channel 16 | Channel 17 | Channel 16 | Channel 34 | Channel 31 | Channel 34 |
| 15 | Channel 15 | Channel 14 | Channel 15 | Channel 33 | Channel 30 | Channel 33 |
| 14 | Channel 14 | Channel 15 | Channel 14 | Channel 32 | Channel 35 | Channel 32 |
| 13 | Channel 13 | Channel 12 | Channel 13 | Channel 31 | Channel 34 | Channel 31 |
| 12 | Channel 12 | Channel 13 | Channel 12 | Channel 30 | Channel 33 | Channel 30 |
| 11 | Channel 11 | Channel 10 | Channel 11 | Channel 29 | Channel 26 | Channel 29 |
| 10 | Channel 10 | Channel 11 | Channel 10 | Channel 28 | Channel 25 | Channel 28 |
| 9 | Channel 9 | Channel 8 | Channel 9 | Channel 27 | Channel 24 | Channel 27 |
| 8 | Channel 8 | Channel 9 | Channel 8 | Channel 26 | Channel 29 | Channel 26 |
| 7 | Channel 7 | Channel 6 | Channel 7 | Channel 25 | Channel 28 | Channel 25 |
| 6 | Channel 6 | Channel 7 | Channel 6 | Channel 24 | Channel 27 | Channel 24 |
| 5 | Channel 5 | Channel 4 | Channel 5 | Channel 23 | Channel 20 | Channel 23 |
| 4 | Channel 4 | Channel 5 | Channel 4 | Channel 22 | Channel 19 | Channel 22 |
| 3 | Channel 3 | Channel 2 | Channel 3 | Channel 21 | Channel 18 | Channel 21 |
| 2 | Channel 2 | Channel 3 | Channel 2 | Channel 20 | Channel 23 | Channel 20 |
| 1 | Channel 1 | Channel 0 | Channel 1 | Channel 19 | Channel 22 | Channel 19 |
| 0 | Channel 0 | Channel 1 | Channel 0 | Channel 18 | Channel 21 | Channel 18 |

FIG. 10

| Subcarrier index | Symbol group 0 | Symbol group 1 | Symbol group 2 | Symbol group 3 | Symbol group 4 | Symbol group 5 |
|---|---|---|---|---|---|---|
| 35 | Channel 35 | Channel 32 | Channel 35 | Channel 17 | Channel 16 | Channel 17 |
| 34 | Channel 34 | Channel 31 | Channel 34 | Channel 16 | Channel 17 | Channel 16 |
| 33 | Channel 33 | Channel 30 | Channel 33 | Channel 15 | Channel 14 | Channel 15 |
| 32 | Channel 32 | Channel 35 | Channel 32 | Channel 14 | Channel 15 | Channel 14 |
| 31 | Channel 31 | Channel 34 | Channel 31 | Channel 13 | Channel 12 | Channel 13 |
| 30 | Channel 30 | Channel 33 | Channel 30 | Channel 12 | Channel 13 | Channel 12 |
| 29 | Channel 29 | Channel 26 | Channel 29 | Channel 11 | Channel 10 | Channel 11 |
| 28 | Channel 28 | Channel 25 | Channel 28 | Channel 10 | Channel 11 | Channel 10 |
| 27 | Channel 27 | Channel 24 | Channel 27 | Channel 9 | Channel 8 | Channel 9 |
| 26 | Channel 26 | Channel 29 | Channel 26 | Channel 8 | Channel 9 | Channel 8 |
| 25 | Channel 25 | Channel 28 | Channel 25 | Channel 7 | Channel 6 | Channel 7 |
| 24 | Channel 24 | Channel 27 | Channel 24 | Channel 6 | Channel 7 | Channel 6 |
| 23 | Channel 23 | Channel 20 | Channel 23 | Channel 5 | Channel 4 | Channel 5 |
| 22 | Channel 22 | Channel 19 | Channel 22 | Channel 4 | Channel 5 | Channel 4 |
| 21 | Channel 21 | Channel 18 | Channel 21 | Channel 3 | Channel 2 | Channel 3 |
| 20 | Channel 20 | Channel 23 | Channel 20 | Channel 2 | Channel 3 | Channel 2 |
| 19 | Channel 19 | Channel 22 | Channel 19 | Channel 1 | Channel 0 | Channel 1 |
| 18 | Channel 18 | Channel 21 | Channel 18 | Channel 0 | Channel 1 | Channel 0 |
| 17 | Channel 17 | Channel 14 | Channel 17 | Channel 35 | Channel 34 | Channel 35 |
| 16 | Channel 16 | Channel 13 | Channel 16 | Channel 34 | Channel 35 | Channel 34 |
| 15 | Channel 15 | Channel 12 | Channel 15 | Channel 33 | Channel 32 | Channel 33 |
| 14 | Channel 14 | Channel 17 | Channel 14 | Channel 32 | Channel 33 | Channel 32 |
| 13 | Channel 13 | Channel 16 | Channel 13 | Channel 31 | Channel 30 | Channel 31 |
| 12 | Channel 12 | Channel 15 | Channel 12 | Channel 30 | Channel 31 | Channel 30 |
| 11 | Channel 11 | Channel 8 | Channel 11 | Channel 29 | Channel 28 | Channel 29 |
| 10 | Channel 10 | Channel 7 | Channel 10 | Channel 28 | Channel 29 | Channel 28 |
| 9 | Channel 9 | Channel 6 | Channel 9 | Channel 27 | Channel 26 | Channel 27 |
| 8 | Channel 8 | Channel 11 | Channel 8 | Channel 26 | Channel 27 | Channel 26 |
| 7 | Channel 7 | Channel 10 | Channel 7 | Channel 25 | Channel 24 | Channel 25 |
| 6 | Channel 6 | Channel 9 | Channel 6 | Channel 24 | Channel 25 | Channel 24 |
| 5 | Channel 5 | Channel 2 | Channel 5 | Channel 23 | Channel 22 | Channel 23 |
| 4 | Channel 4 | Channel 1 | Channel 4 | Channel 22 | Channel 23 | Channel 22 |
| 3 | Channel 3 | Channel 0 | Channel 3 | Channel 21 | Channel 20 | Channel 21 |
| 2 | Channel 2 | Channel 5 | Channel 2 | Channel 20 | Channel 21 | Channel 20 |
| 1 | Channel 1 | Channel 4 | Channel 1 | Channel 19 | Channel 18 | Channel 19 |
| 0 | Channel 0 | Channel 3 | Channel 0 | Channel 18 | Channel 19 | Channel 18 |

FIG. 11

| Subcarrier index | | | | | | | |
|---|---|---|---|---|---|---|---|
| 35 | Channel 35 | Channel 34 | Channel 33 | Channel 15 | Channel 16 | Channel 17 |
| 34 | Channel 34 | Channel 35 | Channel 30 | Channel 12 | Channel 17 | Channel 16 |
| 33 | Channel 33 | Channel 32 | Channel 31 | Channel 13 | Channel 14 | Channel 15 |
| 32 | Channel 32 | Channel 33 | Channel 34 | Channel 16 | Channel 15 | Channel 14 |
| 31 | Channel 31 | Channel 30 | Channel 35 | Channel 17 | Channel 12 | Channel 13 |
| 30 | Channel 30 | Channel 31 | Channel 32 | Channel 14 | Channel 13 | Channel 12 |
| 29 | Channel 29 | Channel 28 | Channel 27 | Channel 9 | Channel 10 | Channel 11 |
| 28 | Channel 28 | Channel 29 | Channel 24 | Channel 6 | Channel 11 | Channel 10 |
| 27 | Channel 27 | Channel 26 | Channel 25 | Channel 7 | Channel 8 | Channel 9 |
| 26 | Channel 26 | Channel 27 | Channel 28 | Channel 10 | Channel 9 | Channel 8 |
| 25 | Channel 25 | Channel 24 | Channel 29 | Channel 11 | Channel 6 | Channel 7 |
| 24 | Channel 24 | Channel 25 | Channel 26 | Channel 8 | Channel 7 | Channel 6 |
| 23 | Channel 23 | Channel 22 | Channel 21 | Channel 3 | Channel 4 | Channel 5 |
| 22 | Channel 22 | Channel 23 | Channel 18 | Channel 0 | Channel 5 | Channel 4 |
| 21 | Channel 21 | Channel 20 | Channel 19 | Channel 1 | Channel 2 | Channel 3 |
| 20 | Channel 20 | Channel 21 | Channel 22 | Channel 4 | Channel 3 | Channel 2 |
| 19 | Channel 19 | Channel 18 | Channel 23 | Channel 5 | Channel 0 | Channel 1 |
| 18 | Channel 18 | Channel 19 | Channel 20 | Channel 2 | Channel 1 | Channel 0 |
| 17 | Channel 17 | Channel 16 | Channel 15 | Channel 33 | Channel 34 | Channel 35 |
| 16 | Channel 16 | Channel 17 | Channel 12 | Channel 30 | Channel 35 | Channel 34 |
| 15 | Channel 15 | Channel 14 | Channel 13 | Channel 31 | Channel 32 | Channel 33 |
| 14 | Channel 14 | Channel 15 | Channel 16 | Channel 34 | Channel 33 | Channel 32 |
| 13 | Channel 13 | Channel 12 | Channel 17 | Channel 35 | Channel 30 | Channel 31 |
| 12 | Channel 12 | Channel 13 | Channel 14 | Channel 32 | Channel 31 | Channel 30 |
| 11 | Channel 11 | Channel 10 | Channel 9 | Channel 27 | Channel 28 | Channel 29 |
| 10 | Channel 10 | Channel 11 | Channel 6 | Channel 24 | Channel 29 | Channel 28 |
| 9 | Channel 9 | Channel 8 | Channel 7 | Channel 25 | Channel 26 | Channel 27 |
| 8 | Channel 8 | Channel 9 | Channel 10 | Channel 28 | Channel 27 | Channel 26 |
| 7 | Channel 7 | Channel 6 | Channel 11 | Channel 29 | Channel 24 | Channel 25 |
| 6 | Channel 6 | Channel 7 | Channel 8 | Channel 26 | Channel 25 | Channel 24 |
| 5 | Channel 5 | Channel 4 | Channel 3 | Channel 21 | Channel 22 | Channel 23 |
| 4 | Channel 4 | Channel 5 | Channel 0 | Channel 18 | Channel 23 | Channel 22 |
| 3 | Channel 3 | Channel 2 | Channel 1 | Channel 19 | Channel 20 | Channel 21 |
| 2 | Channel 2 | Channel 3 | Channel 4 | Channel 22 | Channel 21 | Channel 20 |
| 1 | Channel 1 | Channel 0 | Channel 5 | Channel 23 | Channel 18 | Channel 19 |
| 0 | Channel 0 | Channel 1 | Channel 2 | Channel 20 | Channel 19 | Channel 18 |
| | Symbol group 0 | Symbol group 1 | Symbol group 2 | Symbol group 3 | Symbol group 4 | Symbol group 5 |

FIG. 12

| Subcarrier index | Symbol group 0 | Symbol group 1 | Symbol group 2 | Symbol group 3 | Symbol group 4 | Symbol group 5 | Symbol group 6 |
|---|---|---|---|---|---|---|---|
| 35 | Channel 35 | Channel 34 | Channel 35 | Channel 32 | Channel 35 | Channel 17 | Channel 35 |
| 34 | Channel 34 | Channel 35 | Channel 34 | Channel 31 | Channel 34 | Channel 16 | Channel 34 |
| 33 | Channel 33 | Channel 32 | Channel 33 | Channel 30 | Channel 33 | Channel 15 | Channel 33 |
| 32 | Channel 32 | Channel 33 | Channel 32 | Channel 35 | Channel 32 | Channel 14 | Channel 32 |
| 31 | Channel 31 | Channel 30 | Channel 31 | Channel 34 | Channel 31 | Channel 13 | Channel 31 |
| 30 | Channel 30 | Channel 31 | Channel 30 | Channel 33 | Channel 30 | Channel 12 | Channel 30 |
| 29 | Channel 29 | Channel 28 | Channel 29 | Channel 26 | Channel 29 | Channel 11 | Channel 29 |
| 28 | Channel 28 | Channel 29 | Channel 28 | Channel 25 | Channel 28 | Channel 10 | Channel 28 |
| 27 | Channel 27 | Channel 26 | Channel 27 | Channel 24 | Channel 27 | Channel 9 | Channel 27 |
| 26 | Channel 26 | Channel 27 | Channel 26 | Channel 29 | Channel 26 | Channel 8 | Channel 26 |
| 25 | Channel 25 | Channel 24 | Channel 25 | Channel 28 | Channel 25 | Channel 7 | Channel 25 |
| 24 | Channel 24 | Channel 25 | Channel 24 | Channel 27 | Channel 24 | Channel 6 | Channel 24 |
| 23 | Channel 23 | Channel 22 | Channel 23 | Channel 20 | Channel 23 | Channel 5 | Channel 23 |
| 22 | Channel 22 | Channel 23 | Channel 22 | Channel 19 | Channel 22 | Channel 4 | Channel 22 |
| 21 | Channel 21 | Channel 20 | Channel 21 | Channel 18 | Channel 21 | Channel 3 | Channel 21 |
| 20 | Channel 20 | Channel 21 | Channel 20 | Channel 23 | Channel 20 | Channel 2 | Channel 20 |
| 19 | Channel 19 | Channel 18 | Channel 19 | Channel 22 | Channel 19 | Channel 1 | Channel 19 |
| 18 | Channel 18 | Channel 19 | Channel 18 | Channel 21 | Channel 18 | Channel 0 | Channel 18 |
| 17 | Channel 17 | Channel 16 | Channel 17 | Channel 14 | Channel 17 | Channel 35 | Channel 17 |
| 16 | Channel 16 | Channel 17 | Channel 16 | Channel 13 | Channel 16 | Channel 34 | Channel 16 |
| 15 | Channel 15 | Channel 14 | Channel 15 | Channel 12 | Channel 15 | Channel 33 | Channel 15 |
| 14 | Channel 14 | Channel 15 | Channel 14 | Channel 17 | Channel 14 | Channel 32 | Channel 14 |
| 13 | Channel 13 | Channel 12 | Channel 13 | Channel 16 | Channel 13 | Channel 31 | Channel 13 |
| 12 | Channel 12 | Channel 13 | Channel 12 | Channel 15 | Channel 12 | Channel 30 | Channel 12 |
| 11 | Channel 11 | Channel 10 | Channel 11 | Channel 8 | Channel 11 | Channel 29 | Channel 11 |
| 10 | Channel 10 | Channel 11 | Channel 10 | Channel 7 | Channel 10 | Channel 28 | Channel 10 |
| 9 | Channel 9 | Channel 8 | Channel 9 | Channel 6 | Channel 9 | Channel 27 | Channel 9 |
| 8 | Channel 8 | Channel 9 | Channel 8 | Channel 11 | Channel 8 | Channel 26 | Channel 8 |
| 7 | Channel 7 | Channel 6 | Channel 7 | Channel 10 | Channel 7 | Channel 25 | Channel 7 |
| 6 | Channel 6 | Channel 7 | Channel 6 | Channel 9 | Channel 6 | Channel 24 | Channel 6 |
| 5 | Channel 5 | Channel 4 | Channel 5 | Channel 2 | Channel 5 | Channel 23 | Channel 5 |
| 4 | Channel 4 | Channel 5 | Channel 4 | Channel 1 | Channel 4 | Channel 22 | Channel 4 |
| 3 | Channel 3 | Channel 2 | Channel 3 | Channel 0 | Channel 3 | Channel 21 | Channel 3 |
| 2 | Channel 2 | Channel 3 | Channel 2 | Channel 5 | Channel 2 | Channel 20 | Channel 2 |
| 1 | Channel 1 | Channel 0 | Channel 1 | Channel 4 | Channel 1 | Channel 19 | Channel 1 |
| 0 | Channel 0 | Channel 1 | Channel 0 | Channel 3 | Channel 0 | Channel 18 | Channel 0 |

FIG. 15

| Subcarrier index | Symbol group 0 | Symbol group 1 | Symbol group 2 | Symbol group 3 | Symbol group 4 | Symbol group 5 | Symbol group 6 |
|---|---|---|---|---|---|---|---|
| 35 | Channel 35 | Channel 32 | Channel 35 | Channel 34 | Channel 35 | Channel 17 | Channel 35 |
| 34 | Channel 34 | Channel 31 | Channel 34 | Channel 35 | Channel 34 | Channel 16 | Channel 34 |
| 33 | Channel 33 | Channel 30 | Channel 33 | Channel 32 | Channel 33 | Channel 15 | Channel 33 |
| 32 | Channel 32 | Channel 35 | Channel 32 | Channel 33 | Channel 32 | Channel 14 | Channel 32 |
| 31 | Channel 31 | Channel 34 | Channel 31 | Channel 30 | Channel 31 | Channel 13 | Channel 31 |
| 30 | Channel 30 | Channel 33 | Channel 30 | Channel 31 | Channel 30 | Channel 12 | Channel 30 |
| 29 | Channel 29 | Channel 26 | Channel 29 | Channel 28 | Channel 29 | Channel 11 | Channel 29 |
| 28 | Channel 28 | Channel 25 | Channel 28 | Channel 29 | Channel 28 | Channel 10 | Channel 28 |
| 27 | Channel 27 | Channel 24 | Channel 27 | Channel 26 | Channel 27 | Channel 9 | Channel 27 |
| 26 | Channel 26 | Channel 29 | Channel 26 | Channel 27 | Channel 26 | Channel 8 | Channel 26 |
| 25 | Channel 25 | Channel 28 | Channel 25 | Channel 24 | Channel 25 | Channel 7 | Channel 25 |
| 24 | Channel 24 | Channel 27 | Channel 24 | Channel 25 | Channel 24 | Channel 6 | Channel 24 |
| 23 | Channel 23 | Channel 20 | Channel 23 | Channel 22 | Channel 23 | Channel 5 | Channel 23 |
| 22 | Channel 22 | Channel 19 | Channel 22 | Channel 23 | Channel 22 | Channel 4 | Channel 22 |
| 21 | Channel 21 | Channel 18 | Channel 21 | Channel 20 | Channel 21 | Channel 3 | Channel 21 |
| 20 | Channel 20 | Channel 23 | Channel 20 | Channel 21 | Channel 20 | Channel 2 | Channel 20 |
| 19 | Channel 19 | Channel 22 | Channel 19 | Channel 18 | Channel 19 | Channel 1 | Channel 19 |
| 18 | Channel 18 | Channel 21 | Channel 18 | Channel 19 | Channel 18 | Channel 0 | Channel 18 |
| 17 | Channel 17 | Channel 14 | Channel 17 | Channel 16 | Channel 17 | Channel 35 | Channel 17 |
| 16 | Channel 16 | Channel 13 | Channel 16 | Channel 17 | Channel 16 | Channel 34 | Channel 16 |
| 15 | Channel 15 | Channel 12 | Channel 15 | Channel 14 | Channel 15 | Channel 33 | Channel 15 |
| 14 | Channel 14 | Channel 17 | Channel 14 | Channel 15 | Channel 14 | Channel 32 | Channel 14 |
| 13 | Channel 13 | Channel 16 | Channel 13 | Channel 12 | Channel 13 | Channel 31 | Channel 13 |
| 12 | Channel 12 | Channel 15 | Channel 12 | Channel 13 | Channel 12 | Channel 30 | Channel 12 |
| 11 | Channel 11 | Channel 8 | Channel 11 | Channel 10 | Channel 11 | Channel 29 | Channel 11 |
| 10 | Channel 10 | Channel 7 | Channel 10 | Channel 11 | Channel 10 | Channel 28 | Channel 10 |
| 9 | Channel 9 | Channel 6 | Channel 9 | Channel 8 | Channel 9 | Channel 27 | Channel 9 |
| 8 | Channel 8 | Channel 11 | Channel 8 | Channel 9 | Channel 8 | Channel 26 | Channel 8 |
| 7 | Channel 7 | Channel 10 | Channel 7 | Channel 6 | Channel 7 | Channel 25 | Channel 7 |
| 6 | Channel 6 | Channel 9 | Channel 6 | Channel 7 | Channel 6 | Channel 24 | Channel 6 |
| 5 | Channel 5 | Channel 2 | Channel 5 | Channel 4 | Channel 5 | Channel 23 | Channel 5 |
| 4 | Channel 4 | Channel 1 | Channel 4 | Channel 5 | Channel 4 | Channel 22 | Channel 4 |
| 3 | Channel 3 | Channel 0 | Channel 3 | Channel 2 | Channel 3 | Channel 21 | Channel 3 |
| 2 | Channel 2 | Channel 5 | Channel 2 | Channel 3 | Channel 2 | Channel 20 | Channel 2 |
| 1 | Channel 1 | Channel 4 | Channel 1 | Channel 0 | Channel 1 | Channel 19 | Channel 1 |
| 0 | Channel 0 | Channel 3 | Channel 0 | Channel 1 | Channel 0 | Channel 18 | Channel 0 |

FIG. 16

| Subcarrier index | Symbol group 0 | Symbol group 1 | Symbol group 2 | Symbol group 3 | Symbol group 4 |
|---|---|---|---|---|---|
| 35 | Channel 35 | Channel 34 | Channel 35 | Channel 17 | Channel 35 |
| 34 | Channel 34 | Channel 35 | Channel 34 | Channel 16 | Channel 34 |
| 33 | Channel 33 | Channel 32 | Channel 33 | Channel 15 | Channel 33 |
| 32 | Channel 32 | Channel 33 | Channel 32 | Channel 14 | Channel 32 |
| 31 | Channel 31 | Channel 30 | Channel 31 | Channel 13 | Channel 31 |
| 30 | Channel 30 | Channel 31 | Channel 30 | Channel 12 | Channel 30 |
| 29 | Channel 29 | Channel 28 | Channel 29 | Channel 11 | Channel 29 |
| 28 | Channel 28 | Channel 29 | Channel 28 | Channel 10 | Channel 28 |
| 27 | Channel 27 | Channel 26 | Channel 27 | Channel 9 | Channel 27 |
| 26 | Channel 26 | Channel 27 | Channel 26 | Channel 8 | Channel 26 |
| 25 | Channel 25 | Channel 24 | Channel 25 | Channel 7 | Channel 25 |
| 24 | Channel 24 | Channel 25 | Channel 24 | Channel 6 | Channel 24 |
| 23 | Channel 23 | Channel 22 | Channel 23 | Channel 5 | Channel 23 |
| 22 | Channel 22 | Channel 23 | Channel 22 | Channel 4 | Channel 22 |
| 21 | Channel 21 | Channel 20 | Channel 21 | Channel 3 | Channel 21 |
| 20 | Channel 20 | Channel 21 | Channel 20 | Channel 2 | Channel 20 |
| 19 | Channel 19 | Channel 18 | Channel 19 | Channel 1 | Channel 19 |
| 18 | Channel 18 | Channel 19 | Channel 18 | Channel 0 | Channel 18 |
| 17 | Channel 17 | Channel 16 | Channel 17 | Channel 35 | Channel 17 |
| 16 | Channel 16 | Channel 17 | Channel 16 | Channel 34 | Channel 16 |
| 15 | Channel 15 | Channel 14 | Channel 15 | Channel 33 | Channel 15 |
| 14 | Channel 14 | Channel 15 | Channel 14 | Channel 32 | Channel 14 |
| 13 | Channel 13 | Channel 12 | Channel 13 | Channel 31 | Channel 13 |
| 12 | Channel 12 | Channel 13 | Channel 12 | Channel 30 | Channel 12 |
| 11 | Channel 11 | Channel 10 | Channel 11 | Channel 29 | Channel 11 |
| 10 | Channel 10 | Channel 11 | Channel 10 | Channel 28 | Channel 10 |
| 9 | Channel 9 | Channel 8 | Channel 9 | Channel 27 | Channel 9 |
| 8 | Channel 8 | Channel 9 | Channel 8 | Channel 26 | Channel 8 |
| 7 | Channel 7 | Channel 6 | Channel 7 | Channel 25 | Channel 7 |
| 6 | Channel 6 | Channel 7 | Channel 6 | Channel 24 | Channel 6 |
| 5 | Channel 5 | Channel 4 | Channel 5 | Channel 23 | Channel 5 |
| 4 | Channel 4 | Channel 5 | Channel 4 | Channel 22 | Channel 4 |
| 3 | Channel 3 | Channel 2 | Channel 3 | Channel 21 | Channel 3 |
| 2 | Channel 2 | Channel 3 | Channel 2 | Channel 20 | Channel 2 |
| 1 | Channel 1 | Channel 0 | Channel 1 | Channel 19 | Channel 1 |
| 0 | Channel 0 | Channel 1 | Channel 0 | Channel 18 | Channel 0 |

FIG. 17

Subcarrier index

| | Symbol group 0 | Symbol group 1 | Symbol group 2 | Symbol group 3 | Symbol group 4 |
|---|---|---|---|---|---|
| 35 | Channel 35 | Channel 34 | Channel 16 | Channel 34 | Channel 35 |
| 34 | Channel 34 | Channel 35 | Channel 17 | Channel 35 | Channel 34 |
| 33 | Channel 33 | Channel 32 | Channel 14 | Channel 32 | Channel 33 |
| 32 | Channel 32 | Channel 33 | Channel 15 | Channel 33 | Channel 32 |
| 31 | Channel 31 | Channel 30 | Channel 12 | Channel 30 | Channel 31 |
| 30 | Channel 30 | Channel 31 | Channel 13 | Channel 31 | Channel 30 |
| 29 | Channel 29 | Channel 28 | Channel 10 | Channel 28 | Channel 29 |
| 28 | Channel 28 | Channel 29 | Channel 11 | Channel 29 | Channel 28 |
| 27 | Channel 27 | Channel 26 | Channel 8 | Channel 26 | Channel 27 |
| 26 | Channel 26 | Channel 27 | Channel 9 | Channel 27 | Channel 26 |
| 25 | Channel 25 | Channel 24 | Channel 6 | Channel 24 | Channel 25 |
| 24 | Channel 24 | Channel 25 | Channel 7 | Channel 25 | Channel 24 |
| 23 | Channel 23 | Channel 22 | Channel 4 | Channel 22 | Channel 23 |
| 22 | Channel 22 | Channel 23 | Channel 5 | Channel 23 | Channel 22 |
| 21 | Channel 21 | Channel 20 | Channel 2 | Channel 20 | Channel 21 |
| 20 | Channel 20 | Channel 21 | Channel 3 | Channel 21 | Channel 20 |
| 19 | Channel 19 | Channel 18 | Channel 0 | Channel 18 | Channel 19 |
| 18 | Channel 18 | Channel 19 | Channel 1 | Channel 19 | Channel 18 |
| 17 | Channel 17 | Channel 16 | Channel 34 | Channel 16 | Channel 17 |
| 16 | Channel 16 | Channel 17 | Channel 35 | Channel 17 | Channel 16 |
| 15 | Channel 15 | Channel 14 | Channel 32 | Channel 14 | Channel 15 |
| 14 | Channel 14 | Channel 15 | Channel 33 | Channel 15 | Channel 14 |
| 13 | Channel 13 | Channel 12 | Channel 30 | Channel 12 | Channel 13 |
| 12 | Channel 12 | Channel 13 | Channel 31 | Channel 13 | Channel 12 |
| 11 | Channel 11 | Channel 10 | Channel 28 | Channel 10 | Channel 11 |
| 10 | Channel 10 | Channel 11 | Channel 29 | Channel 11 | Channel 10 |
| 9 | Channel 9 | Channel 8 | Channel 26 | Channel 8 | Channel 9 |
| 8 | Channel 8 | Channel 9 | Channel 27 | Channel 9 | Channel 8 |
| 7 | Channel 7 | Channel 6 | Channel 24 | Channel 6 | Channel 7 |
| 6 | Channel 6 | Channel 7 | Channel 25 | Channel 7 | Channel 6 |
| 5 | Channel 5 | Channel 4 | Channel 22 | Channel 4 | Channel 5 |
| 4 | Channel 4 | Channel 5 | Channel 23 | Channel 5 | Channel 4 |
| 3 | Channel 3 | Channel 2 | Channel 20 | Channel 2 | Channel 3 |
| 2 | Channel 2 | Channel 3 | Channel 21 | Channel 3 | Channel 2 |
| 1 | Channel 1 | Channel 0 | Channel 18 | Channel 0 | Channel 1 |
| 0 | Channel 0 | Channel 1 | Channel 19 | Channel 1 | Channel 0 |

FIG. 18

| Subcarrier index | Symbol group 0 | Symbol group 1 | Symbol group 2 | Symbol group 3 | Symbol group 4 |
|---|---|---|---|---|---|
| 35 | Channel 35 | Channel 34 | Channel 16 | Channel 17 | Channel 35 |
| 34 | Channel 34 | Channel 35 | Channel 17 | Channel 16 | Channel 34 |
| 33 | Channel 33 | Channel 32 | Channel 14 | Channel 15 | Channel 33 |
| 32 | Channel 32 | Channel 33 | Channel 15 | Channel 14 | Channel 32 |
| 31 | Channel 31 | Channel 30 | Channel 12 | Channel 13 | Channel 31 |
| 30 | Channel 30 | Channel 31 | Channel 13 | Channel 12 | Channel 30 |
| 29 | Channel 29 | Channel 28 | Channel 10 | Channel 11 | Channel 29 |
| 28 | Channel 28 | Channel 29 | Channel 11 | Channel 10 | Channel 28 |
| 27 | Channel 27 | Channel 26 | Channel 8 | Channel 9 | Channel 27 |
| 26 | Channel 26 | Channel 27 | Channel 9 | Channel 8 | Channel 26 |
| 25 | Channel 25 | Channel 24 | Channel 6 | Channel 7 | Channel 25 |
| 24 | Channel 24 | Channel 25 | Channel 7 | Channel 6 | Channel 24 |
| 23 | Channel 23 | Channel 22 | Channel 4 | Channel 5 | Channel 23 |
| 22 | Channel 22 | Channel 23 | Channel 5 | Channel 4 | Channel 22 |
| 21 | Channel 21 | Channel 20 | Channel 2 | Channel 3 | Channel 21 |
| 20 | Channel 20 | Channel 21 | Channel 3 | Channel 2 | Channel 20 |
| 19 | Channel 19 | Channel 18 | Channel 0 | Channel 1 | Channel 19 |
| 18 | Channel 18 | Channel 19 | Channel 1 | Channel 0 | Channel 18 |
| 17 | Channel 17 | Channel 16 | Channel 34 | Channel 35 | Channel 17 |
| 16 | Channel 16 | Channel 17 | Channel 35 | Channel 34 | Channel 16 |
| 15 | Channel 15 | Channel 14 | Channel 32 | Channel 33 | Channel 15 |
| 14 | Channel 14 | Channel 15 | Channel 33 | Channel 32 | Channel 14 |
| 13 | Channel 13 | Channel 12 | Channel 30 | Channel 31 | Channel 13 |
| 12 | Channel 12 | Channel 13 | Channel 31 | Channel 30 | Channel 12 |
| 11 | Channel 11 | Channel 10 | Channel 28 | Channel 29 | Channel 11 |
| 10 | Channel 10 | Channel 11 | Channel 29 | Channel 28 | Channel 10 |
| 9 | Channel 9 | Channel 8 | Channel 26 | Channel 27 | Channel 9 |
| 8 | Channel 8 | Channel 9 | Channel 27 | Channel 26 | Channel 8 |
| 7 | Channel 7 | Channel 6 | Channel 24 | Channel 25 | Channel 7 |
| 6 | Channel 6 | Channel 7 | Channel 25 | Channel 24 | Channel 6 |
| 5 | Channel 5 | Channel 4 | Channel 22 | Channel 23 | Channel 5 |
| 4 | Channel 4 | Channel 5 | Channel 23 | Channel 22 | Channel 4 |
| 3 | Channel 3 | Channel 2 | Channel 20 | Channel 21 | Channel 3 |
| 2 | Channel 2 | Channel 3 | Channel 21 | Channel 20 | Channel 2 |
| 1 | Channel 1 | Channel 0 | Channel 18 | Channel 19 | Channel 1 |
| 0 | Channel 0 | Channel 1 | Channel 19 | Channel 18 | Channel 0 |

FIG. 19

| Subcarrier index | Symbol group 0 | Symbol group 1 | Symbol group 2 | Symbol group 3 | Symbol group 4 | Symbol group 5 | Symbol group 6 |
|---|---|---|---|---|---|---|---|
| 35 | | | Channel 33 | | | Channel 17 | |
| 34 | | Channel 33 | Channel 32 | Channel 33 | | Channel 16 | |
| 33 | Channel 33 | Channel 32 | Channel 31 | Channel 32 | Channel 33 | Channel 15 | Channel 33 |
| 32 | Channel 32 | Channel 31 | Channel 30 | Channel 31 | Channel 32 | Channel 14 | Channel 32 |
| 31 | Channel 31 | Channel 30 | Channel 29 | Channel 30 | Channel 31 | Channel 13 | Channel 31 |
| 30 | Channel 30 | Channel 29 | Channel 28 | Channel 29 | Channel 30 | Channel 12 | Channel 30 |
| 29 | Channel 29 | Channel 28 | Channel 27 | Channel 28 | Channel 29 | Channel 11 | Channel 29 |
| 28 | Channel 28 | Channel 27 | Channel 26 | Channel 27 | Channel 28 | Channel 10 | Channel 28 |
| 27 | Channel 27 | Channel 26 | Channel 25 | Channel 26 | Channel 27 | Channel 9 | Channel 27 |
| 26 | Channel 26 | Channel 25 | Channel 24 | Channel 25 | Channel 26 | Channel 8 | Channel 26 |
| 25 | Channel 25 | Channel 24 | Channel 23 | Channel 24 | Channel 25 | Channel 7 | Channel 25 |
| 24 | Channel 24 | Channel 23 | Channel 22 | Channel 23 | Channel 24 | Channel 6 | Channel 24 |
| 23 | Channel 23 | Channel 22 | Channel 21 | Channel 22 | Channel 23 | Channel 5 | Channel 23 |
| 22 | Channel 22 | Channel 21 | Channel 20 | Channel 21 | Channel 22 | Channel 4 | Channel 22 |
| 21 | Channel 21 | Channel 20 | Channel 19 | Channel 20 | Channel 21 | Channel 3 | Channel 21 |
| 20 | Channel 20 | Channel 19 | Channel 18 | Channel 19 | Channel 20 | Channel 2 | Channel 20 |
| 19 | Channel 19 | Channel 18 | Channel 17 | Channel 18 | Channel 19 | Channel 1 | Channel 19 |
| 18 | Channel 18 | Channel 17 | Channel 16 | Channel 17 | Channel 18 | Channel 0 | Channel 18 |
| 17 | Channel 17 | Channel 16 | Channel 15 | Channel 16 | Channel 17 | | Channel 17 |
| 16 | Channel 16 | Channel 15 | Channel 14 | Channel 15 | Channel 16 | | Channel 16 |
| 15 | Channel 15 | Channel 14 | Channel 13 | Channel 14 | Channel 15 | Channel 33 | Channel 15 |
| 14 | Channel 14 | Channel 13 | Channel 12 | Channel 13 | Channel 14 | Channel 32 | Channel 14 |
| 13 | Channel 13 | Channel 12 | Channel 11 | Channel 12 | Channel 13 | Channel 31 | Channel 13 |
| 12 | Channel 12 | Channel 11 | Channel 10 | Channel 11 | Channel 12 | Channel 30 | Channel 12 |
| 11 | Channel 11 | Channel 10 | Channel 9 | Channel 10 | Channel 11 | Channel 29 | Channel 11 |
| 10 | Channel 10 | Channel 9 | Channel 8 | Channel 9 | Channel 10 | Channel 28 | Channel 10 |
| 9 | Channel 9 | Channel 8 | Channel 7 | Channel 8 | Channel 9 | Channel 27 | Channel 9 |
| 8 | Channel 8 | Channel 7 | Channel 6 | Channel 7 | Channel 8 | Channel 26 | Channel 8 |
| 7 | Channel 7 | Channel 6 | Channel 5 | Channel 6 | Channel 7 | Channel 25 | Channel 7 |
| 6 | Channel 6 | Channel 5 | Channel 4 | Channel 5 | Channel 6 | Channel 24 | Channel 6 |
| 5 | Channel 5 | Channel 4 | Channel 3 | Channel 4 | Channel 5 | Channel 23 | Channel 5 |
| 4 | Channel 4 | Channel 3 | Channel 2 | Channel 3 | Channel 4 | Channel 22 | Channel 4 |
| 3 | Channel 3 | Channel 2 | Channel 1 | Channel 2 | Channel 3 | Channel 21 | Channel 3 |
| 2 | Channel 2 | Channel 1 | Channel 0 | Channel 1 | Channel 2 | Channel 20 | Channel 2 |
| 1 | Channel 1 | Channel 0 | | Channel 0 | Channel 1 | Channel 19 | Channel 1 |
| 0 | Channel 0 | | | | Channel 0 | Channel 18 | Channel 0 |

| Subcarrier index | Symbol group 0 | Symbol group 1 | Symbol group 2 | Symbol group 3 | Symbol group 4 | Symbol group 5 | Symbol group 6 | Symbol group 7 | Symbol group 8 |
|---|---|---|---|---|---|---|---|---|---|
| 35 | | | | Channel 32 | | | | Channel 17 | |
| 34 | | | Channel 32 | Channel 31 | Channel 32 | | | Channel 16 | |
| 33 | | Channel 32 | Channel 31 | Channel 30 | Channel 31 | Channel 32 | | Channel 15 | |
| 32 | Channel 32 | Channel 31 | Channel 30 | Channel 29 | Channel 30 | Channel 31 | Channel 32 | Channel 14 | Channel 32 |
| 31 | Channel 31 | Channel 30 | Channel 29 | Channel 28 | Channel 29 | Channel 30 | Channel 31 | Channel 13 | Channel 31 |
| 30 | Channel 30 | Channel 29 | Channel 28 | Channel 27 | Channel 28 | Channel 29 | Channel 30 | Channel 12 | Channel 30 |
| 29 | Channel 29 | Channel 28 | Channel 27 | Channel 26 | Channel 27 | Channel 28 | Channel 29 | Channel 11 | Channel 29 |
| 28 | Channel 28 | Channel 27 | Channel 26 | Channel 25 | Channel 26 | Channel 27 | Channel 28 | Channel 10 | Channel 28 |
| 27 | Channel 27 | Channel 26 | Channel 25 | Channel 24 | Channel 25 | Channel 26 | Channel 27 | Channel 9 | Channel 27 |
| 26 | Channel 26 | Channel 25 | Channel 24 | Channel 23 | Channel 24 | Channel 25 | Channel 26 | Channel 8 | Channel 26 |
| 25 | Channel 25 | Channel 24 | Channel 23 | Channel 22 | Channel 23 | Channel 24 | Channel 25 | Channel 7 | Channel 25 |
| 24 | Channel 24 | Channel 23 | Channel 22 | Channel 21 | Channel 22 | Channel 23 | Channel 24 | Channel 6 | Channel 24 |
| 23 | Channel 23 | Channel 22 | Channel 21 | Channel 20 | Channel 21 | Channel 22 | Channel 23 | Channel 5 | Channel 23 |
| 22 | Channel 22 | Channel 21 | Channel 20 | Channel 19 | Channel 20 | Channel 21 | Channel 22 | Channel 4 | Channel 22 |
| 21 | Channel 21 | Channel 20 | Channel 19 | Channel 18 | Channel 19 | Channel 20 | Channel 21 | Channel 3 | Channel 21 |
| 20 | Channel 20 | Channel 19 | Channel 18 | Channel 17 | Channel 18 | Channel 19 | Channel 20 | Channel 2 | Channel 20 |
| 19 | Channel 19 | Channel 18 | Channel 17 | Channel 16 | Channel 17 | Channel 18 | Channel 19 | Channel 1 | Channel 19 |
| 18 | Channel 18 | Channel 17 | Channel 16 | Channel 15 | Channel 16 | Channel 17 | Channel 18 | Channel 0 | Channel 18 |
| 17 | Channel 17 | Channel 16 | Channel 15 | Channel 14 | Channel 15 | Channel 16 | Channel 17 | | Channel 17 |
| 16 | Channel 16 | Channel 15 | Channel 14 | Channel 13 | Channel 14 | Channel 15 | Channel 16 | | Channel 16 |
| 15 | Channel 15 | Channel 14 | Channel 13 | Channel 12 | Channel 13 | Channel 14 | Channel 15 | | Channel 15 |
| 14 | Channel 14 | Channel 13 | Channel 12 | Channel 11 | Channel 12 | Channel 13 | Channel 14 | Channel 32 | Channel 14 |
| 13 | Channel 13 | Channel 12 | Channel 11 | Channel 10 | Channel 11 | Channel 12 | Channel 13 | Channel 31 | Channel 13 |
| 12 | Channel 12 | Channel 11 | Channel 10 | Channel 9 | Channel 10 | Channel 11 | Channel 12 | Channel 30 | Channel 12 |
| 11 | Channel 11 | Channel 10 | Channel 9 | Channel 8 | Channel 9 | Channel 10 | Channel 11 | Channel 29 | Channel 11 |
| 10 | Channel 10 | Channel 9 | Channel 8 | Channel 7 | Channel 8 | Channel 9 | Channel 10 | Channel 28 | Channel 10 |
| 9 | Channel 9 | Channel 8 | Channel 7 | Channel 6 | Channel 7 | Channel 8 | Channel 9 | Channel 27 | Channel 9 |
| 8 | Channel 8 | Channel 7 | Channel 6 | Channel 5 | Channel 6 | Channel 7 | Channel 8 | Channel 26 | Channel 8 |
| 7 | Channel 7 | Channel 6 | Channel 5 | Channel 4 | Channel 5 | Channel 6 | Channel 7 | Channel 25 | Channel 7 |
| 6 | Channel 6 | Channel 5 | Channel 4 | Channel 3 | Channel 4 | Channel 5 | Channel 6 | Channel 24 | Channel 6 |
| 5 | Channel 5 | Channel 4 | Channel 3 | Channel 2 | Channel 3 | Channel 4 | Channel 5 | Channel 23 | Channel 5 |
| 4 | Channel 4 | Channel 3 | Channel 2 | Channel 1 | Channel 2 | Channel 3 | Channel 4 | Channel 22 | Channel 4 |
| 3 | Channel 3 | Channel 2 | Channel 1 | Channel 0 | Channel 1 | Channel 2 | Channel 3 | Channel 21 | Channel 3 |
| 2 | Channel 2 | Channel 1 | Channel 0 | | Channel 0 | Channel 1 | Channel 2 | Channel 20 | Channel 2 |
| 1 | Channel 1 | Channel 0 | | | | Channel 0 | Channel 1 | Channel 19 | Channel 1 |
| 0 | Channel 0 | | | | | | Channel 0 | Channel 18 | Channel 0 |

| R | Timing Advance Command | Oct 1 |
| Timing Advance Command | UL Grant | Oct 2 |
| UL Grant | Oct 3 |
| UL Grant | R | Oct 4 |
| Temporary C-RNTI | Oct 5 |
| Temporary C-RNTI | Oct 6 |

FIG. 25

SIGNAL TRANSMISSION METHOD AND APPARATUS, AND STORAGE MEDIUM AND ELECTRONIC APPARATUS

CROSS REFERENCES AND RELATED PATENT APPLICATIONS

This patent document is a continuation of International Patent Application No. PCT/CN2019/086243 entitled "SIGNAL TRANSMISSION METHOD AND APPARATUS, AND STORAGE MEDIUM AND ELECTRONIC APPARATUS", filed on May 9, 2019, which claims priority to and benefits of Chinese Patent Application No. 201810445194.4 filed with the CNIPA on May 10, 2018, the disclosures of which are incorporated herein by reference in their entireties.

This application claims priority to Chinese Patent Application No. 201810445194.4 filed with the CNIPA on May 10, 2018, disclosure of which is incorporated herein by reference in its entirety.

TECHNICAL FIELD

The present disclosure relates to the field of communications and relates, for example, to a signal transmitting method and apparatus, a storage medium and an electronic apparatus.

BACKGROUND

At present, machine type communication (MTC) user equipment (UE) (hereinafter referred to as MTC UE), also known as machine to machine (M2M) UE, is the main application form of the internet of things. Several techniques applicable to the cellular internet of things are disclosed in the technical report TR45.820 of the 3rd generation partnership project (3GPP). The cellular-based narrow band internet of things (NB-IoT) technique is the most attractive among the several techniques.

In the existing NB-IoT technique, there is no complete solution for the design and implementation of an uplink synchronization signal supporting an NB-IOT user equipment within a large cell (for example, a cell with a radius exceeding 100 km).

In 3GPP release 13 and release 14, an NB-IoT system can only operate in a frequency division duplex (FDD) mode. In industry, there is no complete solution for an NB-IOT system supporting the coverage of the large cell (for example, the cell with a radius exceeding 100 km) or supporting time division duplex (TDD). That is, in the related art, a signal based on the NB-IoT system failing to support the coverage of the large cell or failing to operate in the time division duplex mode becomes a problem.

As regards the above problem, no effective solution has yet been proposed in the related art.

SUMMARY

Embodiments of the present disclosure provide a signal transmitting method and apparatus, a storage medium and an electronic apparatus, so as to solve at least the problem that a signal based on an NB-IoT system fails to support the coverage of a large cell, or operate in a time division duplex mode in the related art.

An embodiment of the present disclosure provides a signal transmitting method. The method includes transmitting a first signal. The first signal includes at least one symbol group.

Another embodiment of the present disclosure further provides a signal transmitting apparatus. The apparatus includes a transmitting module. The transmitting module is configured to transmit a first signal. The first signal includes at least one symbol group.

Another embodiment of the present disclosure further provides a signal receiving apparatus. The apparatus includes a receiving module. The receiving module is configured to receive a first signal. The first signal includes at least one symbol group.

Another embodiment of the present disclosure further provides a storage medium. The storage medium stores a computer program. The computer program is configured to, when running, perform the steps of the method according to the embodiments.

Another embodiment of the present disclosure further provides an electronic apparatus. The electronic apparatus includes a memory and a processor. The memory stores a computer program. The processor is configured to execute the computer program to perform the steps of the method according to the embodiments.

In the present disclosure, a terminal configures a first signal to include at least one symbol group in response to transmitting the first signal to a base station. Therefore, the problem that a signal based on the NB-IoT system fails to support the coverage of the large cell, or operate in the time division duplex mode in the related art can be solved, and the effect that the signal based on the NB-IoT system can support the coverage of the large cell and operate in the time division duplex mode can be achieved.

BRIEF DESCRIPTION OF DRAWINGS

The drawings described herein are used to provide a further understanding of the present disclosure and form a part of the present application. The illustrative embodiments of the present disclosure and the description thereof are used to explain the present disclosure and not to limit the present disclosure in an improper manner. In the drawings:

FIG. 8 is schematic diagram 1 of resource allocation according to an embodiment of the present disclosure;

FIG. 9 is schematic diagram 2 of resource allocation according to an embodiment of the present disclosure;

FIG. 10 is schematic diagram 3 of resource allocation according to an embodiment of the present disclosure;

FIG. 11 is schematic diagram 4 of resource allocation according to an embodiment of the present disclosure;

FIG. 12 is schematic diagram 5 of resource allocation according to an embodiment of the present disclosure;

FIG. 15 is schematic diagram 7 of resource allocation according to an embodiment of the present disclosure;

FIG. 16 is schematic diagram 8 of resource allocation according to an embodiment of the present disclosure;

FIG. 17 is schematic diagram 9 of resource allocation according to an embodiment of the present disclosure;

FIG. 18 is schematic diagram 10 of resource allocation according to an embodiment of the present disclosure;

FIG. 19 is schematic diagram 11 of resource allocation according to an embodiment of the present disclosure;

FIG. 20 is schematic diagram 12 of resource allocation according to an embodiment of the present disclosure;

FIG. 21 is schematic diagram 13 of resource allocation according to an embodiment of the present disclosure;

FIG. 25 is a structure diagram of an MAC RAR according to an embodiment of the present disclosure.

DETAILED DESCRIPTION

The present disclosure will be hereinafter described in detail with reference to drawings in conjunction with embodiments. It is to be noted that if not in collision, the embodiments described herein and features in the embodiments may be combined with each other.

It is to be noted that the terms "first", "second" and the like in the description, claims and the drawings of the present disclosure are used to distinguish between similar objects and are not necessarily used to describe a particular order or sequence.

Embodiment One

Figures 1, 2, 3:
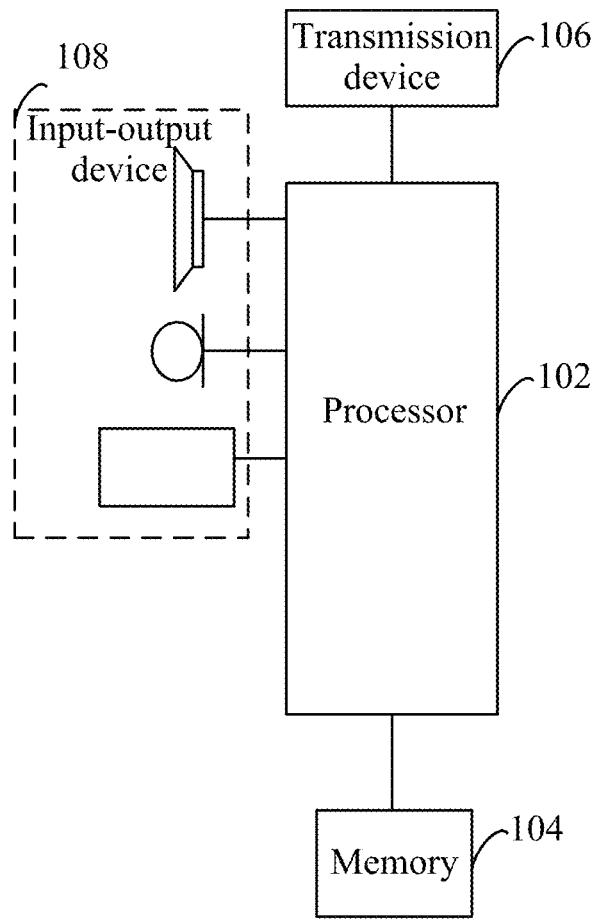
FIG. 1 is a hardware block diagram of a mobile terminal for a signal transmitting method according to embodiments of the present disclosure.
FIG. 2 is a flowchart of a signal transmitting method according to embodiments of the present disclosure.
FIG. 3 is a flowchart of a signal receiving method according to embodiments of the present disclosure.

A method provided in embodiment one of the present application may be performed in a mobile terminal, a computer terminal or other similar computing apparatuses. Tacking a method performed in the mobile terminal as an example, FIG. 1 is a hardware block diagram of a mobile terminal of a signal transmitting method according to an embodiment of the present disclosure. As shown in FIG. 1, the mobile terminal 10 may include one or more (only one is shown in FIG. 1) processors 102 (the processors 102 may include, but are not limited to, a microcontroller unit (MCU), a field programmable gate array (FPGA) and other processing apparatuses), and also includes a memory 104 for storing data. Optionally, the mobile terminal may further include a transmission device 106 for a communication function, and an input-output device 108. It is to be understood by those skilled in the art that the structure shown in FIG. 1 is merely illustrative and not intended to limit the structure of the mobile terminal. For example, the mobile terminal 10 may further include more or fewer components than the components shown in FIG. 1, or may have a configuration different from the configuration shown in FIG. 1.

The memory 104 may be configured to store a computer program, such as a software program and a module of application software, for example, a computer program corresponding to the method in the embodiment of the present application. The processors 102 execute the software program stored in the memory 104, so as to perform various functional applications and data processing, that is, to perform the above method. The memory 104 may include a high-speed random access memory, or may further include a nonvolatile memory, such as one or more magnetic storage apparatuses, flash memories or other nonvolatile solid-state memories. In some examples, the memory 104 may further include memories that are remotely disposed with respect to the processors 102. These remote memories may be connected to the mobile terminal 10 via a network. Examples of the network include, but are not limited to, the Internet, an intranet, a local area network, a mobile communication network and a combination thereof.

The transmission apparatus 106 is configured to receive or transmit data via the network. Specific examples of the network may include a wireless network provided by a communication provider of the mobile terminal 10. In an example, the transmission apparatus 106 includes a network interface controller (NIC). The NIC may be connected to other network devices via a base station, and thus communicate with the Internet. In an example, the transmission apparatus 106 may be a radio frequency (RF) module. The RF module is configured to communicate with the Internet in a wireless way.

This embodiment provides a signal transmitting method. FIG. 2 is a flowchart of a signal transmitting method according to an embodiment of the present disclosure. As shown in FIG. 2, the method includes the step described below.

In step S202, a first signal is transmitted. The first signal includes one or more symbol groups.

Through the above step, the terminal configures a first signal to include at least one symbol group in response to transmitting the first signal to a base station. Therefore, the problem that a signal based on the NB-IoT system fails to support the coverage of the large cell, or operate in the time division duplex mode in the related art can be solved, and the effect that the signal based on the NB-IoT system can support the coverage of the large cell and operate in the time division duplex mode can be achieved.

Optionally, the above step may be performed by one terminal or a group of terminals, but is not limited to this.

In this embodiment, each symbol group includes one of: a cyclic prefix and at least one symbol, a cyclic prefix, at least one symbol and a protection period; and each symbol group occupies the same subcarrier in frequency domain or occupies the same frequency resource.

In an optional embodiment, in the case where the first signal includes six symbol groups, the difference between subcarrier indexes occupied by each of adjacent symbol groups of the six symbol groups includes at least one of a1, −a1, a2, −a2, a3 or −a3, where a1, a2 and a3 are all integers greater than or equal to 1, a1 is less than or equal to a2, and a2 is less than or equal to a3. In this embodiment, adjacent symbol groups refer to symbol groups having adjacent indexes, and time domain resource positions occupied by two adjacent symbol groups may be adjacent in time domain or discrete in the time domain and, preferably, be adjacent in the time domain Additionally, subcarriers occupied by each symbol group may be determined according to a subcarrier index. Each subcarrier occupies a specific frequency domain resource, and thus, a frequency domain resource position occupied by each subcarrier may be calculated. Preferably, subcarrier spacing is 1.25 kHz. According to the above configuration, the difference between frequency domain resource positions occupied by two adjacent symbol groups may include +/−1.25 kHz, +/−3.75 kHz and +/−22.5 kHz. The above difference may be any one of a1, −a1, a2, −a2, a3, −a3 or any combination thereof. For example, the difference between a first symbol group and a second symbol group of the six symbol groups is a1 or −a1.

In an optional embodiment, subcarrier indexes occupied by the six symbol groups include one of the following cases or any combination thereof: k, k+a1, k, k−a2, k and k+a3; k, k−a1, k, k−a2, k and k+a3; k, k+a1, k, k+a2, k and k+a3; k, k−a1, k, k+a2, k and k+a3; k, k+a1, k, k−a2, k and k−a3; k, k−a1, k, k−a2, k and k−a3; k, k+a1, k, k+a2, k and k−a3; or k, k−a1, k, k+a2, k and k−a3, where k is an integer greater than or equal to 0. In this embodiment, the above is merely a preferred configuration, and other configurations are described in detail in specific embodiments. For example, a subcarrier index occupied by the first symbol group of the six symbol groups above is k or k+a1, or any one of the above indexes.

In an optional embodiment, after the step of transmitting the first signal to the base station, the method further includes transmitting the first signal in the following manner in a case where an absolute value of a difference between subcarrier indexes occupied by two adjacent symbol groups in a (2n−1)-th transmission of the first signal is a3 and the difference between the subcarrier indexes occupied by two adjacent symbol groups in the (2n−1)-th transmission of the first signal is a3, the absolute value of the difference between the subcarrier indexes occupied by two adjacent symbol groups in a (2n)-th transmission of the first signal is a3 and the difference between the subcarrier indexes occupied by two adjacent symbol groups in the (2n)-th transmission of the first signal is −a3; or in a case where an absolute value of a difference between subcarrier indexes occupied by two adjacent symbol groups in a (2n−1)-th transmission of the first signal is a3 and the difference between the subcarrier indexes occupied by two adjacent symbol groups in the (2n−1)-th transmission of the first signal is −a3, the absolute value of the difference between the subcarrier indexes occupied by two adjacent symbol groups in a (2n)-th transmission of the first signal is a3 and the difference between the subcarrier indexes occupied by two adjacent symbol groups in the (2n)-th transmission of the first signal is a3, where n is an integer greater than or equal to 1. In this embodiment, in the case where n is equal to 1, the (2n−1)-th transmission is a first transmission, and in the case where n is greater than 1, the (2n−1)-th transmission is a retransmission of the first signal. In the above, the first signal is transmitted on the premise that the first signal supports to be retransmitted. The number of symbol groups included in the first signal may be the same or different in retransmissions of the first signal each time. The retransmission of the first signal includes transmitting exactly the same first signal each time, or transmitting a different first signal each time. The absolute value of the difference of the subcarrier indexes occupied by two adjacent symbol groups is a3. For example, the difference between the subcarrier index occupied by a first symbol group and the subcarrier index occupied by a second symbol group is 3 or may be other values. a3 is a value relatively greater than a1 and a2, and can more clearly indicate the difference between the subcarrier indexes occupied by the adjacent symbol groups.

In an optional embodiment, in the transmissions of the first signal, in the case where the subcarrier index occupied by a first symbol group is selected from set 1 in the (2n−1)-th transmission of the first signal, subcarriers occupied by a first symbol group in the (2n)-th transmission of the first signal are selected from set 2. Set 1 and set 2 satisfy at least one of following relationships: in response to that set 1 comprises subcarrier 0 to subcarrier 17, set 2 comprises subcarrier 18 to subcarrier 35; or in response to that set 1 comprises subcarrier 18 to subcarrier 35, set 2 comprises subcarrier 0 to subcarrier 17.

In an optional embodiment, in the transmissions of the first signal, the method includes that: in the case where a subcarrier index occupied by a last symbol group in the (2n−1)-th transmission of the first signal is selected from set 3, the subcarrier occupied by a first symbol group in a (2n)-th transmission of the first signal is selected from set 4. Set 3 and set 4 satisfy at least one of following relationships: in response to that set 3 comprises subcarrier 0 to subcarrier 17, set 4 comprises subcarrier 0 to subcarrier 17; or in response to that set 3 comprises subcarrier 18 to subcarrier 35, set 4 comprises subcarrier 18 to subcarrier 35. In this embodiment, the (2n−1)-th transmission and the (2n)-th transmission are two adjacent transmissions. The above defines the correspondence between set 3 and set 4, and is not limited to defining whether set 3 is equal to set 4.

In an optional embodiment, in response to that the first signal supports to be retransmitted, the first signal in a (2n−1)-th transmission includes six symbol groups, and the first signal in a (2n)-th transmission includes five symbol groups, where n is an integer greater than or equal to 1. In this embodiment, the number of symbol groups in the transmitted first signal is different each time. The six symbol groups in the (2n−1)-th transmission may be completely different from the five symbol groups in the $2n^{th}$ transmission. Alternatively, the six symbol groups in the (2n−1)-th transmission may include the five symbol groups in the $2n^{th}$ transmission.

In an optional embodiment, the first signal may include seven symbol groups, and the difference between subcarrier indexes occupied by each of adjacent symbol groups of the seven symbol groups includes at least one of a1, −a1, a2, −a2, a3 or −a3. a1, a2 and a3 are all integers greater than or equal to 1. a1 is less than or equal to a2. a2 is less than or equal to a3.

In an optional embodiment, subcarrier indexes occupied by the seven symbol groups include one or more of the following cases: k, k+a1, k, k−a2, k, k+a3 and k; k, k−a1, k, k−a2, k, k+a3 and k; k, k+a1, k, k+a2, k, k+a3 and k; k, k−a1, k, k+a2, k, k+a3 and k; k, k+a1, k, k−a2, k, k−a3 and k; k, k−a1, k, k−a2, k, k−a3 and k; k, k+a1, k, k+a2, k, k−a3 and k; or k, k−a1, k, k+a2, k, k−a3 and k. k is an integer greater than or equal to 0. In this embodiment, a subcarrier index occupied by a first symbol group of the seven symbol groups is k or k+a1, or any one of the above values.

In an optional embodiment, the first signal may include five symbol groups, and the difference between subcarrier indexes occupied by each of adjacent symbol groups of the five symbol groups may be determined from one or more of the following values: b1, −b1, b2 or −b2. For example, the difference between subcarrier indexes occupied by a first symbol group and a second symbol group is 1 or −1. b1 and b2 are both integers greater than or equal to 1. b1 is less than or equal to b2.

In an optional embodiment, subcarrier indexes occupied by the five symbols are determined from one or more of the following cases: k, k+b1, k, k−b2 and k; k, k−b1, k, k−b2 and k; k, k+b1, k, k+b2 and k; or k, k−b1, k, k+b2 and k. For example, a subcarrier index occupied by a first symbol group is 1 or 3. k is an integer greater than or equal to 0.

In an optional embodiment, the first signal may include seven symbol groups, and the difference between subcarrier indexes occupied by each of adjacent symbol groups of the seven symbol groups includes at least one of b1, −b1, b2 or −b2. b1 and b2 are both integers greater than or equal to 1. b1 is less than or equal to b2.

In an optional embodiment, subcarrier indexes occupied by the seven symbol groups are determined from one or more of the following cases: k, k+b1, k+b1+b1, k+b1, k, k−b2 and k; k, k−b1, k−b1−b1, k−b1, k, k−b2 and k; k, k+b1, k+b1+b1, k+b1, k, k+b2 and k; or k, k−b1, k−b1−b1, k−b1, k, k+b2 and k. k is an integer greater than or equal to 0.

In an optional embodiment, in the case where the first signal includes nine symbol groups, the difference between subcarrier indexes occupied by each of adjacent symbol groups of the nine symbol groups includes at least one of b1, −b1, b2 or −b2. For example, the difference between subcarrier indexes of a first symbol group and a second symbol group is b1 or −b1. b1 and b2 are integers greater than or equal to 1. b1 is less than b2.

In an optional embodiment, subcarrier indexes occupied by the nine symbol groups are determined from one or more of the following cases: k, k+b1, k+b1+b1, k+b1+b1+b1, k+b1+b1, k+b1, k, k−b2 and k; k, k−b1, k−b1−b1, k−b1−b1−b1, k−b1−b1, k−b1, k, k−b2 and k; k, k+b1, k+b1+b1, k+b1+b1+b1, k+b1+b1, k+b1, k, k+b2 and k; or k, k−b1, k−b1−b1, k−b1−b1−b1, k−b1−b1, k−b1, k, k+b2 and k. k is an integer greater than or equal to 0. b1 is less than or equal to b2.

In an optional embodiment, subcarriers occupied by symbol group i in the first signal are determined through at least one of the following formulas:

$\tilde{n}_{sc}^{RA}(i)=(\tilde{n}_{sc}^{RA}(0)+f(i/2))\bmod N_{sc}^{RA}$ $i \bmod 8=0$ and $i>0$, $\tilde{n}_{sc}^{RA}(i)=(\tilde{n}_{sc}^{RA}(0)+f(i/2))\bmod N_{sc}^{RA}$ $i \bmod 8=2$, $\tilde{n}_{sc}^{RA}(i)=((\tilde{n}_{sc}^{RA}(0)+f(i/2))\bmod 6)\times 2+1$ $i \bmod 8=4$ and $\tilde{n}_{sc}^{RA}(i-4)\bmod 2=0$, $\tilde{n}_{sc}^{RA}(i)=((\tilde{n}_{sc}^{RA}(0)+f(i/2))\bmod 6)\times 2$ $i \bmod 8=4$ and $\tilde{n}_{sc}^{RA}(i-4)\bmod 2=1$, $\tilde{n}_{sc}^{RA}(i)=(\tilde{n}_{sc}^{RA}(0)+f(i/2))\bmod 6$ $i \bmod 8=6$ and $6\leq \tilde{n}_{sc}^{RA}(i-4)<N_{sc}^{RA}$, or $\tilde{n}_{sc}^{RA}(i)=(\tilde{n}_{sc}^{RA}(0)+f(i/2))\bmod 6+6$ $i \bmod 8=6$ and $0\leq \tilde{n}_{sc}^{RA}(i-4)<6$.

In the formulas:

$$f(t) = \left(f(t-1) + \left(\sum_{n=10t+1}^{10t+9} c(n)2^{n-(10t+1)}\right)\bmod(N_{sc}^{RA}-1)+1\right)\bmod N_{sc}^{RA}$$

$$f(-1) = 0;$$

$\tilde{n}_{sc}^{RA}(i)$ denotes an index of subcarriers occupied by symbol group i among $N_{sc}^{RA}$ ($N_{sc}^{RA}=12$) consecutive subcarriers, where i is an integer greater than or equal to 0; $\tilde{n}_{sc}^{RA}(0)$ denotes an index of subcarriers occupied by symbol group i, where i is equal to 0, among the $N_{sc}^{RA}$ ($N_{sc}^{RA}=12$) consecutive subcarriers; and c(n) denotes an element in a sequence.

In an optional embodiment, the subcarrier occupied by symbol group i in the first signal is determined through at least one of the following formulas:

$\tilde{n}_{sc}^{RA}(i)=(\tilde{n}_{sc}^{RA}(0)+f(i/3))\bmod N_{sc}^{RA}$, $i \bmod 6=0$ and $i>0$, or $\tilde{n}_{sc}^{RA}(i)=(\tilde{n}_{sc}^{RA}(0)+f(i/3))\bmod N_{sc}^{RA}$ $i \bmod 6=3$.

In the formulas, $$f(t) = \left(f(t-1) + \left(\sum_{n=10t+1}^{10t+9} c(n)2^{n-(10t+1)}\right)\bmod(N_{sc}^{RA}-1)+1\right)\bmod N_{sc}^{RA}$$

$$f(-1) = 0;$$

$\tilde{n}_{SC}^{RA}$ denotes an index of subcarriers occupied by symbol group i among $N_{sc}^{RA}$ ($N_{sc}^{RA}=12$) consecutive subcarriers, where i is an integer greater than or equal to 0; $\tilde{n}_{SC}^{RA}(0)$ denotes an index of subcarriers occupied by symbol group i, where i is equal to 0, among the $N_{sc}^{RA}$ ($N_{sc}^{RA}=12$) consecutive subcarriers; and c(n) denotes an element in a sequence.

In the above embodiment, subcarriers occupied by symbol group i in the first signal are determined through at least one of the following complete formulas:

$$\tilde{n}_{sc}^{RA}(i) = \begin{cases} (\tilde{n}_{sc}^{RA}(0) + f(i/2))\bmod N_{sc}^{RA} & i \bmod 8 = 0 \text{ and } i > 0 \\ (\tilde{n}_{sc}^{RA}(0) + f(i/2))\bmod N_{sc}^{RA} & i \bmod 8 = 2 \\ ((\tilde{n}_{sc}^{RA}(0) + f(i/2))\bmod 6)\times 2 + 1 & i \bmod 8 = 4 \text{ and } \tilde{n}_{sc}^{RA}(i-4)\bmod 2 = 0 \\ ((\tilde{n}_{sc}^{RA}(0) + f(i/2))\bmod 6)\times 2 & i \bmod 8 = 4 \text{ and } \tilde{n}_{sc}^{RA}(i-4)\bmod 2 = 1 \\ (\tilde{n}_{sc}^{RA}(0) + f(i/2))\bmod 6 & i \bmod 8 = 6 \text{ and } 6 \leq \tilde{n}_{sc}^{RA}(i-4) < N_{sc}^{RA} \\ (\tilde{n}_{sc}^{RA}(0) + f(i/2))\bmod 6 + 6 & i \bmod 8 = 6 \text{ and } 6 \leq \tilde{n}_{sc}^{RA}(i-4) < 6 \\ \tilde{n}_{sc}^{RA}(i-1) + 1 & i \bmod 4 = 1 \text{ and } \tilde{n}_{sc}^{RA}(i-1)\bmod 2 = 0 \\ \tilde{n}_{sc}^{RA}(i-1) - 1 & i \bmod 4 = 1 \text{ and } \tilde{n}_{sc}^{RA}(i-1)\bmod 2 = 1 \\ \tilde{n}_{sc}^{RA}(i-1) + 6 & i \bmod 4 = 3 \text{ and } \tilde{n}_{sc}^{RA}(i-1) < 6 \\ \tilde{n}_{sc}^{RA}(i-1) - 6 & i \bmod 4 = 3 \text{ and } \tilde{n}_{sc}^{RA}(i-1) \geq 6 \end{cases}$$

$$f(t) = \left(f(t-1) + \left(\sum_{n=10t+1}^{10t+9} c(n)2^{n-(10t+1)}\right)\bmod(N_{sc}^{RA}-1)+1\right)\bmod N_{sc}^{RA}$$

$$f(-1) = 0, \text{ or}$$

-continued $$\tilde{n}_{sc}^{RA}(i) = \begin{cases} (\tilde{n}_{sc}^{RA}(0) + f(i/3)) \bmod N_{sc}^{RA} & i \bmod 6 = 0 \text{ and } i > 0 \\ (\tilde{n}_{sc}^{RA}(0) + f(i/3)) \bmod N_{sc}^{RA} & i \bmod 6 = 3 \\ \tilde{n}_{sc}^{RA}(i-1) + 1 & i \bmod 6 = 1 \text{ and } \tilde{n}_{sc}^{RA}(i-1) \bmod 2 = 0 \\ \tilde{n}_{sc}^{RA}(i-1) - 1 & i \bmod 6 = 2 \text{ and } \tilde{n}_{sc}^{RA}(i-2) \bmod 2 = 0 \\ \tilde{n}_{sc}^{RA}(i-1) - 1 & i \bmod 6 = 1 \text{ and } \tilde{n}_{sc}^{RA}(i-1) \bmod 2 = 1 \\ \tilde{n}_{sc}^{RA}(i-1) + 1 & i \bmod 6 = 2 \text{ and } \tilde{n}_{sc}^{RA}(i-2) \bmod 2 = 1 \\ \tilde{n}_{sc}^{RA}(i-1) + 6 & i \bmod 6 = 4 \text{ and } 0 \leq \tilde{n}_{sc}^{RA}(i-1) < 6 \\ \tilde{n}_{sc}^{RA}(i-1) - 6 & i \bmod 6 = 5 \text{ and } 0 \leq \tilde{n}_{sc}^{RA}(i-2) < 6 \\ \tilde{n}_{sc}^{RA}(i-1) - 6 & i \bmod 6 = 4 \text{ and } 6 \leq \tilde{n}_{sc}^{RA}(i-1) < N_{sc}^{RA} \\ \tilde{n}_{sc}^{RA}(i-1) + 6 & i \bmod 6 = 5 \text{ and } 6 \leq \tilde{n}_{sc}^{RA}(i-1) < N_{sc}^{RA} \end{cases}$$

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0.$$

$\tilde{n}_{sc}^{RA}(i)$ denotes an index of subcarriers occupied by symbol group i among the $N_{sc}^{RA}$ ($N_{sc}^{RA}=12$) consecutive subcarriers, where i is an integer greater than or equal to 0; and $\tilde{n}_{sc}^{RA}(0)$ denotes an index of subcarriers occupied by symbol group i, where i is equal to 0, among the $N_{sc}^{RA}$ ($N_{sc}^{RA}=12$) consecutive subcarriers.

In this embodiment, subcarriers occupied by symbol group i in the first signal are determined through at least one of the following complete formulas:

$$\tilde{n}_{sc}^{RA}(i) = \begin{cases} (\tilde{n}_{sc}^{RA}(0) + f(i/2)) \bmod N_{sc}^{RA} & i \bmod 8 = 0 \text{ and } i > 0 \\ (\tilde{n}_{sc}^{RA}(0) + f(i/2)) \bmod N_{sc}^{RA} & i \bmod 8 = 2 \\ ((\tilde{n}_{sc}^{RA}(0) + f(i/2)) \bmod 6) \times 2 + 1 & i \bmod 8 = 4 \text{ and } \tilde{n}_{sc}^{RA}(i-4) \bmod 2 = 0 \\ ((\tilde{n}_{sc}^{RA}(0) + f(i/2)) \bmod 6) \times 2 & i \bmod 8 = 4 \text{ and } \tilde{n}_{sc}^{RA}(i-4) \bmod 2 = 1 \\ (\tilde{n}_{sc}^{RA}(0) + f(i/2)) \bmod 6 & i \bmod 8 = 6 \text{ and } 6 \leq \tilde{n}_{sc}^{RA}(i-4) < N_{sc}^{RA} \\ (\tilde{n}_{sc}^{RA}(0) + f(i/2)) \bmod 6 + 6 & i \bmod 8 = 6 \text{ and } 6 \leq \tilde{n}_{sc}^{RA}(i-4) < 6 \\ \tilde{n}_{sc}^{RA}(i-1) + 1 & i \bmod 4 = 1 \text{ and } \tilde{n}_{sc}^{RA}(i-1) \bmod 2 = 0 \\ \tilde{n}_{sc}^{RA}(i-1) - 1 & i \bmod 4 = 1 \text{ and } \tilde{n}_{sc}^{RA}(i-1) \bmod 2 = 1 \\ \tilde{n}_{sc}^{RA}(i-1) + 6 & i \bmod 4 = 3 \text{ and } \tilde{n}_{sc}^{RA}(i-1) < 6 \\ \tilde{n}_{sc}^{RA}(i-1) - 6 & i \bmod 4 = 3 \text{ and } \tilde{n}_{sc}^{RA}(i-1) \geq 6 \end{cases}$$

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0, \text{ or}$$

$$\tilde{n}_{sc}^{RA}(i) = \begin{cases} (\tilde{n}_{sc}^{RA}(0) + f(i/3)) \bmod N_{sc}^{RA} & i \bmod 6 = 0 \text{ and } i > 0 \\ (\tilde{n}_{sc}^{RA}(0) + f(i/3)) \bmod N_{sc}^{RA} & i \bmod 6 = 3 \\ \tilde{n}_{sc}^{RA}(i-1) + 1 & i \bmod 6 = 1 \text{ and } \tilde{n}_{sc}^{RA}(i-1) \bmod 2 = 0 \\ \tilde{n}_{sc}^{RA}(i-1) - 1 & i \bmod 6 = 2 \text{ and } \tilde{n}_{sc}^{RA}(i-2) \bmod 2 = 0 \\ \tilde{n}_{sc}^{RA}(i-1) - 1 & i \bmod 6 = 1 \text{ and } \tilde{n}_{sc}^{RA}(i-1) \bmod 2 = 1 \\ \tilde{n}_{sc}^{RA}(i-1) + 1 & i \bmod 6 = 2 \text{ and } \tilde{n}_{sc}^{RA}(i-2) \bmod 2 = 1 \\ \tilde{n}_{sc}^{RA}(i-1) + 6 & i \bmod 6 = 4 \text{ and } 0 \leq \tilde{n}_{sc}^{RA}(i-1) < 6 \\ \tilde{n}_{sc}^{RA}(i-1) - 6 & i \bmod 6 = 5 \text{ and } 0 \leq \tilde{n}_{sc}^{RA}(i-2) < 6 \\ \tilde{n}_{sc}^{RA}(i-1) - 6 & i \bmod 6 = 4 \text{ and } 6 \leq \tilde{n}_{sc}^{RA}(i-1) < N_{sc}^{RA} \\ \tilde{n}_{sc}^{RA}(i-1) + 6 & i \bmod 6 = 5 \text{ and } 6 \leq \tilde{n}_{sc}^{RA}(i-1) < N_{sc}^{RA} \end{cases}$$

-continued $$f(t) = \left(f(t-1) + \left(\sum_{n=10t+1}^{10t+9} c(n)2^{n-(10t+1)}\right) \mod(N_{sc}^{RA}-1) + 1\right) \mod N_{sc}^{RA}$$

$$f(-1) = 0.$$

$\tilde{n}_{SC}^{RA}(i)$ denotes an index of subcarriers occupied by symbol group i among the $N_{sc}^{RA}$ ($N_{sc}^{RA}$=12) consecutive subcarriers, where i is an integer greater than or equal to 0.

$\tilde{n}_{SC}^{RA}(0)$ denotes an index of subcarriers occupied by symbol group i, where i is equal to 0, among the $N_{sc}^{RA}$ ($N_{sc}^{RA}$=12) consecutive subcarriers, where i is equal to 0.

In an optional embodiment, the first signal may include at least one of: a scheduling request (SR) signal, a random access signal or a positioning reference signal.

In an optional embodiment, in the case where the first signal includes the random access signal, the method further includes receiving a random access response message from the base station. The random access response message includes a media access control (MAC) header and an MAC payload. The MAC header includes at least one MAC subheader. In this embodiment, the operation of receiving the random access response message from the base station is performed after the step of transmitting the first signal.

In an optional embodiment, the method further includes: receiving an adjustment factor for adjusting a retransmission number of a first message, where the retransmission number corresponds to one transmission block size (TBS); and transmitting the first message, where the first message supports data transmission of M TBSs, each TBS corresponds to a respective retransmission number of the first message, and M is greater than or equal to 1. In this embodiment, the adjustment factor may be transmitted at any time, that is, a terminal may receive the adjustment factor at any time.

The first message includes at least one of: a message transmitted on an uplink channel, message 1 in a random access process, message 3 in a random access process, a message transmitted on a downlink channel, message 2 in a random access process, or message 4 in a random access process.

In the case where the first message is message 3 in the random access process, the operation of transmitting the first message is performed after the step of receiving the random access response message.

In an optional embodiment, a retransmission number of the first message corresponding to an m-th TBS includes at least one of: $N \times b_m$, $\lfloor N \times b_m \rfloor$, $\lceil N \times b_m \rceil$, $K \times (N \times b_m)/K$, $K \times \lfloor (N \times b_m)/K \rfloor$ or $K \times \lceil (N \times b_m)/K \rceil$. K is an integer greater than or equal to 1 and, preferably, is 4 or 8. N is an integer greater than or equal to 1. N may be, but is not limited to, the retransmission number of the first message. $b_m$ denotes an adjustment factor for the retransmission number of the first message corresponding to the m-th TBS.

In an optional embodiment, the MAC subheader includes at least one type of MAC subheader, and one type of MAC subheader includes P bits. K bits in the P bits denote a random access preamble identifier (RAPID). P is an integer greater than or equal to 1. K is less than or equal to P. The RAPID includes at least one of the following cases: an index of a first set, or the RAPID=Index/M. The first set includes subcarriers where first symbol groups in N random access signals are located, where N is an integer greater than or equal to 1. Index denotes a subcarrier index corresponding to a first symbol group in a random access signal, where M is an integer greater than or equal to 1, and the RAPID is an integer greater than or equal to 0. In this embodiment, in the case where K=6, that is, the length of the RAPID is six bits, there may be a total of 64 (2^6=64) kinds of RAPID whose reference numbers are 0 to 63. M and N are each preferably 3.

In an optional embodiment, in the case where the RAPID includes the index of the first set, the MAC payload at least includes one MAC random access response (RAR) corresponding to the RAPID, and the one MAC RAR includes first indication information. The first indication information is used to indicate an index of a subcarrier corresponding to the one MAC RAR in the first set.

In an optional embodiment, in the case where the RAPID=Index/M, the MAC payload at least includes one MAC random access response (RAR) message corresponding to the RAPID, and the one MAC RAR message includes second indication information. The second indication information is used to indicate an index of a subcarrier corresponding to the one MAC RAR in a second set. The second set includes subcarriers with a subcarrier index of [RAPID, (RAPID+1)*M−1].

In the above embodiment, a1, a2 and a3 are preferably set such that a1=1, a2=3, and a3=18.

In the above embodiment, b1, b2 and b3 are preferably set such that b1=1, and b2=18.

In an optional embodiment, subcarrier indexes of the one or more symbol groups included in the first signal are determined in the following manner: determining a subcarrier index of one symbol group of the one or more (at least one) symbol groups; and determining subcarrier indexes of remaining symbol groups of the one or more symbol groups by the determined subcarrier index of the one symbol group. In this embodiment, no matter how many symbol groups are included in the first signal, subcarrier indexes of other symbol groups may be determined through a subcarrier index of one symbol group.

This embodiment further provides a signal receiving method. FIG. 3 is a flowchart of a signal receiving method according to an embodiment of the present disclosure. As shown in FIG. 3, the method includes the step described below.

In step S302, a first signal is received. The first signal includes one or more symbol groups.

Through the above step, the first signal transmitted to a base station by a terminal includes at least one symbol group. Therefore, the problem that a signal based on the NB-IoT system fails to support the coverage of the large cell, or operate in the time division duplex mode in the related art can be solved, and the effect that the signal based on the NB-IoT system can support the coverage of the large cell and operate in the time division duplex mode can be achieved.

In this embodiment, each symbol group includes a cyclic prefix and at least one symbol, or includes a cyclic prefix, at least one symbol and a protection period; and each symbol group occupies the same subcarrier in the frequency domain or occupies the same frequency resource.

In an optional embodiment, the first signal may include six symbol groups, and the difference between subcarrier indexes occupied by two adjacent symbol groups of the six symbol groups includes at least one of a1, −a1, a2, −a2, a3 or −a3. a1, a2 and a3 are all integers greater than or equal to 1. a1 is less than or equal to a2. a2 is less than or equal to a3.

In an optional embodiment, a subcarrier index occupied by each symbol group of the six symbol groups includes at least one the following cases: k, k+a1, k, k−a2, k and k+a3; k, k−a1, k, k−a2, k and k+a3; k, k+a1, k, k+a2, k and k+a3; k, k−a1, k, k+a2, k and k+a3; k, k+a1, k, k−a2, k and k−a3; k, k−a1, k, k−a2, k and k−a3; k, k+a1, k, k+a2, k and k−a3; or k, k−a1, k, k+a2, k and k−a3. k is an integer greater than or equal to 0.

In an optional embodiment, the first signal may include seven symbol groups, and the difference between subcarrier indexes occupied by two adjacent symbol groups of the seven symbol groups includes at least one of a1, −a1, a2, −a2, a3 or −a3. a1, a2 and a3 are all integers greater than or equal to 1. a1 is less than or equal to a2. a2 is less than or equal to a3.

In an optional embodiment, subcarrier indexes occupied by the seven symbol groups include at least one of the following cases: k, k+a1, k, k−a2, k, k+a3 and k; k, k−a1, k, k−a2, k, k+a3 and k; k, k+a1, k, k+a2, k, k+a3 and k; k, k−a1, k, k+a2, k, k+a3 and k; k, k+a1, k, k−a2, k, k−a3 and k; k, k−a1, k, k−a2, k, k−a3 and k; k, k+a1, k, k+a2, k, k−a3 and k; or k, k−a1, k, k+a2, k, k−a3 and k. k is an integer greater than or equal to 0.

In an optional embodiment, the first signal may include five symbol groups, and the difference between subcarrier indexes occupied by two adjacent symbol groups of the five symbol groups includes at least one of b1, −b1, b2 or −b2. b1 and b2 are both integers greater than or equal to 1. b1 is less than or equal to b2.

In an optional embodiment, subcarrier indexes occupied by the five symbol groups include at least one of the following cases: k, k+b1, k, k−b2 and k; k, k−b1, k, k−b2 and k; k, k+b1, k, k+b2 and k; or k, k−b1, k, k+b2 and k. k is an integer greater than or equal to 0.

In an optional embodiment, in the case where the first signal includes seven symbol groups, the difference between subcarrier indexes occupied by two adjacent symbol groups of the seven symbol groups includes at least one of b1, −b1, b2 or −b2. b1 and b2 are both integers greater than or equal to 1. b1 is less than or equal to b2.

In an optional embodiment, subcarrier indexes occupied by the seven symbol groups include at least one of the following cases: k, k+b1, k+b1+b1, k+b1, k, k−b2 and k; k, k−b1, k−b1−b1, k−b1, k, k−b2 and k; k, k+b1, k+b1+b1, k+b1, k, k+b2 and k; or k, k−b1, k−b1−b1, k−b1, k, k+b2 and k. k is an integer greater than or equal to 0.

In an optional embodiment, in the case where the first signal includes nine symbol groups, the difference between subcarrier indexes occupied by two adjacent symbol groups of the nine symbol groups includes at least one of b1, −b1, b2 or −b2. b1 and b2 are both integers greater than or equal to 1. b1 is less than or equal to b2.

In an optional embodiment, subcarrier indexes occupied by the nine symbol groups include at least one of the following cases: k, k+b1, k+b1+b1, k+b1+b1+b1, k+b1+b1, k+b1, k, k−b2 and k; k, k−b1, k−b1−b1, k−b1−b1−b1, k−b1−b1, k−b1, k, k−b2 and k; k, k+b1, k+b1+b1, k+b1+ b1+b1, k+b1+b1, k+b1, k, k+b2 and k; or k, k−b1, k−b1−b1, k−b1−b1−b1, k−b1−b1, k−b1, k, k+b2 and k. k is an integer greater than or equal to 0.

In an optional embodiment, the first signal includes at least one of: a scheduling request (SR) signal, a random access signal or a positioning reference signal.

In an optional embodiment, in the case where the first signal includes the random access signal, the method further includes transmitting a random access response message to the terminal. The random access response message includes a media access control (MAC) header and an MAC payload. The MAC header includes at least one MAC subheader. In this embodiment, the operation of transmitting the random access response message to the terminal is performed after the step of receiving the first signal from the terminal.

In an optional embodiment, the method further includes: transmitting an adjustment factor for adjusting a retransmission number of a first message corresponding to a transmission block size (TBS), where the adjustment factor is transmitted through one of: system information, a control channel, or the random access response message; and receiving the first message, where the first message supports data transmission of M TBSs, each TBS corresponds to a respective retransmission number of the first message, and M is greater than or equal to 1. In this embodiment, the operation of transmitting the adjustment factor may be performed at any time.

The first message includes at least one of: a message transmitted on an uplink channel, message 1 in a random access process, message 3 in a random access process, a message transmitted on a downlink channel, message 2 in a random access process, or message 4 in a random access process.

In the case where the first message is message 3 in the random access process, the operation of receiving the first message is performed after the step of transmitting the random access response message.

In an embodiment, the adjustment factor is determined in one of the following manners: indicating, through signaling separately, an adjustment factor for the retransmission number of the first message corresponding to each TBS; or indicating, in a manner of joint indication, numbers of times the first message is retransmitted corresponding to the M TBSs supported by the first message.

In an optional embodiment, a retransmission number of the first message corresponding to an m-th TBS of the M TBSs includes at least one of $N \times b_m$, $\lfloor N \times b_m \rfloor$, $\lceil N \times b_m \rceil$, $K \times (N \times b_m)/K$, $K \times \lfloor (N \times b_m)/K \rfloor$ or $K \times \lceil (N \times b_m)/K \rceil$. K and N are both integers greater than or equal to 1. $b_m$ denotes an adjustment factor for the retransmission number of the first message corresponding to the m-th TBS. In this embodiment, N has the same meaning as in the above embodiments.

In an optional embodiment, the MAC subheader includes at least one type of MAC subheader, and one type of MAC subheader includes P bits. K bits in the P bits denote a random access preamble identifier (RAPID). P is an integer greater than or equal to 1. K is less than or equal to 8. The RAPID includes at least one of the following cases: an index of a first set, or the RAPID=Index/M. The first set includes subcarriers where first symbol groups in N random access signals are located, where N is an integer greater than or equal to 1. Index denotes a subcarrier index corresponding to a first symbol group in a random access signal, where M is an integer greater than or equal to 1, and the RAPID is an integer greater than or equal to 0.

In an optional embodiment, in the case where the RAPID includes the index of the first set, the MAC payload at least includes one MAC random access response (RAR) corresponding to the RAPID, and the one MAC RAR includes first indication information. The first indication information is used to indicate an index of a subcarrier corresponding to the one MAC RAR in the first set.

In an optional embodiment, in the case where the RAPID=Index/M, the MAC payload at least includes one MAC random access response (RAR) message corresponding to the RAPID, and the one MAC RAR message includes second indication information. The second indication information is used to indicate an index of a subcarrier corresponding to the one MAC RAR in a second set. The second set includes subcarriers with a subcarrier index of [RAPID, (RAPID+1)*M−1].

In an optional embodiment, a1=1, a2=3, and a3=18.

In an optional embodiment, b1=1, and b2=18.

From the description of the embodiments above, it is apparent to those skilled in the art that the methods in the embodiments above may be implemented by software and a necessary general-purpose hardware platform, or may of course be implemented by hardware. However, in many cases, the former is a preferred implementation. Based on this understanding, the solution provided by the present disclosure substantially, or the part contributing to the related art, may be embodied in the form of a software product. The computer software product is stored in a storage medium (such as a read-only memory (ROM)/a random access memory (RAM), a magnetic disk or an optical disk), and includes several instructions for enabling a terminal device (which may be a mobile phone, a computer, a server, a network device or the like) to perform the method according to each embodiment of the present disclosure.

Embodiment Two

This embodiment further provides a signal transmitting apparatus. The apparatus is configured to perform the embodiments and preferred implementations above, where the content has been described above is not repeated here. As used below, the term "module" may be software, hardware or a combination thereof capable of implementing predetermined functions. The apparatus in the embodiment described below is preferably implemented by software, but an implementation by hardware or by a combination of software and hardware is also possible and conceivable.

Figure 4:
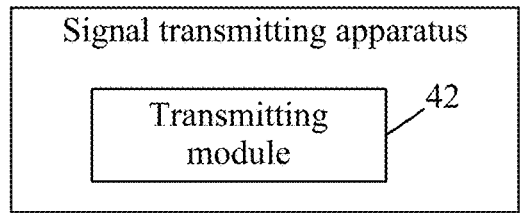
FIG. 4 is a block diagram of a signal transmitting apparatus according to embodiments of the present disclosure.

FIG. 4 is a block diagram of a signal transmitting apparatus according to an embodiment of the present disclosure. As shown in FIG. 4, the apparatus includes a transmitting module 42. The apparatus is described below in detail.

The transmitting module 42 is configured to transmit a first signal to a base station. The first signal includes at least one symbol group. Each symbol group of the at least one symbol group includes a cyclic prefix and at least one symbol, or includes a cyclic prefix, at least one symbol and a protection period. Each symbol group of the at least one symbol group occupies the same subcarrier in frequency domain or occupies the same frequency resource.

In an optional embodiment, in the case where the first signal includes six symbol groups, the difference between subcarrier indexes occupied by two adjacent symbol groups of the six symbol groups includes at least one of a1, −a1, a2, −a2, a3 or −a3. a1, a2 and a3 are all integers greater than or equal to 1. a1 is less than or equal to a2. a2 is less than or equal to a3.

In an optional embodiment, a subcarrier index occupied by each of the six symbol groups includes at least one the following cases: k, k+a1, k, k−a2, k and k+a3; k, k−a1, k, k−a2, k and k+a3; k, k+a1, k, k+a2, k and k+a3; k, k−a1, k, k+a2, k and k+a3; k, k+a1, k, k−a2, k and k−a3; k, k−a1, k, k−a2, k and k−a3; k, k+a1, k, k+a2, k and k−a3; or k, k−a1, k, k+a2, k and k−a3. k is an integer greater than or equal to 0.

In an optional embodiment, in the case where the first signal supports to be retransmitted, the apparatus further includes a retransmitting module. The retransmitting module is configured to, after the step of transmitting the first signal to the retransmit the first signal in at least one of the following manners: in the case where an absolute value of the difference between the subcarrier indexes occupied by two adjacent symbol groups in a (2n−1)-th transmission of the first signal is a3 and the difference between the subcarrier indexes occupied by two adjacent symbol groups in the (2n−1)-th transmission of the first signal is a3, the absolute value of the difference between the subcarrier indexes occupied by two adjacent symbol groups in a (2n)-th transmission of the first signal is a3 and the difference between the subcarrier indexes occupied by two adjacent symbol groups in the (2n)-th transmission of the first signal is −a3; or in a case where an absolute value of a difference between subcarrier indexes occupied by two adjacent symbol groups in a (2n−1)-th transmission of the first signal is a3 and the difference between the subcarrier indexes occupied by two adjacent symbol groups in the (2n−1)-th transmission of the first signal is −a3, the absolute value of the difference between the subcarrier indexes occupied by two adjacent symbol groups in a (2n)-th transmission of the first signal is a3 and the difference between the subcarrier indexes occupied by two adjacent symbol groups in the (2n)-th transmission of the first signal is a3. n is an integer greater than or equal to 1.

In an optional embodiment, in transmissions of the first signal, in the case where a subcarrier index occupied by a first symbol group in the (2n−1)-th transmission of the first signal is selected from set 1, subcarriers occupied by the first symbol group in the (2n)-th transmission of the first signal are selected from set 2. Set 1 and set 2 satisfy at least one of the following relationships: in response to that set 1 comprises subcarrier 0 to subcarrier 17, set 2 comprises subcarrier 18 to subcarrier 35; or in response to that set 1 comprises subcarrier 18 to subcarrier 35, set 2 comprises subcarrier 0 to subcarrier 17.

In an optional embodiment, in the transmissions of the first signal, the apparatus is further configured such that: in the case where a subcarrier index occupied by a last symbol group in a (2n−1)-th transmission of the first signal is selected from set 3, the subcarrier occupied by a first symbol group in a (2n)-th transmission of the first signal is selected from set 4. Set 3 and set 4 satisfy at least one of the following relationships: in the case where set 3 includes subcarrier 0 to subcarrier 17, set 4 includes subcarrier 0 to subcarrier 17; or in the case where set 3 includes subcarrier 18 to subcarrier 35, set 4 includes subcarrier 18 to subcarrier 35.

In an optional embodiment, in the case where the first signal supports to be retransmitted, the first signal in the (2n−1)-th transmission includes six symbol groups, and the first signal in the (2n)-th transmission includes five symbol groups. n is an integer greater than or equal to 1.

In an optional embodiment, in the case where the first signal includes seven symbol groups, the difference between subcarrier indexes occupied by two adjacent symbol groups of the seven symbol groups includes at least one of a1, −a1, a2, −a2, a3 or −a3. a1, a2 and a3 are all integers greater than or equal to 1. a1 is less than or equal to a2. a2 is less than or equal to a3.

In an optional embodiment, subcarrier indexes occupied by the seven symbol groups include at least one of the following cases: k, k+a1, k, k−a2, k, k+a3 and k; k, k−a1, k, k−a2, k, k+a3 and k; k, k+a1, k, k+a2, k, k+a3 and k; k, k−a1, k, k+a2, k, k+a3 and k; k, k+a1, k, k−a2, k, k−a3 and k; k, k−a1, k, k−a2, k, k−a3 and k; k, k+a1, k, k+a2, k, k−a3 and k; or k, k−a1, k, k+a2, k, k−a3 and k. k is an integer greater than or equal to 0.

In an optional embodiment, in the case where the first signal includes five symbol groups, the difference between subcarrier indexes occupied by two adjacent symbol groups of the five symbol groups includes at least one of b1, −b1, b2 or −b2. b1 and b2 are both integers greater than or equal to 1. b1 is less than or equal to b2.

In an optional embodiment, subcarrier indexes occupied by the five symbol groups include at least one of the following cases: k, k+b1, k, k−b2 and k; k, k−b1, k, k−b2 and k; k, k+b1, k, k+b2 and k; or k, k−b1, k, k+b2 and k. k is an integer greater than or equal to 0.

In an optional embodiment, in the case where the first signal includes seven symbol groups, the difference between subcarrier indexes occupied by two adjacent symbol groups of the seven symbol groups includes at least one of b1, −b1, b2 or −b2. b1 and b2 are both integers greater than or equal to 1. b1 is less than or equal to b2.

In an optional embodiment, subcarrier indexes occupied by the seven symbol groups include at least one of the following cases: k, k+b1, k+b1+b1, k+b1, k, k−b2 and k; k, k−b1, k−b1−b1, k−b1, k, k−b2 and k; k, k+b1, k+b1+b1, k+b1, k, k+b2 and k; or k, k−b1, k−b1−b1, k−b1, k, k+b2 and k. k is an integer greater than or equal to 0.

In an optional embodiment, in the case where the first signal includes nine symbol groups, the difference between subcarrier indexes occupied by two adjacent symbol groups of the nine symbol groups includes at least one of b1, −b1, b2 or −b2. b1 and b2 are both integers greater than or equal to 1. b1 is less than b2.

In an optional embodiment, subcarrier indexes occupied by the nine symbol groups include at least one of the following cases: k, k+b1, k+b1+b1, k+b1+b1+b1, k+b1+b1, k+b1, k, k−b2 and k; k, k−b1, k−b1−b1, k−b1−b1−b1, k−b1−b1, k−b1, k, k−b2 and k; k, k+b1, k+b1+b1, k+b1+b1+b1, k+b1+b1, k+b1, k, k+b2 and k; or k, k−b1, k−b1−b1, k−b1−b1−b1, k−b1−b1, k−b1, k, k+b2 and k. k is an integer greater than or equal to 0. b1 is less than b2.

In an optional embodiment, subcarriers occupied by symbol group i in the first signal are determined through at least one of the following formulas:

$$\tilde{n}_{sc}^{RA}(i)=(\tilde{n}_{sc}^{RA}(0)+f(i/2))\bmod N_{sc}^{RA} \; i \bmod 8=0 \text{ and } i>0,$$

$$\tilde{n}_{sc}^{RA}(i)=(\tilde{n}_{sc}^{RA}(0)+f(i/2))\bmod N_{sc}^{RA} \; i \bmod 8=2,$$

$$\tilde{n}_{sc}^{RA}(i)=((\tilde{n}_{sc}^{RA}(0)+f(i/2))\bmod 6)\times 2+1 \; i \bmod 8=4 \text{ and } \tilde{n}_{sc}^{RA}(i-4)\bmod 2=0,$$

$$\tilde{n}_{sc}^{RA}(i)=((\tilde{n}_{sc}^{RA}(0)+f(i/2))\bmod 6)\times 2 \; i \bmod 8=4 \text{ and } \tilde{n}_{sc}^{RA}(i-4)\bmod 2=1,$$

$$\tilde{n}_{sc}^{RA}(i)=(\tilde{n}_{sc}^{RA}(0)+f(i/2))\bmod 6 \; i \bmod 8=6 \text{ and } 6\leq \tilde{n}_{sc}^{RA}(i-4)<N_{sc}^{RA}, \text{ or}$$

$$\tilde{n}_{sc}^{RA}(i)=(\tilde{n}_{sc}^{RA}(0)+f(i/2))\bmod 6+6 \; i \bmod 8=6 \text{ and } 0\leq \tilde{n}_{sc}^{RA}(i-4)<6.$$

In the formulas:

$$f(t) = \left(f(t-1)+\left(\sum_{n=10t+1}^{10t+9} c(n)2^{n-(10t+1)}\right)\bmod(N_{sc}^{RA}-1)+1\right)\bmod N_{sc}^{RA}$$

$$f(-1)=0;$$

$\tilde{n}_{SC}^{RA}(i)$ denotes an index of subcarriers occupied by symbol group i among $N_{SC}^{RA}$ ($N_{sc}^{RA}=12$) consecutive, where i is an integer greater than or equal to 0; $\tilde{n}_{SC}^{RA}(0)$ denotes an index of subcarriers occupied by symbol group i, where i is equal to 0, among the $N_{sc}^{RA}$ ($N_{sc}^{RA}=12$) consecutive subcarriers; and c(n) denotes an element in a sequence.

In an optional embodiment, the subcarrier occupied by symbol group i in the first signal is determined through at least one of the following formulas: $\tilde{n}_{sc}^{RA}(i)=(\tilde{n}_{sc}^{RA}(0)+f(i/3))\bmod N_{sc}^{RA}$ i mod 6=0 and i>0, or $\tilde{n}_{sc}^{RA}(i)=(\tilde{n}_{sc}^{RA}(0)+f(i/3))\bmod N_{sc}^{RA}$ i mod 6=3.

In the formulas, $$f(t) = \left(f(t-1)+\left(\sum_{n=10t+1}^{10t+9} c(n)2^{n-(10t+1)}\right)\bmod(N_{sc}^{RA}-1)+1\right)\bmod N_{sc}^{RA}$$

$$f(-1)=0;$$

$\tilde{n}_{SC}^{RA}(i)$ denotes an index of subcarriers occupied by symbol group i among $N_{sc}^{RA}$ ($N_{sc}^{RA}=12$) consecutive subcarriers, where i is an integer greater than or equal to 0; $\tilde{n}_{SC}^{RA}(0)$ denotes an index of subcarriers occupied by symbol group i, where i is equal to 0, among the $N_{sc}^{RA}$ ($N_{sc}^{RA}=12$) consecutive subcarriers; and c(n) denotes an element in a sequence.

In an optional embodiment, the first signal includes at least one of: a scheduling request (SR) signal, a random access signal or a positioning reference signal.

In an optional embodiment, in the case where the first signal includes the random access signal, the apparatus includes a first processing module and a second processing module. The first processing module is configured to transmit the first signal to a base station. The second processing module is configured to receive a random access response message from the base station. The random access response message includes a media access control (MAC) header and an MAC payload. The MAC header includes at least one MAC subheader.

In an optional embodiment, the apparatus is further configured to: receive an adjustment factor for adjusting a retransmission number of a first message, wherein the retransmission number corresponds to one transmission block size (TBS); and transmit the first message, where the first message supports data transmission of M TBSs, each TBS of the M TBSs corresponds to a respective retransmission number of the first message, and M is greater than or equal to 1.

In an optional embodiment, a retransmission number of the first message corresponding to an m-th TBS of the M TBSs includes at least one of: $N \times b_m$, $\lfloor N \times b_m \rfloor$, $\lceil N \times b_m \rceil$, $K \times (N \times b_m)/K$, $K \times \lfloor (N \times b_m)/K \rfloor$ or $K \times \lceil (N \times b_m)/K \rceil$. K and N are both integers greater than or equal to 1. $b_m$ denotes an adjustment factor for the retransmission number of the first message corresponding to the m-th TBS.

In an optional embodiment, the MAC subheader includes at least one type of MAC subheader, and one type of MAC subheader includes P bits. K bits in the P bits denote a random access preamble identifier (RAPID). P is an integer greater than or equal to 1. K is less than or equal to P. The RAPID includes at least one of the following cases: an index of a first set, or the RAPID=Index/M. The first set includes subcarriers where first symbol groups in N random access signals are located, where N is an integer greater than or equal to 1. Index denotes a subcarrier index corresponding to a first symbol group in a random access signal, where M is an integer greater than or equal to 1, and the RAPID is an integer greater than or equal to 0.

In an optional embodiment, in the case where the RAPID includes the index of the first set, the MAC payload at least includes one MAC random access response (RAR) corresponding to the RAPID, and the one MAC RAR includes first indication information. The first indication information is used to indicate an index of a subcarrier corresponding to the one MAC RAR in the first set.

In an optional embodiment, in the case where the RAPID=Index/M, the MAC payload at least includes one MAC random access response (RAR) message corresponding to the RAPID, and the one MAC RAR message includes second indication information. The second indication information is used to indicate an index of a subcarrier corresponding to the one MAC RAR in a second set. The second set includes subcarriers with a subcarrier index of [RAPID, (RAPID+1)*M−1].

In an optional embodiment, a1=1, a2=3, and a3=18.

In an optional embodiment, b1=1, and b2=18.

In an optional embodiment, the apparatus determines subcarrier indexes of the at least one symbol group in the first signal in the following manner: determining a subcarrier index of one symbol group of the at least one symbol group; and determining subcarrier indexes of remaining symbol groups of the at least symbol group by the determined subcarrier index of the one symbol group.

Figure 5:
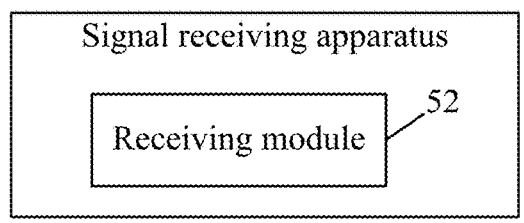
FIG. 5 is a block diagram of a signal receiving apparatus according to embodiments of the present disclosure.

FIG. 5 is a block diagram of a signal receiving apparatus according to an embodiment of the present disclosure. As shown in FIG. 5, the apparatus includes a receiving module 52. The apparatus is described below in detail.

The receiving module 52 is configured to receive a first signal. The first signal includes one or more symbol groups.

In an optional embodiment, the first signal includes six symbol groups, and the difference between subcarrier indexes occupied by two adjacent symbol groups of the six symbol groups includes at least one of a1, −a1, a2, −a2, a3 or −a3. a1, a2 and a3 are all integers greater than or equal to 1. a1 is less than or equal to a2. a2 is less than or equal to a3.

In an optional embodiment, subcarrier indexes occupied by the six symbol groups include at least one the following cases: k, k+a1, k, k−a2, k and k+a3; k, k−a1, k, k−a2, k and k+a3; k, k+a1, k, k+a2, k and k+a3; k, k−a1, k, k+a2, k and k+a3; k, k+a1, k, k−a2, k and k−a3; k, k−a1, k, k−a2, k and k−a3; k, k+a1, k, k+a2, k and k−a3; or k, k−a1, k, k+a2, k and k−a3. k is an integer greater than or equal to 0.

In an optional embodiment, the first signal includes seven symbol groups, and the difference between subcarrier indexes occupied by two adjacent symbol groups of the seven symbol groups includes at least one of a1, −a1, a2, −a2, a3 or −a3. a1, a2 and a3 are all integers greater than or equal to 1. a1 is less than or equal to a2. a2 is less than or equal to a3.

In an optional embodiment, subcarrier indexes occupied by the seven symbol groups include at least one of the following cases: k, k+a1, k, k−a2, k, k+a3 and k; k, k−a1, k, k−a2, k, k+a3 and k; k, k+a1, k, k+a2, k, k+a3 and k; k, k−a1, k, k+a2, k, k+a3 and k; k, k+a1, k, k−a2, k, k−a3 and k; k, k−a1, k, k−a2, k, k−a3 and k; k, k+a1, k, k+a2, k, k−a3 and k; or k, k−a1, k, k+a2, k, k−a3 and k. k is an integer greater than or equal to 0.

In an optional embodiment, in the case where the first signal includes five symbol groups, the difference between subcarrier indexes occupied by two adjacent symbol groups of the five symbol groups includes at least one of b1, −b1, b2 or −b2. b1 and b2 are both integers greater than or equal to 1. b1 is less than or equal to b2.

In an optional embodiment, subcarrier indexes occupied by the five symbol groups include at least one of the following cases: k, k+b1, k, k−b2 and k; k, k−b1, k, k−b2 and k; k, k+b1, k, k+b2 and k; or k, k−b1, k, k+b2 and k. k is an integer greater than or equal to 0.

In an optional embodiment, in the case where the first signal includes seven symbol groups, the difference between subcarrier indexes occupied by two adjacent symbol groups of the seven symbol groups includes at least one of b1, −b1, b2 or −b2. b1 and b2 are both integers greater than or equal to 1. b1 is less than or equal to b2.

In an optional embodiment, subcarrier indexes occupied by the seven symbol groups include at least one of the following cases: k, k+b1, k+b1+b1, k+b1, k, k−b2 and k; k, k−b1, k−b1−b1, k−b1, k, k−b2 and k; k, k+b1, k+b1+b1, k+b1, k, k+b2 and k; or k, k−b1, k−b1−b1, k−b1, k, k+b2 and k. k is an integer greater than or equal to 0.

In an optional embodiment, in the case where the first signal includes nine symbol groups, the difference between subcarrier indexes occupied by two adjacent symbol groups of the nine symbol groups includes at least one of b1, −b1, b2 or −b2. b1 and b2 are both integers greater than or equal to 1. b1 is less than b2.

In an optional embodiment, subcarrier indexes occupied by the nine symbol groups include at least one of the following cases: k, k+b1, k+b1+b1, k+b1+b1+b1, k+b1+b1, k+b1, k, k−b2 and k; k, k−b1, k−b1−b1, k−b1−b1−b1, k−b1−b1, k−b1, k, k−b2 and k; k, k+b1, k+b1+b1, k+b1+b1+b1, k+b1+b1, k+b1, k, k+b2 and k; or k, k−b1, k−b1−b1, k−b1−b1−b1, k−b1−b1, k−b1, k, k+b2 and k. k is an integer greater than or equal to 0.

In an optional embodiment, the first signal includes at least one of a scheduling request (SR) signal, a random access signal or a positioning reference signal.

In an optional embodiment, in the case where the first signal includes the random access signal, the apparatus is further configured to transmit a random access response message to a terminal. The random access response message includes a media access control (MAC) header and an MAC payload. The MAC header includes at least one MAC subheader.

In an optional embodiment, the apparatus is further configured to: transmit an adjustment factor for adjusting a retransmission number of a first message, where the retransmission number corresponds to one transmission block size (TBS), where the adjustment factor is transmitted through one of system information, a control channel, or the random access response message; and receive the first message, where the first message supports data transmission of M TBSs, each TBS of the M TBSs corresponds to a respective retransmission number of the first message, and M is greater than or equal to 1.

In an optional embodiment, the apparatus determines the adjustment factor in one of the following manners: indicating, through signaling separately, an adjustment factor for the retransmission number of the first message corresponding to the each TBS; or indicating, in a manner of joint indication, numbers of times the first message is retransmitted corresponding to the M TBSs supported by the first message.

In an optional embodiment, a retransmission number of the first message corresponding to an m-th TBS of the M TBSs includes at least one of: $N \times b_m$, $\lfloor N \times b_m \rfloor$, $\lceil N \times b_m \rceil$, $K \times (N \times b_m)/K$, $K \times \lfloor (N \times b_m)/K \rfloor$, or $K \times \lceil (N \times b_m)/K \rceil$. K and N are both integers greater than or equal to 1. $b_m$ denotes an adjustment factor for the retransmission number of the first message corresponding to the m-th TBS.

In an optional embodiment, the MAC subheader includes at least one type of MAC subheader, and one type of MAC subheader includes P bits. K bits in the P bits denote a random access preamble identifier (RAPID). P is an integer greater than or equal to 1. K is less than or equal to P. The RAPID includes at least one of the following cases: an index of a first set, or the RAPID=Index/M. The first set includes subcarriers where first symbol groups in N random access signals are located, where N is an integer greater than or equal to 1. Index denotes a subcarrier index corresponding to a first symbol group in the random access signal, where M is an integer greater than or equal to 1, and the RAPID is an integer greater than or equal to 0.

In an optional embodiment, in the case where the RAPID includes the index of the first set, the MAC payload at least includes one MAC random access response (RAR) corresponding to the RAPID, and the one MAC RAR includes first indication information. The first indication information is used to indicate an index of a subcarrier corresponding to the one MAC RAR in the first set.

In an optional embodiment, in the case where the RAPID=Index/M, the MAC payload at least includes one MAC random access response (RAR) message corresponding to the RAPID, and the one MAC RAR includes second indication information. The second indication information is used to indicate an index of a subcarrier corresponding to the one MAC RAR in a second set. The second set includes subcarriers with a subcarrier index of [RAPID, (RAPID+1)*M−1].

In an optional embodiment, a1=1, a2=3, and a3=18.
In an optional embodiment, b1=1, and b2=18.

It is to be noted that each module above may be implemented by software or hardware. An implementation by hardware may, but not necessarily, be performed in the following manners: the various modules above are each located in the same processor, or the various modules above are located in their respective processors in any combination form.

The present disclosure is described in detail hereinafter in conjunction with specific embodiments.

Specific Embodiment One

To solve the problem that a signal based on an NB-IoT system fails to support the coverage of the large cell, or operate in the time division duplex mode in the related art, this embodiment provides a signal generation and resource allocation method, so that an uplink channel of the NB-IoT system can support the coverage of the large cell. Additionally, a signal (corresponding to the first signal above) provided by this embodiment can also operate in the time division duplex (TDD) mode.

A first node transmits a first signal. The first signal includes at least one symbol group. The first node is a terminal or a group of terminals. Each symbol group includes a cyclic prefix and at least one symbol, or includes a cyclic prefix, at least one symbol and a protection period.

Figure 6:
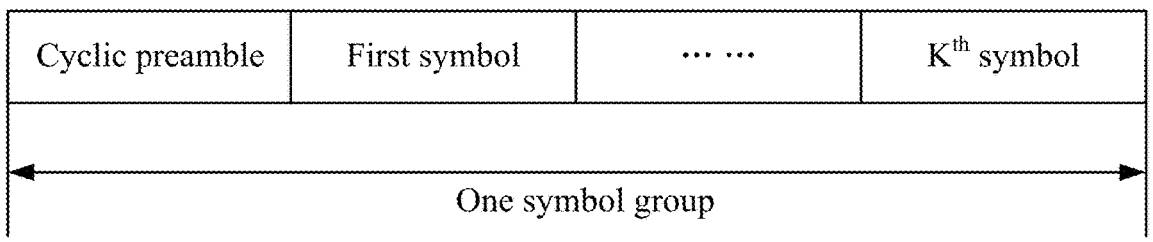
FIG. 6 is structure diagram 1 of a symbol group according to an embodiment.
Figure 7:
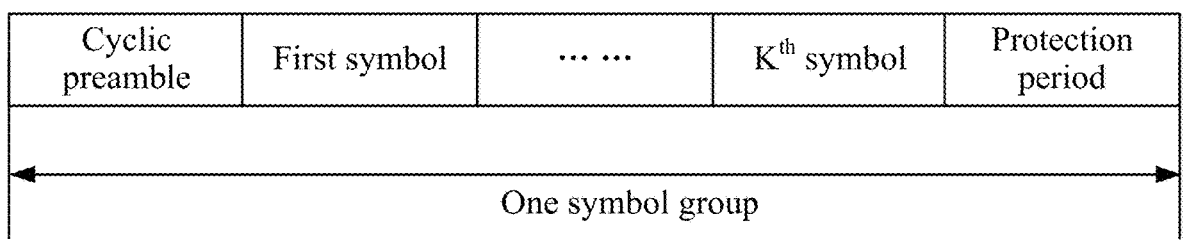
FIG. 7 is structure diagram 2 of a symbol group according to an embodiment.

Moreover, each symbol group occupies the same subcarrier in frequency domain, or occupies the same frequency resource. Specifically, as shown in FIGS. 6 and 7, FIG. 6 is structure diagram 1 of a symbol group according to this embodiment, and FIG. 7 is structure diagram 2 of a symbol group according to this embodiment. In FIGS. 6 and 7, K is an integer greater than or equal to 1

In the case where the first signal includes six symbol groups, the difference between subcarrier indexes occupied by two adjacent symbol groups of the six symbol groups includes at least one of +a1, −a1, +a2, −a2, +a3 or −a3. a1, a2 and a3 are integers greater than or equal to 1. a1 is less than or equal to a2. a2 is less than or equal to a3.

Subcarrier indexes occupied by the six symbol groups include at least one of following cases:
k, k+a1, k, k−a2, k and k+a3;
k, k−a1, k, k−a2, k and k+a3;
k, k+a1, k, k+a2, k and k+a3;
k, k−a1, k, k+a2, k and k+a3;
k, k+a1, k, k−a2, k and k−a3;
k, k−a1, k, k−a2, k and k−a3;
k, k+a1, k, k+a2, k and k−a3; or
k, k−a1, k, k+a2, k and k−a3.
k is an integer greater than or equal to 0.

Specific resource allocation solutions are described below.

Solution 1:
a1 is preferably 1. a2 is preferably 3. a3 is preferably 18. As shown in FIG. 8, the six symbol groups are distributed in a first time-frequency resource block, the first time-frequency resource block occupies 36 subcarriers in frequency domain, and the time domain length of the first time-frequency resource block is the time domain length corresponding to the six symbol groups.

Solution 1 shown in FIG. 8 is specifically described below in detail.

A transmission of the first signal occupies symbol groups 0 to 5. Each symbol group occupies a respective subcarrier in the frequency domain. The six symbol groups are distributed in the first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the six symbol groups: symbol groups 0 to 5 (the symbol group indexes here are relative indexes used to describe the distribution of the symbol groups in the first time-frequency resource block). In FIG. 8, each symbol group has 36 occupiable subcarriers, that is, 36 available resources. For symbol groups 0 to 5, 36 independent transmission resource combinations, that is, channels, may be formed. For example, subcarriers marked "channel 0" are selected from selectable subcarrier resources of the six symbol groups to form "channel 0". That is, a subcarrier index of symbol group 0 is 0, a subcarrier index of symbol group 1 is 1, a subcarrier index of symbol group 2 is 0, a subcarrier index of symbol group 3 is 3, a subcarrier index of symbol group 4 is 0, and a subcarrier index of symbol group 5 is 18. Channels 1 to 35 are generated in the same way, as shown in FIG. 8.

Solution 2:
As shown in FIG. 9, a1 is preferably 1, a2 is preferably 3, and a3 is preferably 18. The six symbol groups are distributed in a first time-frequency resource block. The first time-frequency resource block occupies 36 subcarriers in frequency domain. The time domain length of the first time-frequency resource block is the time domain length corresponding to the six symbol groups.

A transmission of the first signal occupies symbol groups 0 to 5. Each symbol group occupies a respective subcarrier in the frequency domain. The six symbol groups are distributed in the first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the six symbol groups: symbol groups 0 to 5 (the symbol group indexes here are relative indexes used to describe the distribution of the symbol groups in the first time-frequency resource block). In FIG. 9, each symbol group has 36 occupiable subcarriers, that is, 36 available resources. For symbol groups 0 to 5, 36 independent transmission resource combinations, that is, channels, may be formed. For example, subcarriers marked "channel 0" are selected from selectable subcarrier resources to form "channel 0". That is, a subcarrier index of symbol group 0 is 0, a subcarrier index of symbol group 1 is 3, a subcarrier index of symbol group 2 is 0, a subcarrier index of symbol group 3 is 1, a subcarrier index of symbol group 4 is 0, and a subcarrier index of symbol group 5 is 18. Channels 1 to 35 are generated in the same way, as shown in FIG. 9.

Solution 3:

As shown in FIG. 10, a transmission of the first signal occupies symbol groups 0 to 5. Each symbol group occupies a respective subcarrier in frequency domain. The six symbol groups are distributed in a first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the six symbol groups: symbol groups 0 to 5 (the symbol group indexes here are relative indexes used to describe the distribution of the symbol groups in the first time-frequency resource block). In FIG. 10, each symbol group has 36 occupiable subcarriers, that is, 36 available resources. 36 independent transmission resource combinations, that is, channels, may be formed for symbol groups 0 to 5. For example, subcarriers marked "channel 0" are selected from selectable subcarrier resources of the six symbol groups to form "channel 0". That is, a subcarrier index of symbol group 0 is 0, a subcarrier index of symbol group 1 is 1, a subcarrier index of symbol group 2 is 0, a subcarrier index of symbol group 3 is 18, a subcarrier index of symbol group 4 is 21, and a subcarrier index of symbol group 5 is 18. Channels 1 to 35 are generated in the same way, as shown in FIG. 10.

Solution 4:

A transmission of the first signal occupies symbol groups 0 to 5. Each symbol group occupies a respective subcarrier in frequency domain. The six symbol groups are distributed in a first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the six symbol groups: symbol groups 0 to 5 (the symbol group indexes here are relative indexes used to describe the distribution of the symbol groups in the first time-frequency resource block). In FIG. 11, each symbol group has 36 occupiable subcarriers, that is, 36 available resources. 36 independent transmission resource combinations, that is, channels, may be formed for symbol groups 0 to 5. For example, subcarriers marked "channel 0" are selected from selectable subcarrier resources of the six symbol groups to form "channel 0". That is, a subcarrier index of symbol group 0 is 0, a subcarrier index of symbol group 1 is 3, a subcarrier index of symbol group 2 is 0, a subcarrier index of symbol group 3 is 18, a subcarrier index of symbol group 4 is 19, and a subcarrier index of symbol group 5 is 18. Channels 1 to 35 are generated in the same way, as shown in FIG. 11.

Solution 5:

A transmission of the first signal occupies symbol groups 0 to 5. Each symbol group occupies a respective subcarrier in frequency domain. The six symbol groups are distributed in a first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the six symbol groups: symbol groups 0 to 5 (the symbol group indexes here are relative indexes used to describe the distribution of the symbol groups in the first time-frequency resource block). In FIG. 12, each symbol group has 36 occupiable subcarriers, that is, 36 available resources. 36 independent transmission resource combinations, that is, channels, may be formed for symbol groups 0 to 5. For example, subcarriers marked "channel 0" are selected from selectable subcarrier resources of the six symbol groups to form "channel 0". That is, a subcarrier index of symbol group 0 is 0, a subcarrier index of symbol group 1 is 1, a subcarrier index of symbol group 2 is 4, a subcarrier index of symbol group 3 is 22, a subcarrier index of symbol group 4 is 19, and a subcarrier index of symbol group 5 is 18. Channels 1 to 35 are generated in the same way, as shown in FIG. 12.

In the six symbol groups of the embodiments above, subcarrier indexes of other five symbol groups may be determined through a subcarrier index of a first symbol group.

In the case where the first signal supports to be retransmitted, there are at least one of the following cases: if an absolute value of the difference between subcarrier indexes is a3 and the difference between the subcarrier indexes occupied by two adjacent symbol groups in the (2n−1)-th transmission of the first signal is a3, then the absolute value of the difference between the subcarrier indexes is a3 and the difference between the subcarrier indexes occupied by two adjacent symbol groups in a (2n)-th transmission of the first signal is −a3.

If the absolute value of the difference between subcarrier indexes is a3 and the difference between the subcarrier indexes occupied by two adjacent symbol groups in a (2n−1)-th transmission of the first signal is −a3, then the absolute value of the difference between the subcarrier indexes is a3 and the difference between the subcarrier indexes occupied by two adjacent symbol groups in a (2n)-th transmission of the first signal is a3. n is an integer greater than or equal to 1.

In the case where a subcarrier index occupied by a first symbol group in a (2n−1)-th transmission of the first signal is selected from set 1, subcarriers occupied by the first symbol group in a (2n)-th transmission of the first signal are selected from set 2. Set 1 and set 2 satisfy at least one of the relationships described below.

In the case where set 1 includes subcarrier 0 to subcarrier 17, set 2 includes subcarrier 18 to subcarrier 35.

In the case where set 1 includes subcarrier 18 to subcarrier 35, set 2 includes subcarrier 0 to subcarrier 17.

In the case where a subcarrier index occupied by a last symbol group in a (2n−1)-th transmission of the first signal is selected from set 3, the subcarrier occupied by the first symbol group in a (2n)-th transmission of the first signal is selected from set 4. Set 3 and set 4 satisfy at least one of the following relationships: in the case where set 3 includes subcarrier 0 to subcarrier 17, set 4 includes subcarrier 0 to subcarrier 17; or in the case where set 3 includes subcarrier 18 to subcarrier 35, set 4 includes subcarrier 18 to subcarrier 35.

Figure 13:
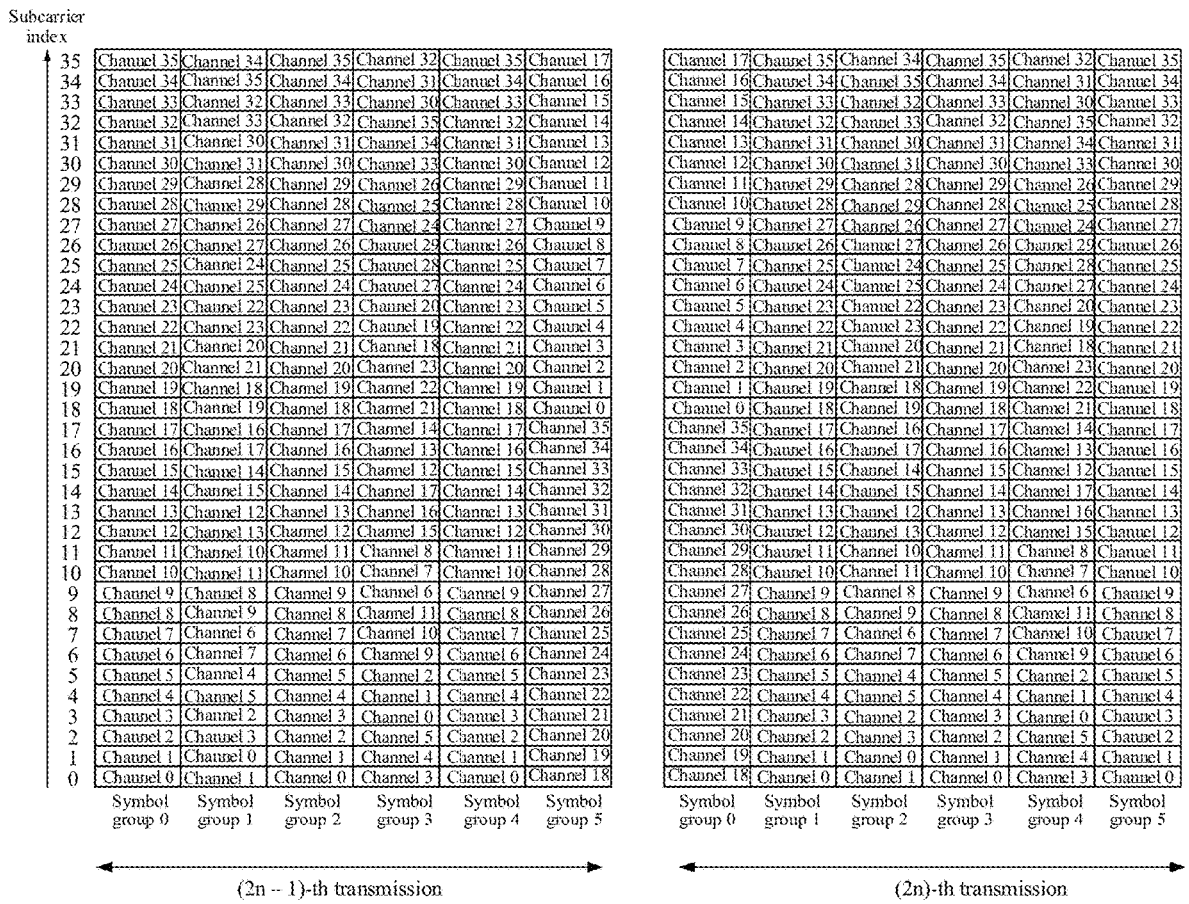
FIG. 13 is schematic diagram 6 of resource allocation according to an embodiment of the present disclosure.

In the above embodiments, the (2n−1)-th retransmission and the (2n)-th retransmission are two adjacent retransmissions. In the case where a1 is preferably 1, a2 is preferably 3, and a3 is preferably 18, FIG. 13 shows a solution for selecting subcarriers of symbol groups in the (2n−1)-th transmission and the (2n)-th transmission. The specific solution is described below.

In the (2n−1)-th retransmission, the transmission of the first signal occupies symbol groups 0 to 5. Each symbol group occupies a respective subcarrier in frequency domain. The six symbol groups are distributed in a first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the six symbol groups: symbol groups 0 to 5 (the symbol group indexes here are relative indexes used to describe the distribution of the symbol groups in the first time-frequency resource block). In FIG. 13, each symbol group has 36 occupiable subcarriers, that is, 36 available resources. 36 independent transmission resource combinations, that is, channels, may be formed for symbol groups 0 to 5. For example, subcarriers marked "channel 0" are selected from selectable subcarrier resources of the six symbol groups to form "channel 0". That is, a subcarrier index of symbol group 0 is 0, a subcarrier index of symbol group 1 is 1, a subcarrier index of symbol group 2 is 0, a subcarrier index of symbol group 3 is 3, a subcarrier index of symbol group 4 is 0, and a subcarrier index of symbol group 5 is 18. Channels 1 to 35 are generated in the same way, as shown in FIG. 13.

In the (2n)-th retransmission, the transmission of the first signal occupies symbol groups 0 to 5. Each symbol group occupies a respective subcarrier in frequency domain. The six symbol groups are distributed in a second time-frequency resource block. The frequency domain of the second time-frequency resource block includes 36 subcarriers numbered as subcarriers 0 to 35 (the subcarrier indexes here are relative indexes used to describe the distribution of the subcarriers in the second time-frequency resource block). The time domain length of the time-frequency resource block is the sum of time domain lengths of the six symbol groups: symbol groups 0 to 5 (the symbol group indexes here are relative indexes used to describe the distribution of the symbol groups in the second time-frequency resource block). In FIG. 13, each symbol group has 36 occupiable subcarriers, that is, 36 available resources. 36 independent transmission resource combinations, also referred to as channels, may be formed for symbol groups 0 to 5. For example, subcarriers marked "channel 0" are selected from selectable subcarrier resources of the six symbol groups to form "channel 0". That is, a subcarrier index of symbol group 0 is 18, a subcarrier index of symbol group 1 is 0, a subcarrier index of symbol group 2 is 1, a subcarrier index of symbol group 3 is 0, a subcarrier index of symbol group 4 is 3, and a subcarrier index of symbol group 5 is 0. Channels 1 to 35 are generated in the same way, as shown in FIG. 13.

Optionally, frequency domain positions of the 36 subcarriers included in the frequency domain of the second time-frequency resource block are the same as frequency domain positions of the 36 subcarriers included in the frequency domain of the first time-frequency resource block. The time domain position of the second time-frequency resource block is located followed the time domain position of the first time-frequency resource block.

Optionally, in the case where sa subcarrier occupied by symbol group 0 in a (2n−1)-th retransmission is selected from set 1, a subcarrier occupied by symbol group 0 in a (2n)-th retransmission is selected from set 2. Set 1 and set 2 satisfy at least one of the relationships described below.

In the case where set 1 includes subcarrier 0 to subcarrier 17, set 2 includes subcarrier 18 to subcarrier 35.

In the case where set 1 includes subcarrier 18 to subcarrier 35, set 2 includes subcarrier 0 to subcarrier 17.

Optionally, in the case where a subcarrier occupied by symbol group 5 in a (2n−1)-th retransmission is selected from set 3, a subcarrier occupied by symbol group 0 in a (2n)-th retransmission is selected from set 4. Set 3 and set 4 satisfy at least one of the relationships described below.

In the case where set 3 includes subcarrier 0 to subcarrier 17, set 4 includes subcarrier 0 to subcarrier 17.

In the case where set 3 includes subcarrier 18 to subcarrier 35, set 4 includes subcarrier 18 to subcarrier 35.

Optionally, in the case where a subcarrier occupied by symbol group 0 in a (2n−1)-th retransmission is selected from set 5, a subcarrier occupied by symbol group 0 in a (2n)-th retransmission is selected from set 6. Set 5 and set 6 satisfy at least one of the relationships described below.

In the case where set 5 includes subcarrier 0 to subcarrier 5, set 6 includes subcarrier 18 to subcarrier 23.

In the case where set 5 includes subcarrier 6 to subcarrier 11, set 6 includes subcarrier 24 to subcarrier 29.

In the case where set 5 includes subcarrier 12 to subcarrier 17, set 6 includes subcarrier 30 to subcarrier 35.

In the case where set 5 includes subcarrier 18 to subcarrier 23, set 6 includes subcarrier 0 to subcarrier 5.

In the case where set 5 includes subcarrier 24 to subcarrier 29, set 6 includes subcarrier 6 to subcarrier 11.

In the case where set 5 includes subcarrier 30 to subcarrier 35, set 6 includes subcarrier 12 to subcarrier 17.

Optionally, in the case where are subcarrier occupied by symbol group 5 in a (2n−1)-th retransmission is selected from set 7, a subcarrier occupied by symbol group 0 in a (2n)-th retransmission is selected from set 8. Set 7 and set 8 satisfy at least one of the relationships described below.

In the case where set 7 includes subcarrier 0 to subcarrier 5, set 8 includes subcarrier 0 to subcarrier 5.

In the case where set 7 includes subcarrier 6 to subcarrier 11, set 8 includes subcarrier 6 to subcarrier 11.

In the case where set 7 includes subcarrier 12 to subcarrier 17, set 8 includes subcarrier 12 to subcarrier 17.

In the case where set 7 includes subcarrier 18 to subcarrier 23, set 8 includes subcarrier 18 to subcarrier 23.

In the case where set 7 includes subcarrier 24 to subcarrier 29, set 8 includes subcarrier 24 to subcarrier 29.

In the case where set 7 includes subcarrier 30 to subcarrier 35, set 8 includes subcarrier 30 to subcarrier 35.

Optionally, subcarriers occupied by symbol group 5 in a (2n−1)-th retransmission is the same as the subcarrier occupied by symbol group 0 in the (2n)-th retransmission.

In the above embodiment, in the case where the first signal supports the retransmission, the number of symbol groups in the (2n−1)-th retransmission is 6, and the number of symbol groups in the (2n)-th retransmission is 5. n is an integer greater than or equal to 1.

Figure 14:
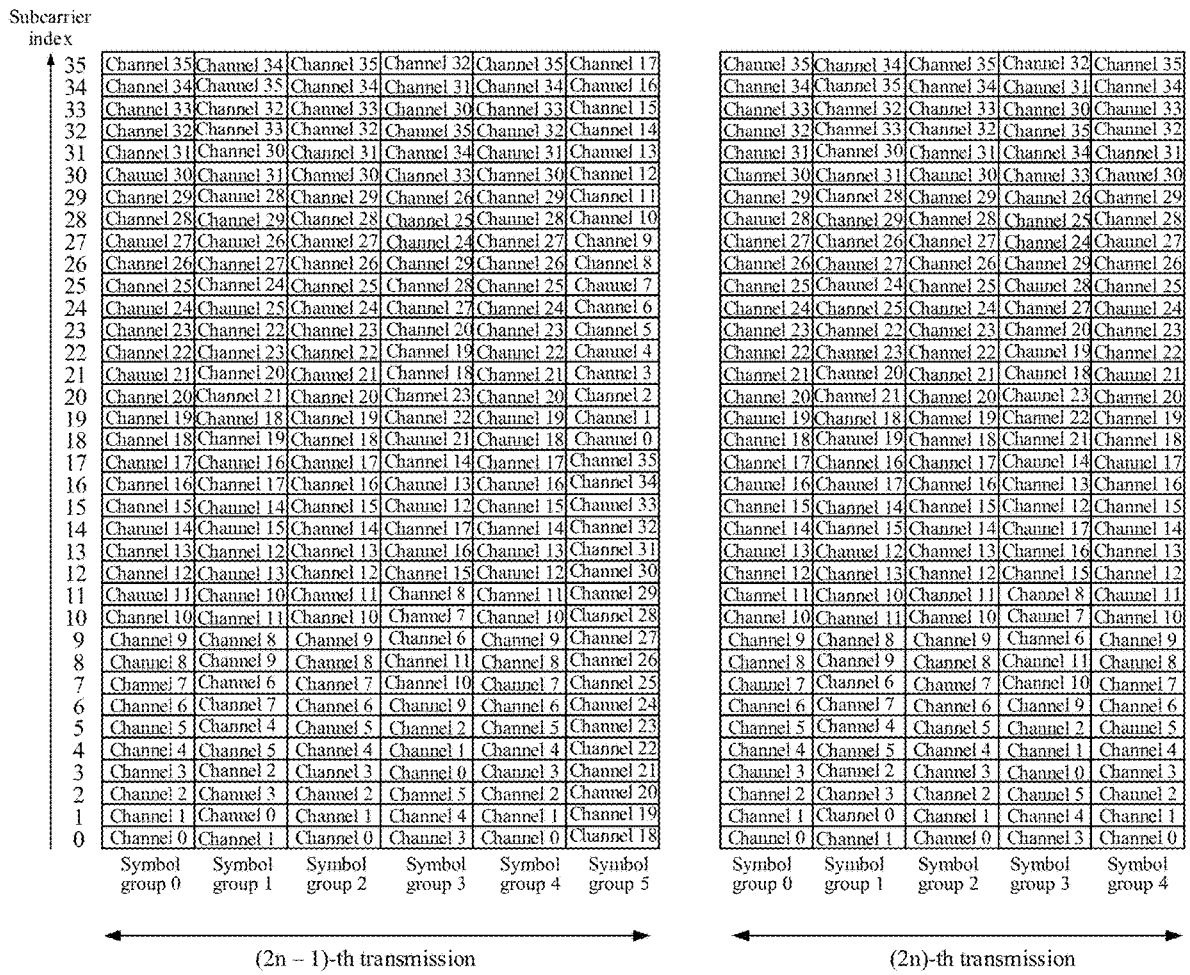
FIG. 14 is a schematic diagram of subcarrier selection according to an embodiment of the present disclosure.

In the case where a1 is preferably 1, a2 is preferably 3, and a3 is preferably 18, FIG. 14 shows a solution for selecting subcarriers of symbol groups in the (2n−1)-th retransmission and the (2n)-th retransmission.

In the (2n−1)-th retransmission, the transmission of the first signal occupies symbol groups 0 to 5. Each symbol group occupies a respective subcarrier in frequency domain. The six symbol groups are distributed in a first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the six symbol groups: symbol groups 0 to 5 (the symbol group indexes here are relative indexes used to describe the distribution of the symbol groups in the first time-frequency resource block). In FIG. 14, each symbol group has 36 occupiable subcarriers, that is, 36 available resources. 36 independent transmission resource combinations, that is, channels, may be formed for symbol groups 0 to 5. For example, subcarriers marked "channel 0" are selected from selectable subcarrier resources of the six symbol groups to form "channel 0". That is, a subcarrier index of symbol group 0 is 0, a subcarrier index of symbol group 1 is 1, a subcarrier index of symbol group 2 is 0, a subcarrier index of symbol group 3 is 3, a subcarrier index of symbol group 4 is 0, and a subcarrier index of symbol group 5 is 18. Channels 1 to 35 are generated in the same way, as shown in FIG. 14.

In the (2n)-th retransmission, the transmission of the first signal occupies symbol groups 0 to 4. Each symbol group occupies a respective subcarrier in frequency domain. The five symbol groups are distributed in a second time-frequency resource block. The frequency domain of the second time-frequency resource block includes 36 subcarriers numbered as subcarriers 0 to 35 (the subcarrier indexes here are relative indexes used to describe the distribution of the subcarriers in the second time-frequency resource block). The time domain length of the time-frequency resource block is the sum of time domain lengths of the five symbol groups: symbol groups 0 to 4 (the symbol group indexes here are relative indexes used to describe the distribution of the symbol groups in the second time-frequency resource block). In FIG. 14, each symbol group has 36 occupiable subcarriers, that is, 36 available resources. 36 independent transmission resource combinations, that is, channels, may be formed for symbol groups 0 to 4. For example, subcarriers marked "channel 0" are selected from selectable subcarrier resources of the five symbol groups to form "channel 0". That is, a subcarrier index of symbol group 0 is 0, a subcarrier index of symbol group 1 is 1, a subcarrier index of symbol group 2 is 0, a subcarrier index of symbol group 3 is 3, and a subcarrier index of symbol group 4 is 0. Channels 1 to 35 are generated in the same way, as shown in FIG. 14.

Optionally, frequency domain positions of the 36 subcarriers included in the frequency domain of the second time-frequency resource block are the same as frequency domain positions of the 36 subcarriers included in the frequency domain of the first time-frequency resource block. The time domain position of the second time-frequency resource block is located after the time domain position of the first time-frequency resource block.

Optionally, a subcarrier occupied by symbol group 5 in the (2n−1)-th retransmission is the same as a subcarrier occupied by symbol group 0 in the (2n)-th retransmission.

Specific Embodiment Two

In the case where a first signal includes seven symbol groups, the difference between subcarrier indexes occupied by two adjacent symbol groups includes at least one of +a1, −a1, +a2, −a2, +a3 or −a3. a1, a2 and a3 are integers greater than or equal to 1. a1 is less than or equal to a2. a2 is less than or equal to a3.

Subcarrier indexes occupied by the seven symbol groups include at least one of the following cases:

k, k+a1, k, k−a2, k, k+a3 and k;
k, k−a1, k, k−a2, k, k+a3 and k;
k, k+a1, k, k+a2, k, k+a3 and k;
k, k−a1, k, k+a2, k, k+a3 and k;
k, k+a1, k, k−a2, k, k−a3 and k;
k, k−a1, k, k−a2, k, k−a3 and k;
k, k+a1, k, k+a2, k, k−a3 and k; or
k, k−a1, k, k+a2, k, k−a3 and k.

k is an integer greater than or equal to 0.

In this embodiment, a1 is preferably 1, a2 is preferably 3, and a3 is preferably 18. A specific resource allocation solution is shown in FIG. 15. The seven symbol groups are distributed in a first time-frequency resource block. The first time-frequency resource block occupies 36 subcarriers in frequency domain. The time domain length of the first time-frequency resource block is the time domain length corresponding to the seven symbol groups. Specific solutions are described below. Solution 1:

A transmission of the first signal occupies symbol groups 0 to 6. Each symbol group occupies a respective subcarrier in frequency domain. The seven symbol groups are distributed in the first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the seven symbol groups: symbol groups 0 to 6 (the symbol group indexes here are relative indexes used to describe the distribution of the symbol groups in the first time-frequency resource block). In FIG. 15, each symbol group has 36 occupiable subcarriers, that is, 36 available resources. 36 independent transmission resource combinations, that is, channels, may be formed for symbol groups 0 to 6. For example, subcarriers marked "channel 0" are selected from selectable subcarrier resources of the seven symbol groups to form "channel 0". That is, a subcarrier index of symbol group 0 is 0, a subcarrier index of symbol group 1 is 1, a subcarrier index of symbol group 2 is 0, a subcarrier index of symbol group 3 is 3, a subcarrier index of symbol group 4 is 0, a subcarrier index of symbol group 5 is 18, and a subcarrier index of symbol group 6 is 0. Channels 1 to 35 are generated in the same way, as shown in FIG. 15.

Solution 2:

a1 is preferably 1. a2 is preferably 3. a3 is preferably 18. A specific resource allocation solution is shown in FIG. 16. The seven symbol groups are distributed in the first time-frequency resource block. The first time-frequency resource block occupies 36 subcarriers in frequency domain. The time domain length of the first time-frequency resource block is the time domain length corresponding to the seven symbol groups.

A transmission of the first signal occupies symbol groups 0 to 6. Each symbol group occupies a respective subcarrier in frequency domain. The seven symbol groups are distributed in the first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the seven symbol groups: symbol groups 0 to 6 (the symbol group indexes here are relative indexes used to describe the distribution of the symbol groups in the first time-frequency resource block). In FIG. 16, each symbol group has 36 occupiable subcarriers, that is, 36 available resources. 36 independent transmission resource combinations, that is, channels, may be formed for symbol groups 0 to 6. For example, subcarriers marked "channel 0" are selected from selectable subcarrier resources of the seven symbol groups to form "channel 0". That is, a subcarrier index of symbol group 0 is 0, a subcarrier index of symbol group 1 is 3, a subcarrier index of symbol group 2 is 0, a subcarrier index of symbol group 3 is 1, a subcarrier index of symbol group 4 is 0, a subcarrier index of symbol group 5 is 18, and a subcarrier index of symbol group 6 is 0. Channels 1 to 35 are generated in the same way, as shown in FIG. 16.

In this embodiment, in the seven symbol groups, subcarrier indexes of other six symbol groups may be determined through a subcarrier index of a first symbol group.

Specific Embodiment Three

In the case where a first signal includes five symbol groups, the difference between subcarrier indexes occupied by two adjacent symbol groups includes at least one of +b1, −b1, +b2 or −b2. b1 and b2 are integers greater than or equal to 1. b1 is less than or equal to b2.

Subcarrier indexes occupied by the five symbol groups include at least one of the following cases:

k, k+b1, k, k−b2 and k;
k, k−b1, k, k−b2 and k;
k, k+b1, k, k+b2 and k; or
k, k−b1, k, k+b2 and k.

k is an integer greater than or equal to 0.

In this embodiment, b1 is preferably 1, and b2 is preferably 18. Specific resource allocation solutions are described below.

Solution 1:

As shown in FIG. 17, the five symbol groups are distributed in a first time-frequency resource block, the first time-frequency resource block occupies 36 subcarriers in frequency domain, and the time domain length of the first time-frequency resource block is the time domain length corresponding to the five symbol groups.

A transmission of the first signal occupies symbol groups 0 to 4. Each symbol group occupies a respective subcarrier in the frequency domain. The five symbol groups are distributed in the first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the five symbol groups: symbol groups 0 to 4 (the symbol group indexes here are relative indexes used to describe the distribution of the symbol groups in the first time-frequency resource block). In FIG. 17, each symbol group has 36 occupiable subcarriers, that is, 36 available resources. 36 independent transmission resource combinations, that is, channels, may be formed for symbol groups 0 to 4. For example, subcarriers marked "channel 0" are selected from selectable subcarrier resources of the five symbol groups to form "channel 0". That is, a subcarrier index of symbol group 0 is 0, a subcarrier index of symbol group 1 is 1, a subcarrier index of symbol group 2 is 0, a subcarrier index of symbol group 3 is 18, and a subcarrier index of symbol group 4 is 0. Channels 1 to 35 are generated in the same way, as shown in FIG. 17.

Solution 2:

b1 is preferably 1. b2 is preferably 18. As shown in FIG. 18, the five symbol groups are distributed in a first time-frequency resource block, the first time-frequency resource block occupies 36 subcarriers in frequency domain, and the time domain length of the first time-frequency resource block is the time domain length corresponding to the five symbol groups.

A transmission of the first signal occupies symbol groups 0 to 4. Each symbol group occupies a respective subcarrier in the frequency domain. The five symbol groups are distributed in the first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the five symbol groups: symbol groups 0 to 4 (the symbol group indexes here are relative indexes used to describe the distribution of the symbol groups in the first time-frequency resource block). In FIG. 18, each symbol group has 36 occupiable subcarriers, that is, 36 available resources. 36 independent transmission resource combinations, also referred to as channels, may be formed for symbol groups 0 to 4. For example, subcarriers marked "channel 0" are selected from selectable subcarrier resources of the five symbol groups to form "channel 0". That is, a subcarrier index of symbol group 0 is 0, a subcarrier index of symbol group 1 is 1, a subcarrier index of symbol group 2 is 19, a subcarrier index of symbol group 3 is 1, and a subcarrier index of symbol group 4 is 0. Channels 1 to 35 are generated in the same way, as shown in FIG. 18.

Solution 3:

b1 is preferably 1. b2 is preferably 18. As shown in FIG. 19, the five symbol groups are distributed in a first time-frequency resource block, the first time-frequency resource block occupies 36 subcarriers in frequency domain, and the time domain length of the first time-frequency resource block is the time domain length corresponding to the five symbol groups.

A transmission of the first signal occupies symbol groups 0 to 4. Each symbol group occupies a respective subcarrier in the frequency domain. The five symbol groups are distributed in the first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the five symbol groups: symbol groups 0 to 4 (the symbol group indexes here are relative indexes used to describe the distribution of the symbol groups in the first time-frequency resource block). In FIG. 19, each symbol group has 36 occupiable subcarriers, that is, 36 available resources. 36 independent transmission resource combinations, also referred to as channels, may be formed for symbol groups 0 to 4. For example, subcarriers marked "channel 0" are selected from selectable subcarrier resources of the five symbol groups to form "channel 0". That is, a subcarrier index of symbol group 0 is 0, a subcarrier index of symbol group 1 is 1, a subcarrier index of symbol group 2 is 19, a subcarrier index of symbol group 3 is 18, and a subcarrier index of symbol group 4 is 0. Channels 1 to 35 are generated in the same way, as shown in FIG. 19.

Specific Embodiment Four

In the case where the first signal includes seven symbol groups, the difference between subcarrier indexes occupied by two adjacent symbol groups includes at least one of $+b1$, $-b1$, $+b2$ or $-b2$. $b1$ and $b2$ are integers greater than or equal to 1. $b1$ is less than or equal to $b2$.

Subcarrier indexes occupied by the seven symbol groups include at least one of the following cases:

k, k+b1, k+b1+b1, k+b1, k, k−b2 and k;
k, k−b1, k−b1−b1, k−b1, k, k−b2 and k;
k, k+b1, k+b1+b1, k+b1, k, k−b2 and k; or
k, k−b1, k−b1−b1, k−b1, k, k+b2 and k.

k is an integer greater than or equal to 0.
Specific allocation solutions are described below.
Solution 1:

$b1$ is preferably 1. $b2$ is preferably 18. As shown in FIG. 20, the seven symbol groups are distributed in a first time-frequency resource block, the first time-frequency resource block occupies 36 subcarriers in frequency domain, and the time domain length of the first time-frequency resource block is the time domain length corresponding to the seven symbol groups.

A transmission of the first signal occupies symbol groups 0 to 6. Each symbol group occupies a respective subcarrier in the frequency domain. The seven symbol groups are distributed in the first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the seven symbol groups: symbol groups 0 to 6 (the symbol group indexes here are relative indexes used to describe the distribution of the symbol groups in the first time-frequency resource block). In FIG. 20, each symbol group has 34 occupiable subcarriers, that is, 34 available resources. 34 independent transmission resource combinations, that is, channels, may be formed for symbol groups 0 to 6. For example, subcarriers marked "channel 0" are selected from selectable subcarrier resources of the seven symbol groups to form "channel 0". That is, a subcarrier index of symbol group 0 is 0, a subcarrier index of symbol group 1 is 1, a subcarrier index of symbol group 2 is 2, a subcarrier index of symbol group 3 is 1, a subcarrier index of symbol group 4 is 0, a subcarrier index of symbol group 5 is 18, and a subcarrier index of symbol group 6 is 0. Channels 1 to 33 are generated in the same way, as shown in FIG. 20.

Specific Embodiment Five

In the case where the first signal includes nine symbol groups, the difference between subcarrier indexes occupied by two adjacent symbol groups includes at least one of $+b1$, $-b1$, $+b2$ or $-b2$. $b1$ and $b2$ are integers greater than or equal to 1. $b1$ is less than $b2$.

Subcarrier indexes occupied by the nine symbol groups include at least one of the following cases:

k, k+b1, k+b1+b1, k+b1+b1+b1, k+b1+b1, k+b1, k, k−b2 and k;
k, k−b1, k−b1−b1, k−b1−b1−b1, k−b1−b1, k−b1, k, k−b2 and k;
k, k+b1, k+b1+b1, k+b1+b1+b1, k+b1+b1, k+b1, k, k+b2 and k; or
k, k−b1, k−b1−b1, k−b1−b1−b1, k−b1−b1, k−b1, k, k+b2 and k.

k is an integer greater than or equal to 0.
Specific configuration solutions are described below.
Solution 1:

$b1$ is preferably 1. $b2$ is preferably 18. As shown in FIG. 21, the nine symbol groups are distributed in a first time-frequency resource block, the first time-frequency resource block occupies 36 subcarriers in frequency domain, and the time domain length of the first time-frequency resource block is the time domain length corresponding to the nine symbol groups.

A transmission of the first signal occupies symbol groups 0 to 8. Each symbol group occupies a respective subcarrier in the frequency domain. The nine symbol groups are distributed in the first time-frequency resource block. The frequency domain of the first time-frequency resource block includes 36 subcarriers numbered as subcarriers 0 to 35 (the subcarrier indexes here are relative indexes used to describe the distribution of the subcarriers in the first time-frequency resource block). The time domain length of the time-frequency resource block is the sum of time domain lengths of the nine symbol groups: symbol groups 0 to 8 (the symbol group indexes here are relative indexes used to describe the distribution of the symbol groups in the first time-frequency resource block). In FIG. 21, each symbol group has 33 occupiable subcarriers, that is, 33 available resources. 33 independent transmission resource combinations, that is, channels, may be formed for symbol groups 0 to 8. For example, subcarriers marked "channel 0" are selected from selectable subcarrier resources of the nine symbol groups to form "channel 0". That is, a subcarrier index of symbol group 0 is 0, a subcarrier index of symbol group 1 is 1, a subcarrier index of symbol group 2 is 2, a subcarrier index of symbol group 3 is 3, a subcarrier index of symbol group 4 is 2, a subcarrier index of symbol group 5 is 1, a subcarrier index of symbol group 6 is 0, subcarrier index of symbol group 7 is 18, and subcarrier index of symbol group 8 is 0. Channels 1 to 33 are generated in the same way, as shown in FIG. 21.

Specific Embodiment Six

Subcarriers occupied by symbol group/in the first signal are determined through at least one of the following formulas:

$$\tilde{n}_{sc}^{RA}(i) = \begin{cases} (\tilde{n}_{sc}^{RA}(0) + f(i/2))\bmod N_{sc}^{RA} & i\bmod 8 = 0 \text{ and } i > 0 \\ (\tilde{n}_{sc}^{RA}(0) + f(i/2))\bmod N_{sc}^{RA} & i\bmod 8 = 2 \\ ((\tilde{n}_{sc}^{RA}(0) + f(i/2))\bmod 6) \times 2 + 1 & i\bmod 8 = 4 \text{ and } \tilde{n}_{sc}^{RA}(i-4)\bmod 2 = 0 \\ ((\tilde{n}_{sc}^{RA}(0) + f(i/2))\bmod 6) \times 2 & i\bmod 8 = 4 \text{ and } \tilde{n}_{sc}^{RA}(i-4)\bmod 2 = 1 \\ (\tilde{n}_{sc}^{RA}(0) + f(i/2))\bmod 6 & i\bmod 8 = 6 \text{ and } 6 \le \tilde{n}_{sc}^{RA}(i-4) < N_{sc}^{RA} \\ (\tilde{n}_{sc}^{RA}(0) + f(i/2))\bmod 6 + 6 & i\bmod 8 = 6 \text{ and } 6 \le \tilde{n}_{sc}^{RA}(i-4) < 6 \\ \tilde{n}_{sc}^{RA}(i-1) + 1 & i\bmod 4 = 1 \text{ and } \tilde{n}_{sc}^{RA}(i-1)\bmod 2 = 0 \\ \tilde{n}_{sc}^{RA}(i-1) - 1 & i\bmod 4 = 1 \text{ and } \tilde{n}_{sc}^{RA}(i-1)\bmod 2 = 1 \\ \tilde{n}_{sc}^{RA}(i-1) + 6 & i\bmod 4 = 3 \text{ and } \tilde{n}_{sc}^{RA}(i-1) < 6 \\ \tilde{n}_{sc}^{RA}(i-1) - 6 & i\bmod 4 = 3 \text{ and } \tilde{n}_{sc}^{RA}(i-1) \ge 6 \end{cases}$$

$$f(t) = \left(f(t-1) + \left(\sum_{n=10t+1}^{10t+9} c(n)2^{n-(10t+1)}\right)\bmod(N_{sc}^{RA} - 1) + 1\right)\bmod N_{sc}^{RA}$$

$f(-1) = 0$, or $$\tilde{n}_{sc}^{RA}(i) = \begin{cases} (\tilde{n}_{sc}^{RA}(0) + f(i/3))\bmod N_{sc}^{RA} & i\bmod 6 = 0 \text{ and } i > 0 \\ (\tilde{n}_{sc}^{RA}(0) + f(i/3))\bmod N_{sc}^{RA} & i\bmod 6 = 3 \\ \tilde{n}_{sc}^{RA}(i-1) + 1 & i\bmod 6 = 1 \text{ and } \tilde{n}_{sc}^{RA}(i-1)\bmod 2 = 0 \\ \tilde{n}_{sc}^{RA}(i-1) - 1 & i\bmod 6 = 2 \text{ and } \tilde{n}_{sc}^{RA}(i-2)\bmod 2 = 0 \\ \tilde{n}_{sc}^{RA}(i-1) - 1 & i\bmod 6 = 1 \text{ and } \tilde{n}_{sc}^{RA}(i-1)\bmod 2 = 1 \\ \tilde{n}_{sc}^{RA}(i-1) + 1 & i\bmod 6 = 2 \text{ and } \tilde{n}_{sc}^{RA}(i-2)\bmod 2 = 1 \\ \tilde{n}_{sc}^{RA}(i-1) + 6 & i\bmod 6 = 4 \text{ and } 0 \le \tilde{n}_{sc}^{RA}(i-1) < 6 \\ \tilde{n}_{sc}^{RA}(i-1) - 6 & i\bmod 6 = 5 \text{ and } 0 \le \tilde{n}_{sc}^{RA}(i-2) < 6 \\ \tilde{n}_{sc}^{RA}(i-1) - 6 & i\bmod 6 = 4 \text{ and } 6 \le \tilde{n}_{sc}^{RA}(i-1) < N_{sc}^{RA} \\ \tilde{n}_{sc}^{RA}(i-1) + 6 & i\bmod 6 = 5 \text{ and } 6 \le \tilde{n}_{sc}^{RA}(i-1) < N_{sc}^{RA} \end{cases}$$

$$f(t) = \left(f(t-1) + \left(\sum_{n=10t+1}^{10t+9} c(n)2^{n-(10t+1)}\right)\bmod(N_{sc}^{RA} - 1) + 1\right)\bmod N_{sc}^{RA}$$

$f(-1) = 0$ $\tilde{n}_{SC}^{RA}(i)$ denotes an index of subcarriers occupied by symbol group i among $N_{sc}^{RA}$ ($N_{sc}^{RA}$=12) consecutive subcarriers.

$\tilde{n}_{SC}^{RA}(0)$ denotes an index of subcarriers occupied by symbol group i, where i is equal to 0, among the $N_{sc}^{RA}$ ($N_{sc}^{RA}$=12) consecutive subcarriers.

$\tilde{n}_{SC}^{RA}(0)=n_{init}$ mod $N_{sc}^{RA}$, where $n_{init}$ is selected from subcarrier indexes configured for the first signal. For example, $\{0, 1, \ldots, N_{sc}^{NPRACH}-1\}$ includes the subcarrier indexes configured for the first signal, where $N_{sc}^{NPRACH}$ denotes the number of subcarriers configured for the first signal, and then, $n_{init}$ is selected from $\{0, 1, \ldots, N_{sc}^{NPRACH}-1\}$.

The subcarrier indexes in $\{0, 1, \ldots, N_{sc}^{NPRACH}-1\}$ are used to describe indexes of the $N_{sc}^{NPRACH}$ subcarriers configured for the first signal. In an uplink system bandwidth, a subcarrier in $\{0, 1, \ldots, N_{sc}^{NPRACH}-1\}$ corresponds to a subcarrier index that is equal to the subcarrier index in $\{0, 1, \ldots, N_{sc}^{NPRACH}-1\}$ plus a subcarrier offset $N_{scoffset}^{NPRACH}$. For example, a subcarrier with subcarrier index 0 in $\{0, 1, \ldots, N_{sc}^{NPRACH}-1\}$ corresponds to index $(N_{scoffset}^{NPRACH}+0)$ in the uplink system bandwidth, and a subcarrier with subcarrier index 1 in $\{0, 1, \ldots, N_{sc}^{NPRACH}-1\}$ corresponds to index $(N_{scoffset}^{NPARCH}+1)$ in the uplink system bandwidth.

The sequence c(n) is generated in the manner described below.

Pseudo-random sequences are defined by a length-31 Gold sequence. The output sequence c(n) of length $M_{PN}$, where n=0, 1, . . . , $M_{PN}$−1 is defined by $c(n)=(x_1(n+N_C)+x_2(n+N_C))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$.

In the formulas, $N_c$=1600;
$x_1(0)$=1, $x_1(n)$=0, n=1, 2, . . . , 30; and
the initialization of the $x_2(n)$ satisfies that $c_{init}=\Sigma_{i=0}^{30} x_2(i)\cdot 2^i$, where is generated according to the following predetermined rules:

$c_{init}=2^{15}\cdot N_{ID}^{Ncell}+2^4\cdot n_f+2^2\cdot n_{CELevel}$, or $c_{init}=2^{15}\cdot N_{ID}^{Ncell}+2^4\cdot n_f+n_{Carrier}$.

In the predetermined rules:

$(n_f-\lfloor N_{start}^{NPRACH}/10\rfloor)\bmod(N_{period}^{NPRACH}/10)=0$;

$n_{Carrier}$ denotes a carrier index occupied in the transmission of the first signal;

$N_{ID}^{Ncell}$ denotes a cell number;

$n_f$ denotes a frame number;

$n_{CELevel}$ denotes a coverage enhancement level or a retransmission level of the first signal, and values of $n_{CELevel}$ are 0, 1 and 2;

$N_{period}^{NPRACH}$ denotes a transmission period of the first signal, and the transmission period is in milliseconds; and $N_{start}^{NPRACH}$ denotes an offset of a starting position of the first signal in the transmission period, and the offset is in milliseconds.

Symbol group i (i is an integer greater than or equal to 0) corresponds to subcarrier index $n_{sc}^{RA}(i)$ ($n_{sc}^{RA}(i)=n_{start}+\tilde{n}_{SC}^{RA}(i)$) in the uplink system bandwidth.

$n_{sc}^{RA}(i)$ denotes an subcarrier index of subcarriers occupied by symbol group i in the uplink system bandwidth. $n_{start}=N_{scoffset}^{NPRACH}+\lfloor n_{init}/N_{sc}^{RA}\rfloor \cdot N_{sc}^{RA}$.

Specific Embodiment Seven

In the case where a first signal is a random access signal, a second node transmits a random access response message to a first node after receiving the random access signal transmitted by the first node. The second node is a base station or a relay.

The random access response message includes at least an MAC header and an MAC payload. The MAC header includes at least one MAC subheader.

The MAC subheader includes one or more types of MAC subheader. One type of MAC subheader consists of eight bits. K bits in the eight bits are used to indicate an RAPID. K is preferably 6.

The RAPID may indicate at least one of: an index of a first set, where the first set includes subcarriers where first symbol groups of N (N is an integer greater than or equal to 1, preferably 3) random access signals are located; or RAPID=Index/M, where Index denotes a subcarrier index corresponding to a first symbol group in the random access signal, and M is an integer greater than or equal to 1, preferably 3. The RAPID is an integer greater than or equal to 0.

In the case where the RAPID is the index of the first set, the MAC payload at least includes one MAC RAR corresponding to the RAPID, and the one MAC RAR includes first indication information. The first indication information indicates an index of a subcarrier corresponding to the one MAC RAR in the first set.

In the case where the RAPID=Index/M, the MAC payload at least includes one MAC RAR corresponding to the RAPID, and the one MAC RAR message includes indication information. The indication information indicates an index of a subcarrier corresponding to the one MAC RAR message in a second set. The second set includes subcarriers with a subcarrier index of [RAPID, (RAPID+1)*M−1].

For an NB-IoT system having a system bandwidth of 180 kHz and a subcarrier spacing of 1.25 kHz corresponding to the random access signal, at most 144 subcarriers can be configured for the random access signal in the system bandwidth, and the 144 subcarriers correspond to subcarrier indexes 0 to 143. After receiving the random access signal transmitted by a terminal, the base station transmits a random access response (RAR) message to the terminal. The RAR message is scheduled through a control channel. That is, scheduling information of the RAR message is included in downlink control information (DCI), and the DCI is transmitted through the control channel. The DCI information further includes a cyclic redundancy check code (CRC). The CRC is scrambled by using a random access-radio network temporary identifier (RA-RNTI). The RA-RNTI value range corresponding to an RAR message of a random access signal having a subcarrier spacing of 1.25 kHz is different from the RA-RNTI value range corresponding to an RAR message of a random access signal having another subcarrier spacing.

For example, in the case where the RA-RNTI value range corresponding to an RAR message of a random access signal having a subcarrier spacing of 3.75 kHz is 1+floor(SFN_id/4)+256*carrier_id, the RA-RNTI value range corresponding to the RAR message of the random access signal having a subcarrier spacing of 1.25 kHz satisfies that RA-RNTI=4096+1+floor(SFN_id/4)+256*carrier_id.

SFN_id denotes a frame number corresponding to a starting position of a transmission of the random access signal. carrier_id denotes a carrier number occupied by the transmission of the random access signal.

Figure 22:
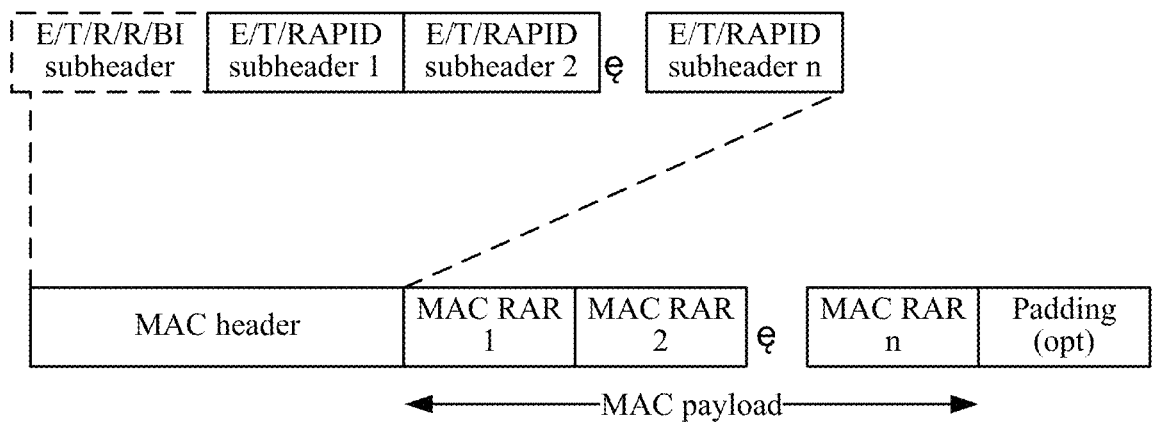
FIG. 22 is a structure diagram of an MAC header of a random access response message according to an embodiment of the present disclosure.

The random access response message includes at least an MAC header and an MAC payload, as shown in FIG. 22.

Figure 23:
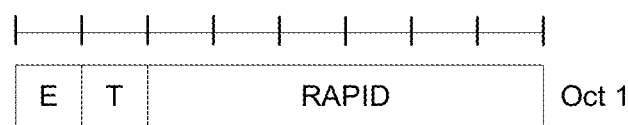
FIG. 23 is structure diagram 1 of an MAC subheader of a random access response message according to an embodiment of the present disclosure.

The MAC header includes multiple MAC subheaders. The multiple MAC subheaders consist of two types of subheader. The structure of subheader type 1 is shown in FIG. 23. The structure of subheader type 2 is shown in FIG. 24.

Figure 24:
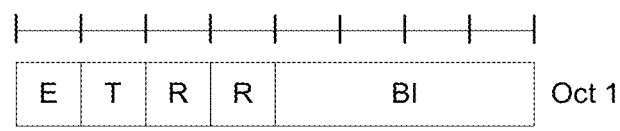
FIG. 24 is structure diagram 2 of an MAC subheader of a random access response message according to an embodiment of the present disclosure.

In FIGS. 23 and 24:

E is used to indicate whether there are other MAC subheaders after a current MAC subheader in the MAC header; E of "1" indicates that there are other MAC subheaders after the current MAC subheader, and E of "0" indicates that there are no other MAC sub-headers after the current MAC subheader;

T indicates that whether the information carried after T in the current MAC subheader is the RAPID or a backoff indicator (BI); T of "0" indicates that the BI is carried after T in the current MAC subheader, and T of "1" indicates that the RAPID is carried after T in the current MAC subheader; and R is a reserved bit and set to "0".

In this embodiment, subheader type 1 consists of eight bits, and six bits in the eight bits are used to represent the RAPID. The RAPID is an index of a first set. The first set includes subcarriers where first symbol groups of three random access signals are located. In this embodiment, 144 subcarriers can be configured for the three random access signals at most, and thus, 48 first sets can be configured at most. Indexes of the first sets are 0 to 47 and are each indicated by the RAPID of six bits. For example, the RAPID of 0 indicates a first set with index 0, and correspondingly, the first symbol groups of the three random access signals are located on subcarriers 0, 1 and 2; the RAPID of 1 indicates a first set with index 1, and correspondingly, the first symbol groups of the three random access signals are located on subcarriers 3, 4 and 5; and by analogy, the RAPID of 47 indicates a first set with index 47, and correspondingly, the first symbol groups of the three random access signals are located on subcarriers 141, 142 and 143.

The MAC payload includes one MAC RAR corresponding to the RAPID. The structure of the one MAC RAR is shown in FIG. 25. In this embodiment, the RAPID=1, and correspondingly, the first symbol groups of the three random access signals are located on subcarriers 3, 4 and 5. The one MAC RAR includes a piece of indication information. The indication information indicates which one of subcarriers 3, 4 and 5 corresponds to the one MAC RAR.

In FIG. 25, R denotes reserved bits, and R is six bits in this embodiment; Timing Advance Command carries an adjustment amount of timing advance, and the length of Timing Advance Command is 11 bits in this embodiment; UL Grant carries uplink scheduling information, and the length of UL Grant is 15 bits in this embodiment; and Temporary C-RNTI is a temporary cell-radio network temporary identifier, and the length of Temporary C-RNTI is 16 bits in this embodiment.

In this embodiment, the length of the indication information is two bits, and the two bits are included in five-bit R of FIG. 25. The indication information of "01" indicates that the one MAC RAR corresponds to the first subcarrier of subcarriers 3, 4 and 5, that is, corresponds to subcarrier 3. The indication information of "10" indicates that the MAC RAR corresponds to the second subcarrier of subcarriers 3, 4 and 5, that is, corresponds to subcarrier 4. The indication information of "11" indicates that the MAC RAR corresponds to the third subcarrier of subcarriers 3, 4 and 5, that is, corresponds to subcarrier 5.

Except for this embodiment, the MAC payload includes three MAC RARs correspond to the RAPID. The structure of each MAC RAR is shown in FIG. 25. In this embodiment, the RAPID=1, and correspondingly, the first symbol groups of the three random access signals are located on subcarriers 3, 4 and 5. Each MAC RAR includes a piece of indication information. The indication information is used to indicate which one of subcarriers 3, 4 and 5 corresponds to a respective MAC RAR.

In this embodiment, the length of the indication information is two bits, and the two bits are included in the five-bit R of FIG. 25. The indication information of "01" indicates that the respective MAC RAR corresponds to the first subcarrier of subcarriers 3, 4 and 5, that is, corresponds to subcarrier 3. The indication information of "10" indicates that the respective MAC RAR corresponds to the second subcarrier of subcarriers 3, 4 and 5, that is, corresponds to subcarrier 4. The indication information of "11" indicates that the respective MAC RAR corresponds to the third subcarrier of subcarriers 3, 4 and 5, that is, corresponds to subcarrier 5.

In this embodiment, three pieces of two-bit indication information in the three MAC RARs are "01", "10" and "11", indicating that the three MAC RARs correspond to subcarriers 3, 4 and 5, respectively.

Specific Embodiment Eight

Preferably, a sorting method of M TBSs is sorting the M TBSs from greatest to least. Thus, the greatest TBS corresponds to the first TBS, and the least TBS corresponds to the M-th TBS, where $1 \leq m \leq M$.

A first message is preferably message 3 in a random access process, also referred to as Msg3. In the case where data transmission is supported in Msg3, the maximum TBS configured for Msg3 through a system information block (SIB) is 1000 bits, and it can be known, according to a predefined rule or a predefined table, that four TBSs supported by Msg3 are 1000 bits, 776 bits, 536 bits and 328 bits respectively.

A table of adjustment factors is predefined in a system. Table 1 includes values of adjustment factors. As shown in Table 1, in the case where adjustment factor indicated by the SIB corresponds to index 3, the adjustment factors for retransmission numbers of Msg3 corresponding to the four TBSs supported by Msg3 are 1, 6/8, 4/8 and 2/8 respectively.

TABLE 1

| Index | Adjustment Factor Value | | | |
| --- | --- | --- | --- | --- |
| | First TBS | Second TBS | Third TBS | Fourth TBS |
| 0 | 1 | 1 | 1 | 1 |
| 1 | 1 | 1 | 4/8 | 4/8 |
| 2 | 1 | 7/8 | 5/8 | 3/8 |
| 3 | 1 | 6/8 | 4/8 | 2/8 |

In the case where the retransmission number of Msg3 configured in the random access response message is 256, retransmission numbers of Msg3 corresponding to the four TBSs (1000 bits, 776 bits, 536 bits and 328 bits) supported by Msg3 are calculated according to Table 2 (a table including a retransmission number of Msg3 corresponding to each TBS).

TABLE 2

| The Retransmission Number of Msg3 Corresponding to Each TBS | |
| --- | --- |
| TBS (bits) | Retransmission number of Msg3 |
| 1000 | 256 × 1 = 256 |
| 776 | 256 × 6/8 = 192 |
| 536 | 256 × 4/8 = 128 |
| 328 | 256 × 2/8 = 64 |

A first message is preferably message 3 in a random access process, also referred to as Msg3. In the case where data transmission is supported in Msg3, the maximum TBS configured for Msg3 through a system information block (SIB) is 1000 bits, and it can been known, according to a predefined rule or a predefined table, that four TBSs supported by Msg3 are 1000 bits, 776 bits, 536 bits and 328 bits respectively.

A table of adjustment factors is predefined in a system. As shown in Table 3, in the case where adjustment factors indicated by the SIB correspond to index 3, the adjustment factors for retransmission number of Msg3 corresponding to the four TBSs supported by Msg3 are 1, 6/8, 4/8 and 2/8 respectively.

TABLE 3

| Index | Adjustment Factor value | | |
| --- | --- | --- | --- |
| | Adjustment Factor Value | | |
| | First TBS | Second TBS | Third TBS |
| 0 | 1 | 1 | 1 |
| 1 | 1 | 4/8 | 4/8 |
| 2 | 7/8 | 5/8 | 3/8 |
| 3 | 6/8 | 4/8 | 2/8 |

In the case where the retransmission number of Msg3 configured in the random access response message is 256, the retransmission number of Msg3 corresponding to the maximum TBS (1000 bits) supported by Msg3 is 256, and retransmission numbers of Msg3 corresponding to the other three TBSs (776 bits, 536 bits and 328 bits) supported by Msg3 are calculated according to Table 4.

TABLE 4

The Retransmission Number of Msg3 Corresponding to Each TBS

| TBS (bits) | Retransmission number of Msg3 |
|---|---|
| 776 | 256 × 6/8 = 192 |
| 536 | 256 × 4/8 = 128 |
| 328 | 256 × 2/8 = 64 |

A first message is preferably message 3 in a random access process, also referred to as Msg3. In the case where data transmission is supported in Msg3, the maximum TBS configured for Msg3 through a system information block (SIB) is 1000 bits, and it can been known, according to a predefined rule or a predefined table, that four TBSs supported by Msg3 are 1000 bits, 776 bits, 536 bits and 328 bits respectively.

The value range of an adjustment factor is predefined in the system. In this embodiment, the value range of the adjustment factor is {1, 7/8, 6/8, 5/8, 4/8, 3/8, 2/8 and 1/8}. The SIB indicates that adjustment factors for the four TBSs are 1, 6/8, 4/8 and 2/8 respectively.

In the case where the retransmission number of Msg3 configured in the random access response message is 256, the retransmission numbers of Msg3 corresponding to the four TBSs (1000 bits, 776 bits, 536 bits and 328 bits) supported by Msg3 are calculated according to Table 5.

TABLE 5

The Retransmission Number of Msg3 Corresponding to Each TBS

| TBS (bits) | Retransmission number of Msg3 |
|---|---|
| 1000 | 256 × 1 = 256 |
| 776 | 256 × 6/8 = 192 |
| 536 | 256 × 4/8 = 128 |
| 328 | 256 × 2/8 = 64 |

A first message is preferably message 3 in a random access process, also referred to as Msg3. In the case where data transmission is supported in Msg3, the maximum TBS configured for Msg3 through a system information block (SIB) is 504 bits, and it can been known, according to Table 6, that three TBSs supported by Msg3 are 504 bits, 408 bits and 328 bits respectively.

TABLE 6

TBS Configuration TBS

| | Maximum TBS Value | | | | | | | |
|---|---|---|---|---|---|---|---|---|
| | 328 | 408 | 504 | 584 | 680 | 808 | 936 | 1000 |
| Supported TBS | 328 | 328 | 328 | 328 | 328 | 328 | 328 | 328 |
| | | 408 | 408 | 408 | 456 | 504 | 504 | 536 |
| | | | 504 | 504 | 504 | 584 | 680 | 712 | 776 |
| | | | | 584 | 680 | 808 | 936 | 1000 |

A table of adjustment factors is predefined in a system. As shown in Table 7, in the case where adjustment factors indicated by the SIB correspond to index 3, the adjustment factors for retransmission numbers of Msg3 corresponding to the three TBSs supported by Msg3 are the first three values of the four adjustment factors (1, 6/8, 4/8 and 2/8) in the row corresponding to index 3, that is, the adjustment factors are 1, 6/8 and 4/8.

TABLE 7

Adjustment Factor Value

| | Adjustment Factor Value | | | |
|---|---|---|---|---|
| Index | First TBS | Second TBS | Third TBS | Fourth TBS |
| 0 | 1 | 1 | 1 | 1 |
| 1 | 1 | 1 | 4/8 | 4/8 |
| 2 | 1 | 7/8 | 5/8 | 3/8 |
| 3 | 1 | 6/8 | 4/8 | 2/8 |

In the case where the retransmission number of Msg3 configured in the random access response message is 256, numbers of times Msg3 is retransmitted corresponding to the three TBSs (504 bits, 408 bits and 328 bits) supported by Msg3 are calculated according to Table 8.

TABLE 8

The Retransmission Number of Msg3 Corresponding to Each TBS

| TBS (bits) | Retransmission number of Msg3 |
|---|---|
| 504 | 256 × 1 = 256 |
| 408 | 256 × 6/8 = 192 |
| 328 | 256 × 4/8 = 128 |

A first message is preferably message 3 in a random access process, also referred to as Msg3. In the case where data transmission is supported in Msg3, the maximum TBS configured for Msg3 through a system information block (SIB) is 504 bits, and it can been known, according to Table 9, that three TBSs supported by Msg3 are 504 bits, 408 bits and 328 bits respectively.

TABLE 9

TSB Configuration

| | Maximum TBS Value | | | | | | | |
|---|---|---|---|---|---|---|---|---|
| | 328 | 408 | 504 | 584 | 680 | 808 | 936 | 1000 |
| Supported TBS | 328 | 328 | 328 | 328 | 328 | 328 | 328 | 328 |
| | | 408 | 408 | 408 | 456 | 504 | 504 | 536 |
| | | | 504 | 504 | 584 | 680 | 712 | 776 |
| | | | | 584 | 680 | 808 | 936 | 1000 |

A table of adjustment factors is predefined in a system. As shown in Table 10, in the case where adjustment factors indicated by the SIB correspond to index 3, the adjustment factors for retransmission numbers of Msg3 corresponding to two TBSs (other than the maximum TBS) supported by Msg3 are the first two values of the three adjustment factors (6/8, 4/8 and 2/8) in the row corresponding to index 3, that is, the adjustment factors are 6/8 and 4/8.

TABLE 10

Adjustment Factor Value

| Index | Adjustment Factor Value | | |
|---|---|---|---|
| | First TBS | Second TBS | Third TBS |
| 0 | 1 | 1 | 1 |
| 1 | 1 | 4/8 | 4/8 |
| 2 | 7/8 | 5/8 | 3/8 |
| 3 | 6/8 | 4/8 | 2/8 |

In the case where a retransmission number of Msg3 configured in the random access response message is 256, a retransmission number of Msg3 corresponding to the maximum TBS (504 bits) supported by Msg3 is 256, and a retransmission number of Msg3 corresponding to the other two TBSs (408 bits and 328 bits) supported by Msg3 are calculated according to Table 11.

TABLE 11

The Retransmission Number of Msg3 Corresponding to Each TBS

| TBS (bits) | The number of Times Msg3 Is Retransmitted |
|---|---|
| 408 | 256 × 6/8 = 192 |
| 328 | 256 × 4/8 = 128 |

An embodiment of the present disclosure further provides a storage medium. The storage medium stores a computer program. The computer program is configured to, when running, implement the steps in any method embodiment above.

Optionally, in this embodiment, the storage medium may be configured to store a computer program for implementing the above steps.

Optionally, in this embodiment, the storage medium may include, but is not limited to, a USB flash disk, a read-only memory (ROM), a random access memory (RAM), a mobile hard disk, a magnetic disk, an optical disk or another medium capable of storing a computer program.

An embodiment of the present disclosure further provides an electronic apparatus. The electronic apparatus includes a memory and a processor. The memory stores a computer program. The processor is configured to execute the computer program to implement the steps in any method embodiment above.

Optionally, the electronic apparatus may further include a transmission device and an input-output device. Both the transmission device and the input-output device are connected to the processor.

Optionally, for specific examples in this embodiment, refer to the examples described in the embodiments and optional implementations above, which are not repeated in this embodiment.

Apparently, it is to be understood by those skilled in the art that the modules or steps of the present disclosure may be implemented by at least one generic computing apparatus and may be concentrated on a single computing apparatus or distributed in a network formed by multiple computing apparatuses. Optionally, these modules or steps may be implemented by program codes executable by the at least one computing apparatus. Thus, these modules or steps may be stored in a storage medium and executed by the at least one computing apparatus. Moreover, in some cases, the illustrated or described steps may be performed in a sequence different from the sequence described herein. Alternatively, each of these modules or steps may be implemented by being made into an integrated circuit module or multiple modules of these modules or steps may be implemented by being made into a single integrated circuit module. In this way, the present disclosure is not limited to any specific combination of hardware and software.

The above are merely preferred embodiments of the present disclosure and are not intended to limit the present disclosure. For those skilled in the art, the present disclosure may have various modifications and variations. Any modifications, equivalent substitutions, improvements and the like within the principle of the present disclosure shall fall within the scope of the present disclosure.

What is claimed is:

1. A wireless communication method, comprising:
   determining resources for a random-access signal to be transmitted on a channel for narrowband wireless communications, wherein the resources are in a region that comprises 36 subcarriers and six symbol groups, wherein the six symbol groups are assigned indices 0, 1, 2, 3, 4, and 5, wherein each symbol group comprises a cyclic prefix and one or more symbols, and wherein a subcarrier index occupied by a symbol group is determined based on:
      determining a first subcarrier index occupied by an adjacent symbol group that is adjacent to the symbol group, and
      determining the subcarrier index based on the first subcarrier index and an offset value that comprises at least one of 3, −3, 18, or −18; and
   transmitting the random-access signal on the channel for the narrowband wireless communications using the determined resources.

2. The method of claim 1, wherein the offset value for symbol group index 2 and symbol group index 4 is 3 or −3.

3. The method of claim 1, wherein the offset value for symbol group index 3 is 18 or −18.

4. The method of claim 1, wherein, given a channel having a channel index of {0, 1, 2, . . . , 35}, the resources for the random-access signal corresponding to the channel are defined as:

| Subcarrier index | 35 | Channel 35 Channel 34 Channel 33 Channel 15 Channel 16 Channel 17 |
|---|---|---|
| | 34 | Channel 34 Channel 35 Channel 30 Channel 12 Channel 17 Channel 16 |
| | 33 | Channel 33 Channel 32 Channel 31 Channel 13 Channel 14 Channel 15 |

| | | | | | | |
|---|---|---|---|---|---|---|
| 32 | Channel 32 | Channel 33 | Channel 34 | Channel 16 | Channel 15 | Channel 14 |
| 31 | Channel 31 | Channel 30 | Channel 35 | Channel 17 | Channel 12 | Channel 13 |
| 30 | Channel 30 | Channel 31 | Channel 32 | Channel 14 | Channel 13 | Channel 12 |
| 29 | Channel 29 | Channel 28 | Channel 27 | Channel 9 | Channel 10 | Channel 11 |
| 28 | Channel 28 | Channel 29 | Channel 24 | Channel 6 | Channel 11 | Channel 10 |
| 27 | Channel 27 | Channel 26 | Channel 25 | Channel 7 | Channel 8 | Channel 9 |
| 26 | Channel 26 | Channel 27 | Channel 28 | Channel 10 | Channel 9 | Channel 8 |
| 25 | Channel 25 | Channel 24 | Channel 29 | Channel 11 | Channel 6 | Channel 7 |
| 24 | Channel 24 | Channel 25 | Channel 26 | Channel 8 | Channel 7 | Channel 6 |
| 23 | Channel 23 | Channel 22 | Channel 21 | Channel 3 | Channel 4 | Channel 5 |
| 22 | Channel 22 | Channel 23 | Channel 18 | Channel 0 | Channel 5 | Channel 4 |
| 21 | Channel 21 | Channel 20 | Channel 19 | Channel 1 | Channel 2 | Channel 3 |
| 20 | Channel 20 | Channel 21 | Channel 22 | Channel 4 | Channel 3 | Channel 2 |
| 19 | Channel 19 | Channel 18 | Channel 23 | Channel 5 | Channel 0 | Channel 1 |
| ↑ 18 | Channel 18 | Channel 19 | Channel 20 | Channel 2 | Channel 1 | Channel 0 |
| 17 | Channel 17 | Channel 16 | Channel 15 | Channel 33 | Channel 34 | Channel 35 |
| 16 | Channel 16 | Channel 17 | Channel 12 | Channel 30 | Channel 35 | Channel 34 |
| 15 | Channel 15 | Channel 14 | Channel 13 | Channel 31 | Channel 32 | Channel 33 |
| 14 | Channel 14 | Channel 15 | Channel 16 | Channel 34 | Channel 33 | Channel 32 |
| 13 | Channel 13 | Channel 12 | Channel 17 | Channel 35 | Channel 30 | Channel 31 |
| 12 | Channel 12 | Channel 13 | Channel 14 | Channel 32 | Channel 31 | Channel 30 |
| 11 | Channel 11 | Channel 10 | Channel 9 | Channel 27 | Channel 28 | Channel 29 |
| 10 | Channel 10 | Channel 11 | Channel 6 | Channel 24 | Channel 29 | Channel 28 |
| 9 | Channel 9 | Channel 8 | Channel 7 | Channel 25 | Channel 26 | Channel 27 |
| 8 | Channel 8 | Channel 9 | Channel 10 | Channel 28 | Channel 27 | Channel 26 |
| 7 | Channel 7 | Channel 6 | Channel 11 | Channel 29 | Channel 24 | Channel 25 |
| 6 | Channel 6 | Channel 7 | Channel 8 | Channel 26 | Channel 25 | Channel 24 |
| 5 | Channel 5 | Channel 4 | Channel 3 | Channel 21 | Channel 22 | Channel 23 |
| 4 | Channel 4 | Channel 5 | Channel 0 | Channel 18 | Channel 23 | Channel 22 |
| 3 | Channel 3 | Channel 2 | Channel 1 | Channel 19 | Channel 20 | Channel 21 |
| 2 | Channel 2 | Channel 3 | Channel 4 | Channel 22 | Channel 21 | Channel 20 |
| 1 | Channel 1 | Channel 0 | Channel 5 | Channel 23 | Channel 18 | Channel 19 |
| 0 | Channel 0 | Channel 1 | Channel 2 | Channel 20 | Channel 19 | Channel 18 |
| | Symbol group 0 | Symbol group 1 | Symbol group 2 | Symbol group 3 | Symbol group 4 | Symbol group 5. |

5. The method of claim 1, wherein the random-access signal is retransmitted.

6. A wireless communication method, comprising:
receiving a random access signal on a channel for narrowband wireless communications using resources in a region that comprises 36 subcarriers and six symbol groups, wherein the six symbol groups are assigned indices 0, 1, 2, 3, 4, and 5, wherein each symbol group comprises a cyclic prefix and one or more symbols, and wherein a subcarrier index occupied by a symbol group is determined based on (1) a first subcarrier index occupied by an adjacent symbol group that is adjacent to the symbol group and (2) an offset value with respect to the first subcarrier index, the offset value comprising at least one of 3, −3, 18, or −18.

7. The method of claim 6, wherein the offset value for symbol group index 2 and symbol group index 4 is 3 or −3.

8. The method of claim 6, wherein the offset value for symbol group index 3 is 18 or −18.

9. The method of claim 6, wherein, given a channel having a channel index of {0, 1, 2, . . . , 35}, the resources for the random-access signal corresponding to the channel are defined as:

| Subcarrier index | | | | | | | |
|---|---|---|---|---|---|---|---|
| | 35 | Channel 35 | Channel 34 | Channel 33 | Channel 15 | Channel 16 | Channel 17 |
| | 34 | Channel 34 | Channel 35 | Channel 30 | Channel 12 | Channel 17 | Channel 16 |
| | 33 | Channel 33 | Channel 32 | Channel 31 | Channel 13 | Channel 14 | Channel 15 |
| | 32 | Channel 32 | Channel 33 | Channel 34 | Channel 16 | Channel 15 | Channel 14 |
| | 31 | Channel 31 | Channel 30 | Channel 35 | Channel 17 | Channel 12 | Channel 13 |
| | 30 | Channel 30 | Channel 31 | Channel 32 | Channel 14 | Channel 13 | Channel 12 |
| | 29 | Channel 29 | Channel 28 | Channel 27 | Channel 9 | Channel 10 | Channel 11 |
| | 28 | Channel 28 | Channel 29 | Channel 24 | Channel 6 | Channel 11 | Channel 10 |
| | 27 | Channel 27 | Channel 26 | Channel 25 | Channel 7 | Channel 8 | Channel 9 |
| | 26 | Channel 26 | Channel 27 | Channel 28 | Channel 10 | Channel 9 | Channel 8 |
| | 25 | Channel 25 | Channel 24 | Channel 29 | Channel 11 | Channel 6 | Channel 7 |
| | 24 | Channel 24 | Channel 25 | Channel 26 | Channel 8 | Channel 7 | Channel 6 |
| | 23 | Channel 23 | Channel 22 | Channel 21 | Channel 3 | Channel 4 | Channel 5 |
| | 22 | Channel 22 | Channel 23 | Channel 18 | Channel 0 | Channel 5 | Channel 4 |
| | 21 | Channel 21 | Channel 20 | Channel 19 | Channel 1 | Channel 2 | Channel 3 |
| | 20 | Channel 20 | Channel 21 | Channel 22 | Channel 4 | Channel 3 | Channel 2 |
| | 19 | Channel 19 | Channel 18 | Channel 23 | Channel 5 | Channel 0 | Channel 1 |
| | ↑ 18 | Channel 18 | Channel 19 | Channel 20 | Channel 2 | Channel 1 | Channel 0 |
| | 17 | Channel 17 | Channel 16 | Channel 15 | Channel 33 | Channel 34 | Channel 35 |
| | 16 | Channel 16 | Channel 17 | Channel 12 | Channel 30 | Channel 35 | Channel 34 |
| | 15 | Channel 15 | Channel 14 | Channel 13 | Channel 31 | Channel 32 | Channel 33 |
| | 14 | Channel 14 | Channel 15 | Channel 16 | Channel 34 | Channel 33 | Channel 32 |
| | 13 | Channel 13 | Channel 12 | Channel 17 | Channel 35 | Channel 30 | Channel 31 |
| | 12 | Channel 12 | Channel 13 | Channel 14 | Channel 32 | Channel 31 | Channel 30 |
| | 11 | Channel 11 | Channel 10 | Channel 9 | Channel 27 | Channel 28 | Channel 29 |

| | Channel 10 | Channel 11 | Channel 6 | Channel 24 | Channel 29 | Channel 28 |
|---|---|---|---|---|---|---|
| 10 | Channel 10 | Channel 11 | Channel 6 | Channel 24 | Channel 29 | Channel 28 |
| 9 | Channel 9 | Channel 8 | Channel 7 | Channel 25 | Channel 26 | Channel 27 |
| 8 | Channel 8 | Channel 9 | Channel 10 | Channel 28 | Channel 27 | Channel 26 |
| 7 | Channel 7 | Channel 6 | Channel 11 | Channel 29 | Channel 24 | Channel 25 |
| 6 | Channel 6 | Channel 7 | Channel 8 | Channel 26 | Channel 25 | Channel 24 |
| 5 | Channel 5 | Channel 4 | Channel 3 | Channel 21 | Channel 22 | Channel 23 |
| 4 | Channel 4 | Channel 5 | Channel 0 | Channel 18 | Channel 23 | Channel 22 |
| 3 | Channel 3 | Channel 2 | Channel 1 | Channel 19 | Channel 20 | Channel 21 |
| 2 | Channel 2 | Channel 3 | Channel 4 | Channel 22 | Channel 21 | Channel 20 |
| 1 | Channel 1 | Channel 0 | Channel 5 | Channel 23 | Channel 18 | Channel 19 |
| 0 | Channel 0 | Channel 1 | Channel 2 | Channel 20 | Channel 19 | Channel 18 |
| | Symbol group 0 | Symbol group 1 | Symbol group 2 | Symbol group 3 | Symbol group 4 | Symbol group 5. |

10. The method of any of claim 6, wherein the random-access signal is retransmitted.

11. An electronic apparatus, comprising:
a processor configured to determine resources for a random-access signal to be transmitted on a channel for narrowband wireless communications, wherein the resources are in a region that comprises 36 subcarriers and six symbol groups, wherein the six symbol groups are assigned indices 0, 1, 2, 3, 4, and 5, wherein each symbol group comprises a cyclic prefix and one or more symbols, and wherein a subcarrier index occupied by a symbol group is determined based on:
determining a first subcarrier index occupied by an adjacent symbol group that is adjacent to the symbol group, and
determining the subcarrier index based on the first subcarrier index and an offset value that comprises at least one of 3, −3, 18, or −18; and
a transmitter configured to transmit the random-access signal using the determined resources.

12. The apparatus of claim 11, wherein the offset value for symbol group index 2 and symbol group index 4 is 3 or −3.

13. The apparatus of claim 11, wherein the offset value for symbol group index 3 is 18 or −18.

14. The apparatus of claim 11, wherein, given a channel having a channel number of {0, 1, 2, . . . , 35}, the resources for the random-access signal corresponding to the channel are defined as:

| Subcarrier index | | | | | | | |
|---|---|---|---|---|---|---|---|
| | 35 | Channel 35 | Channel 34 | Channel 33 | Channel 15 | Channel 16 | Channel 17 |
| | 34 | Channel 34 | Channel 35 | Channel 30 | Channel 12 | Channel 17 | Channel 16 |
| | 33 | Channel 33 | Channel 32 | Channel 31 | Channel 13 | Channel 14 | Channel 15 |
| | 32 | Channel 32 | Channel 33 | Channel 34 | Channel 16 | Channel 15 | Channel 14 |
| | 31 | Channel 31 | Channel 30 | Channel 35 | Channel 17 | Channel 12 | Channel 13 |
| | 30 | Channel 30 | Channel 31 | Channel 32 | Channel 14 | Channel 13 | Channel 12 |
| | 29 | Channel 29 | Channel 28 | Channel 27 | Channel 9 | Channel 10 | Channel 11 |
| | 28 | Channel 28 | Channel 29 | Channel 24 | Channel 6 | Channel 11 | Channel 10 |
| | 27 | Channel 27 | Channel 26 | Channel 25 | Channel 7 | Channel 8 | Channel 9 |
| | 26 | Channel 26 | Channel 27 | Channel 28 | Channel 10 | Channel 9 | Channel 8 |
| | 25 | Channel 25 | Channel 24 | Channel 29 | Channel 11 | Channel 6 | Channel 7 |
| | 24 | Channel 24 | Channel 25 | Channel 26 | Channel 8 | Channel 7 | Channel 6 |
| | 23 | Channel 23 | Channel 22 | Channel 21 | Channel 3 | Channel 4 | Channel 5 |
| | 22 | Channel 22 | Channel 23 | Channel 18 | Channel 0 | Channel 5 | Channel 4 |
| | 21 | Channel 21 | Channel 20 | Channel 19 | Channel 1 | Channel 2 | Channel 3 |
| | 20 | Channel 20 | Channel 21 | Channel 22 | Channel 4 | Channel 3 | Channel 2 |
| | 19 | Channel 19 | Channel 18 | Channel 23 | Channel 5 | Channel 0 | Channel 1 |
| | ↑ 18 | Channel 18 | Channel 19 | Channel 20 | Channel 2 | Channel 1 | Channel 0 |
| | 17 | Channel 17 | Channel 16 | Channel 15 | Channel 33 | Channel 34 | Channel 35 |
| | 16 | Channel 16 | Channel 17 | Channel 12 | Channel 30 | Channel 35 | Channel 34 |
| | 15 | Channel 15 | Channel 14 | Channel 13 | Channel 31 | Channel 32 | Channel 33 |
| | 14 | Channel 14 | Channel 15 | Channel 16 | Channel 34 | Channel 33 | Channel 32 |
| | 13 | Channel 13 | Channel 12 | Channel 17 | Channel 35 | Channel 30 | Channel 31 |
| | 12 | Channel 12 | Channel 13 | Channel 14 | Channel 32 | Channel 31 | Channel 30 |
| | 11 | Channel 11 | Channel 10 | Channel 9 | Channel 27 | Channel 28 | Channel 29 |
| | 10 | Channel 10 | Channel 11 | Channel 6 | Channel 24 | Channel 29 | Channel 28 |
| | 9 | Channel 9 | Channel 8 | Channel 7 | Channel 25 | Channel 26 | Channel 27 |
| | 8 | Channel 8 | Channel 9 | Channel 10 | Channel 28 | Channel 27 | Channel 26 |
| | 7 | Channel 7 | Channel 6 | Channel 11 | Channel 29 | Channel 24 | Channel 25 |
| | 6 | Channel 6 | Channel 7 | Channel 8 | Channel 26 | Channel 25 | Channel 24 |
| | 5 | Channel 5 | Channel 4 | Channel 3 | Channel 21 | Channel 22 | Channel 23 |
| | 4 | Channel 4 | Channel 5 | Channel 0 | Channel 18 | Channel 23 | Channel 22 |
| | 3 | Channel 3 | Channel 2 | Channel 1 | Channel 19 | Channel 20 | Channel 21 |
| | 2 | Channel 2 | Channel 3 | Channel 4 | Channel 22 | Channel 21 | Channel 20 |
| | 1 | Channel 1 | Channel 0 | Channel 5 | Channel 23 | Channel 18 | Channel 19 |
| | 0 | Channel 0 | Channel 1 | Channel 2 | Channel 20 | Channel 19 | Channel 18 |
| | | Symbol group 0 | Symbol group 1 | Symbol group 2 | Symbol group 3 | Symbol group 4 | Symbol group 5. |

15. The apparatus of claim 11, wherein the random-access signal is retransmitted.

16. An electronic apparatus, comprising a receiver configured to receive a random access signal on a channel for narrowband wireless communications using resources in a region that comprises 36 subcarriers and six symbol groups, wherein the six symbol groups are assigned indices 0, 1, 2, 3, 4, and 5, wherein each symbol group comprises a cyclic prefix and one or more symbols, and wherein a subcarrier index occupied by a symbol group is determined based on (1) a first subcarrier index occupied by an adjacent symbol group that is adjacent to the symbol group and (2) an offset value with respect to the first subcarrier index, the offset value comprising at least one of 3, −3, 18, or −18.

17. The apparatus of claim 16, wherein the offset value for symbol group index 2 and symbol group index 4 is 3 or −3.

18. The apparatus of claim 16, wherein the offset value for symbol group index 3 is 18 or −18.

19. The apparatus of claim 16, wherein, given a channel having a channel number of {0, 1, 2, ..., 35}, the resources for the random-access signal corresponding to the channel are defined as:

| Subcarrier index | | Symbol group 0 | Symbol group 1 | Symbol group 2 | Symbol group 3 | Symbol group 4 | Symbol group 5 |
|---|---|---|---|---|---|---|---|
| | 35 | Channel 35 | Channel 34 | Channel 33 | Channel 15 | Channel 16 | Channel 17 |
| | 34 | Channel 34 | Channel 35 | Channel 30 | Channel 12 | Channel 17 | Channel 16 |
| | 33 | Channel 33 | Channel 32 | Channel 31 | Channel 13 | Channel 14 | Channel 15 |
| | 32 | Channel 32 | Channel 33 | Channel 34 | Channel 16 | Channel 15 | Channel 14 |
| | 31 | Channel 31 | Channel 30 | Channel 35 | Channel 17 | Channel 12 | Channel 13 |
| | 30 | Channel 30 | Channel 31 | Channel 32 | Channel 14 | Channel 13 | Channel 12 |
| | 29 | Channel 29 | Channel 28 | Channel 27 | Channel 9 | Channel 10 | Channel 11 |
| | 28 | Channel 28 | Channel 29 | Channel 24 | Channel 6 | Channel 11 | Channel 10 |
| | 27 | Channel 27 | Channel 26 | Channel 25 | Channel 7 | Channel 8 | Channel 9 |
| | 26 | Channel 26 | Channel 27 | Channel 28 | Channel 10 | Channel 9 | Channel 8 |
| | 25 | Channel 25 | Channel 24 | Channel 29 | Channel 11 | Channel 6 | Channel 7 |
| | 24 | Channel 24 | Channel 25 | Channel 26 | Channel 8 | Channel 7 | Channel 6 |
| | 23 | Channel 23 | Channel 22 | Channel 21 | Channel 3 | Channel 4 | Channel 5 |
| | 22 | Channel 22 | Channel 23 | Channel 18 | Channel 0 | Channel 5 | Channel 4 |
| | 21 | Channel 21 | Channel 20 | Channel 19 | Channel 1 | Channel 2 | Channel 3 |
| | 20 | Channel 20 | Channel 21 | Channel 22 | Channel 4 | Channel 3 | Channel 2 |
| | 19 | Channel 19 | Channel 18 | Channel 23 | Channel 5 | Channel 0 | Channel 1 |
| ↑ | 18 | Channel 18 | Channel 19 | Channel 20 | Channel 2 | Channel 1 | Channel 0 |
| | 17 | Channel 17 | Channel 16 | Channel 15 | Channel 33 | Channel 34 | Channel 35 |
| | 16 | Channel 16 | Channel 17 | Channel 12 | Channel 30 | Channel 35 | Channel 34 |
| | 15 | Channel 15 | Channel 14 | Channel 13 | Channel 31 | Channel 32 | Channel 33 |
| | 14 | Channel 14 | Channel 15 | Channel 16 | Channel 34 | Channel 33 | Channel 32 |
| | 13 | Channel 13 | Channel 12 | Channel 17 | Channel 35 | Channel 30 | Channel 31 |
| | 12 | Channel 12 | Channel 13 | Channel 14 | Channel 32 | Channel 31 | Channel 30 |
| | 11 | Channel 11 | Channel 10 | Channel 9 | Channel 27 | Channel 28 | Channel 29 |
| | 10 | Channel 10 | Channel 11 | Channel 6 | Channel 24 | Channel 29 | Channel 28 |
| | 9 | Channel 9 | Channel 8 | Channel 7 | Channel 25 | Channel 26 | Channel 27 |
| | 8 | Channel 8 | Channel 9 | Channel 10 | Channel 28 | Channel 27 | Channel 26 |
| | 7 | Channel 7 | Channel 6 | Channel 11 | Channel 29 | Channel 24 | Channel 25 |
| | 6 | Channel 6 | Channel 7 | Channel 8 | Channel 26 | Channel 25 | Channel 24 |
| | 5 | Channel 5 | Channel 4 | Channel 3 | Channel 21 | Channel 22 | Channel 23 |
| | 4 | Channel 4 | Channel 5 | Channel 0 | Channel 18 | Channel 23 | Channel 22 |
| | 3 | Channel 3 | Channel 2 | Channel 1 | Channel 19 | Channel 20 | Channel 21 |
| | 2 | Channel 2 | Channel 3 | Channel 4 | Channel 22 | Channel 21 | Channel 20 |
| | 1 | Channel 1 | Channel 0 | Channel 5 | Channel 23 | Channel 18 | Channel 19 |
| | 0 | Channel 0 | Channel 1 | Channel 2 | Channel 20 | Channel 19 | Channel 18 |

20. The apparatus of claim 16, wherein the random-access signal is retransmitted.

* * * * *